US012401135B2

(12) United States Patent
Kim et al.

(10) Patent No.: US 12,401,135 B2
(45) Date of Patent: Aug. 26, 2025

(54) ELECTRONIC DEVICE INCLUDING ANTENNA

(71) Applicant: SAMSUNG ELECTRONICS CO., LTD., Suwon-si (KR)

(72) Inventors: Dongyeon Kim, Suwon-si (KR); Hosaeng Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/846,576

(22) Filed: Jun. 22, 2022

(65) Prior Publication Data

US 2024/0332819 A1 Oct. 3, 2024

Related U.S. Application Data

(63) Continuation of application No. PCT/KR2022/007891, filed on Jun. 3, 2022.

(30) Foreign Application Priority Data

Jun. 3, 2021 (KR) ........................ 10-2021-0072081

(51) Int. Cl.
*H01Q 1/24* (2006.01)
*H01Q 5/25* (2015.01)
(Continued)

(52) U.S. Cl.
CPC ............ *H01Q 21/065* (2013.01); *H01Q 5/25* (2015.01); *H01Q 9/0428* (2013.01); *H01Q 21/24* (2013.01); *H01Q 1/243* (2013.01)

(58) Field of Classification Search
CPC ........ H01Q 1/243; H01Q 21/065; H01Q 5/25; H01Q 9/0414; H01Q 1/38; H01Q 9/0428; H01Q 21/24; H01Q 9/0407
See application file for complete search history.

(56) References Cited

U.S. PATENT DOCUMENTS 4,827,271 A * 5/1989 Berneking ............. H01Q 5/378 343/846
6,154,176 A 11/2000 Fathy et al.
(Continued)

FOREIGN PATENT DOCUMENTS

CN 112751189 5/2021
JP 2000114859 4/2000
(Continued)

OTHER PUBLICATIONS

Search Report dated Sep. 6, 2022 issued in International Patent Application No. PCT/KR2022/007891.
(Continued)

*Primary Examiner* — Dimary S Lopez Cruz
*Assistant Examiner* — Anna N Hamadyk
(74) *Attorney, Agent, or Firm* — Nixon & Vanderhye P.C.

(57) ABSTRACT

According to an embodiment of the present disclosure, an electronic device may include: a housing; an antenna structure positioned in the housing and including a printed circuit board, multiple first antenna elements, multiple second antenna elements, and multiple electrical paths; and a wireless communication circuit electrically connected to the multiple first antenna elements through the electrical paths. The antenna structure may include antenna elements arranged for enhancing a communication performance and/or may be capable of securing the quality and the accuracy of the positioning for the signal source even though there are various directions or orientations where the electronic device faces, or various polarization characteristics of a signal transmitted from the signal source.

20 Claims, 22 Drawing Sheets

(51) Int. Cl.

| | |
|---|---|
| ***H01Q 9/04*** | (2006.01) |
| ***H01Q 21/06*** | (2006.01) |
| ***H01Q 21/24*** | (2006.01) |

(56) References Cited

U.S. PATENT DOCUMENTS

| | | | |
|---|---|---|---|
| 7,427,957 B2 | 9/2008 | Zeinolabedin Rafi et al. | |
| 8,717,245 B1 | 5/2014 | Krivokapic et al. | |
| 10,734,726 B2 | 8/2020 | Fujimoto | |
| 2009/0058731 A1 | 3/2009 | Geary et al. | |
| 2010/0007561 A1 | 1/2010 | Bucca et al. | |
| 2020/0021011 A1 | 1/2020 | Cooper et al. | |
| 2020/0021019 A1 | 1/2020 | Rajagopalan et al. | |
| 2023/0299487 A1* | 9/2023 | Hwang | H01Q 9/0407 343/702 |

FOREIGN PATENT DOCUMENTS

| | | |
|---|---|---|
| JP | 2001-177314 | 6/2001 |
| JP | 2019-515536 | 6/2019 |
| KR | 10-2461630 | 10/2022 |

OTHER PUBLICATIONS

Extended European Search Report dated Sep. 19, 2024 for EP Application No. 22816489.3.

* cited by examiner

ELECTRONIC DEVICE INCLUDING ANTENNA

CROSS-REFERENCE TO RELATED APPLICATIONS

This application is a continuation of International Application No. PCT/KR2022/007891 designating the United States, filed on Jun. 3, 2022, in the Korean Intellectual Property Receiving Office and claiming priority to Korean Patent Application No. 10-2021-0072081, filed on Jun. 3, 2021, in the Korean Intellectual Property Office, the disclosures of which are incorporated by reference herein in their entireties.

BACKGROUND

Field

The disclosure relates to an electronic device including an antenna.

Description of Related Art

An electronic device may support an ultra-wide band (UWB). The UWB may correspond to a technology following the international strand IEEE 802.15.4, and may perform communication with a bandwidth of a broadband. The UWB is optimized as a technology in which positioning using a bandwidth of a broadband is performed, rather than increasing a transmission rate or a communication rate using a broadband in the conventional communication.

An antenna supporting a UWB, or an antenna for transmitting and/or receiving a signal in various other frequency bands, may be developed to enhance a communication performance. For example, an electronic device (e.g., an initiator, a receiver, or a receiver (Rx) device) may identify or estimate the location of a signal source (e.g., a responder, a transmitter, or a transmitter (Tx) device) using a phase difference of signals received in two antennas. The electronic device may identify a reception angle (e.g., a signal direction) of a signal for a configured axis of the electronic device, or a distance between the electronic device and a signal source, using a positioning method (e.g., angle of arrival (AOA). As a response related to the positioning, a signal (e.g., a Tx signal) transmitted from the signal source may have various polarization characteristics according to an antenna type, an antenna location, or the direction (orientation) where the signal source faces. When the electronic device is implemented to receive single polarization, it may be difficult to secure the quality or the accuracy of the positioning to correspond to various polarization characteristic of a signal transmitted from the signal source. In addition, when the electronic device is implemented to receive single polarization, it may be difficult to secure the quality or the accuracy of the positioning for the signal source to correspond to the orientation or various directions (orientations) where the electronic device faces.

SUMMARY

Embodiments of the disclosure may provide an electronic device including an antenna capable of enhancing a communication performance.

Embodiments of the disclosure may provide an electronic device including an antenna capable of securing the quality and the accuracy of the positioning for the signal source even though there are various directions or orientations where the electronic device faces, or various polarization characteristics of a signal transmitted from the signal source.

According to an example embodiment of the disclosure, an electronic device may include: a housing, an antenna structure including at least one antenna positioned in the housing and including a printed circuit board, multiple first antenna elements, multiple second antenna elements, and multiple electrical paths, and a wireless communication circuit electrically connected to the multiple first antenna elements through the electrical paths, wherein the printed circuit board includes a first surface oriented in a first direction and a second surface oriented in a second direction opposite to the first direction, wherein the multiple first antenna elements are positioned in the printed circuit board on the first surface or to be closer to the first surface than the second surface, are configured to generate circular polarization, and include, when seen from above the first surface, a first border and a third border spaced apart from each other and extending in parallel to each other, a second border and a fourth border spaced apart from each other by a distance between the first border and the third border, extending in parallel to each other, and disposed to be perpendicular to the first border or the third border, and multiple first notches formed on the first border, the second border, the third border, and the fourth border and arranged at a 90-degree angle with reference to a center of each of the multiple first antenna elements, the multiple second antenna elements are positioned in the printed circuit board to be closer to the second surface than the multiple first antenna elements, overlap with, when seen from above the first surface, the multiple first antenna elements one-to-one, are configured to generate circular polarization, and include, when seen from above the first surface, a fifth border and a seventh border spaced apart from each other and extending in parallel to each other, a sixth border and an eighth border spaced apart from each other by a distance between the fifth border and the seventh border, and disposed to be perpendicular to the fifth border or the seventh border, and multiple second notches formed on the fifth border, the sixth border, the seventh border, and the eighth border, arranged at a 90-degree angle with reference to the center, and overlapping with at least some of the multiple first notches one-to-one, and the multiple electrical paths are positioned on the printed circuit board and include multiple conductive vias electrically connected to the multiple first antenna elements, wherein the printed circuit board includes: a first conductive layer including the multiple first antenna elements, a second conductive layer including the multiple second antenna elements, a first dielectric positioned between the first conductive layer and the second conductive layer, a third conductive layer configured to electrically connect the multiple conductive vias to the wireless communication circuit and positioned in the printed circuit board to be closer to the second surface than the second conductive layer, a fourth conductive layer including a ground plane and positioned in the printed circuit board to be closer to the second surface than the third conductive layer, and a second dielectric positioned between the third conductive layer and the fourth conductive layer and having a greater dielectric constant than the first dielectric, each of the multiple second antenna elements includes a hole, each of the multiple conductive vias is positioned to extend through the hole, the multiple second antenna elements are configured to be indirectly fed by the multiple conductive vias, and the multiple first notches have different shapes from the multiple second notches.

According to an example embodiment of the disclosure, an antenna structure may include: a printed circuit board including a first surface oriented in a first direction and a second surface oriented in a second direction opposite to the first direction, a first conductive layer positioned in the printed circuit board on the first surface or to be closer to the first surface than the second surface, and including multiple first antenna elements, configured to generate circular polarization, and including, when seen from above the first surface, a first border and a third border spaced apart from each other and extending in parallel to each other, a second border and a fourth border spaced apart from each other by a distance between the first border and the third border, extending in parallel to each other, and disposed to be perpendicular to the first border or the third border, and multiple first notches formed on the first border, the second border, the third border, and the fourth border, and arranged at a 90-degree angle with reference to a center of each of the multiple first antenna elements, a second conductive layer positioned in the printed circuit board to be closer to the second surface than the multiple first antenna elements, and including multiple second antenna elements overlapping with, when seen from above the first surface, the multiple first antenna elements one-to-one, configured to generate circular polarization, and including, when seen from above the first surface, a fifth border and a seventh border spaced apart from each other and extending in parallel to each other, a sixth border and an eighth border spaced apart from each other by a distance between the fifth border and the seventh border, and disposed to be perpendicular to the fifth border or the seventh border, and multiple second notches formed on the fifth border, the sixth border, the seventh border, and the eighth border, arranged at a 90-degree angle from the center, and overlapping with at least some of the multiple first notches one-to-one, a third conductive layer positioned in the printed circuit board to be closer to the second surface than the second conductive layer, a fourth conductive layer including a ground plane and positioned in the printed circuit board to be closer to the second surface than the third conductive layer, a first dielectric included in the printed circuit board and positioned between the first conductive layer and the second conductive layer, a second dielectric included in the printed circuit board, positioned between the third conductive layer and the fourth conductive layer, and having a greater dielectric constant than the first dielectric, multiple conductive vias positioned in the printed circuit board and electrically connecting the multiple first antenna elements and the third conductive layer, and a wireless communication circuit electrically connected to the multiple first antenna elements through the third conductive layer, wherein each of the multiple second antenna elements includes a hole, each of the multiple conductive vias is positioned to extend through the hole, the multiple second antenna elements are configured to be indirectly fed by the multiple conductive vias, and the multiple first notches have different shapes from the multiple second notches.

An electronic device including an antenna according to various example embodiments of the disclosure can enhance a communication performance using circular polarization. For example, an electronic device including an antenna of the disclosure can perform positioning for a signal source, and it may be easier to secure the quality and the accuracy of the positioning even though there are various directions or orientations where the electronic device faces, or various polarization characteristics of a signal transmitted from the signal source.

Other effects obtained or predicted by various embodiments of the disclosure will be directly or implicitly described in the detailed description of the embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments disclosed herein will be described with reference to the accompanying drawings.

Figure 1:
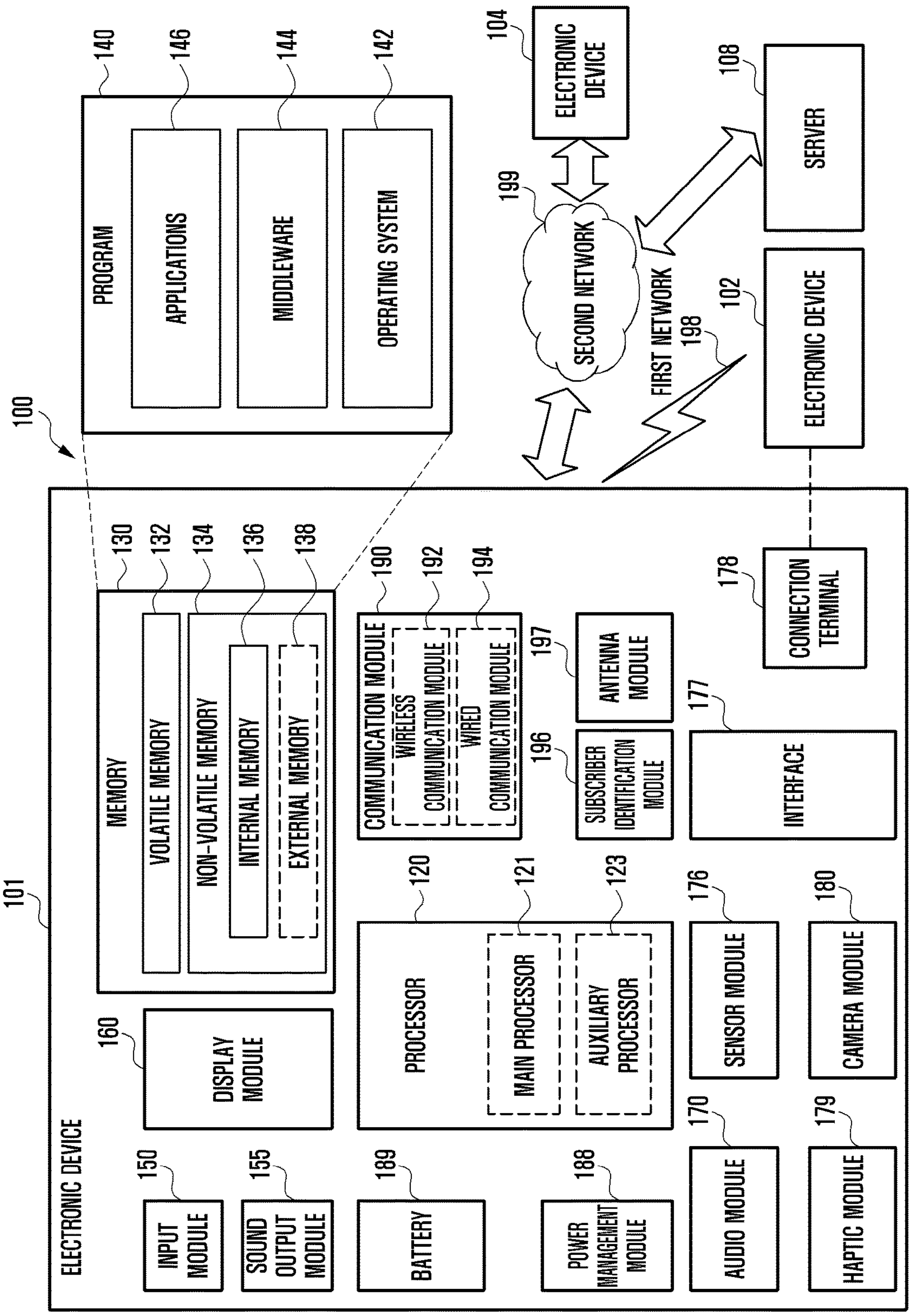
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In various embodiments of the disclosure, at least one (e.g., the connection terminal 178) of the components may be omitted from the electronic device 101, or one or more other components may be added in the electronic device 101. In various embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module e 192 may support a 5G network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In an embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, a home appliance, or the like. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

The term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
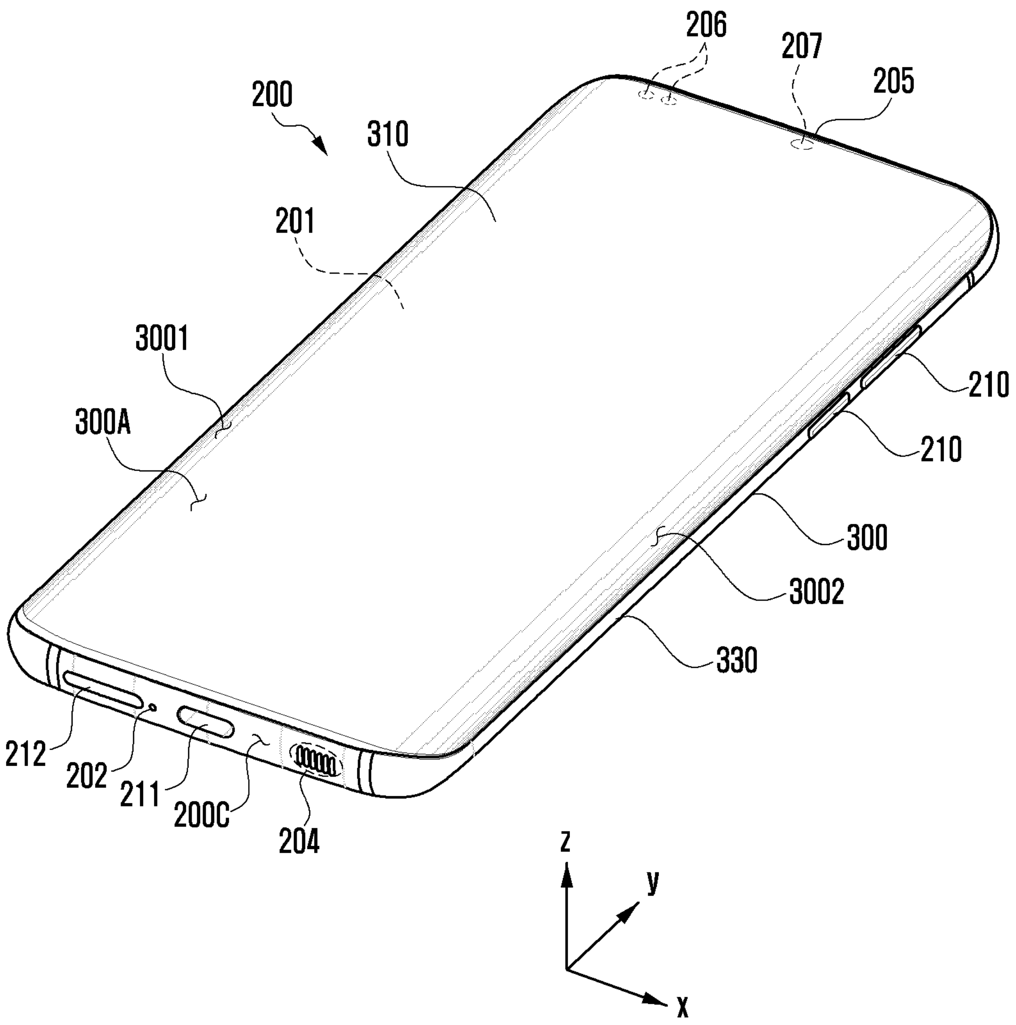
FIG. 2 is a front perspective view illustrating of an electronic device according to various embodiments.
Figure 3:
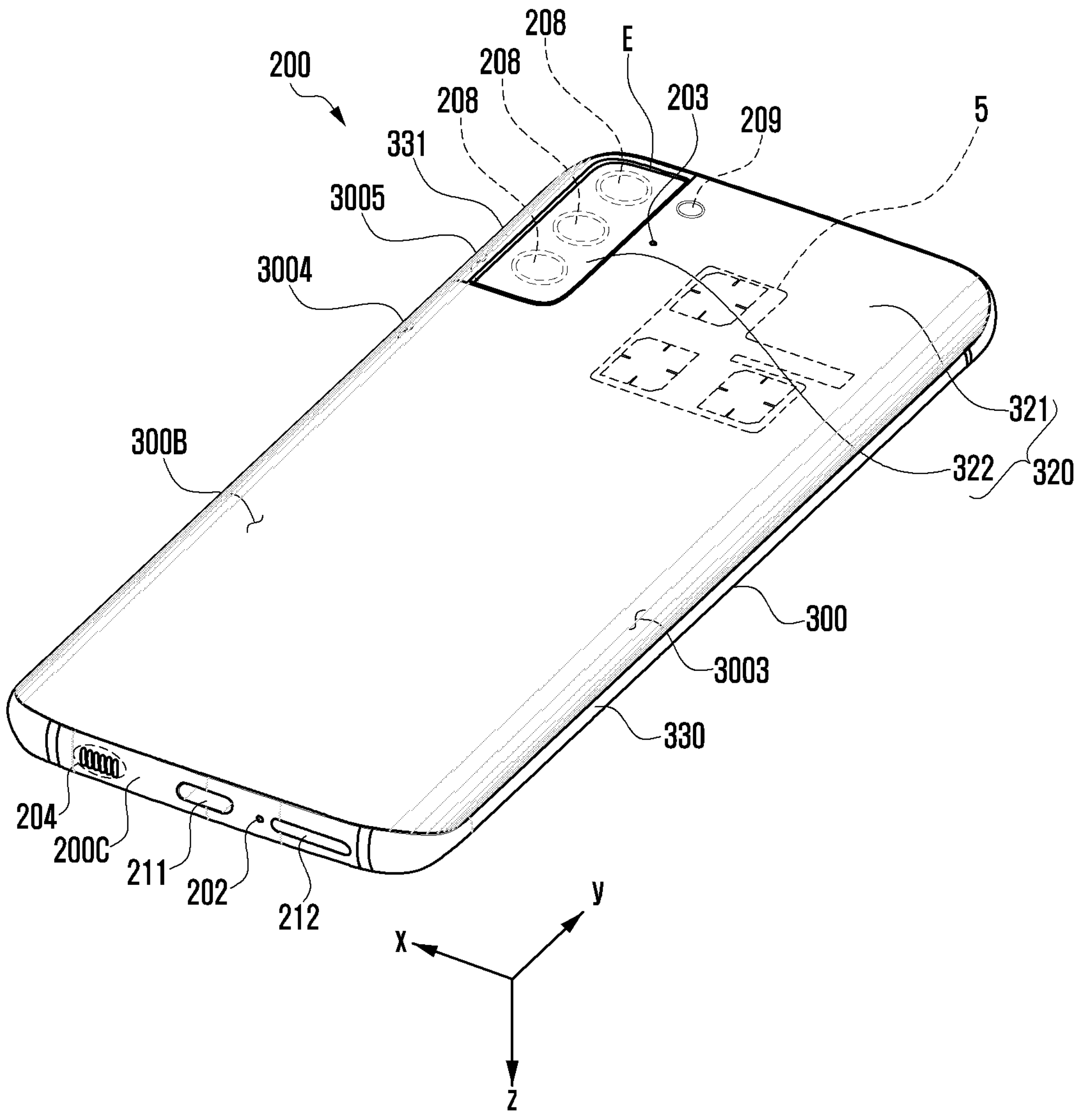
FIG. 3 is a rear perspective view of the electronic device of FIG. 2 according to various embodiments.

FIG. 2 is a front perspective view of an electronic device 200 according to various. FIG. 3 is a rear perspective view of an electronic device 200 according to various embodiments.

Referring to FIGS. 2 and 3, in an embodiment, the electronic device 200 (e.g., the electronic device 101 of FIG. 1) may include a housing 300 forming an exterior of the electronic device 200, and the housing 300 may form, for example, a front surface 300A of the electronic device 200, a rear surface 300B of the electronic device 200, and a side surface 300C of the electronic device 200, which surrounds a space between the front surface 300A and the rear surface 300B. In an embodiment, the housing 300 may refer to a structure forming at least a part of the front surface 300A, the rear surface 300B, and the side surface 300C.

According to an embodiment, the housing 300 may include a front plate 310, a rear plate 320, and/or a bezel structure 330. At least a part of the front surface 300A of the electronic device 200 may be formed by the front plate 310. The front plate 310 may be substantially transparent, and may include, for example, a polymer plate or a glass plate including various coating layers. At least a part of the rear surface 300B of the electronic device 200 may be formed by the rear plate 320. In an embodiment, the rear plate 320 may include a first rear plate 321 forming one part of the rear surface 300B and a second rear plate 322 forming another part of the rear surface 300B. The first rear plate 321 and the second rear plate 322 may be substantially opaque. The first rear plate 321 and/or the second rear plate 322 may be formed of, for example, coated or colored glass, ceramic, polymer, metal, or a combination of two or more of the materials above. In another example, the first rear plate 321 and/or the second rear plate 322 may include alloy (e.g., stainless steel) including aluminum, aluminum alloy, magnesium, magnesium alloy, or iron. The bezel structure 330 may surround at least one a part of the space between the front plate 310 and the rear plate 320. At least a part of the side surface 300C of the electronic device 200 may be formed by the bezel structure 330. In an embodiment, the bezel structure 330 may be called a "side bezel structure" or a "side member" as an element substantially forming the side surface 300C of the electronic device 200. The bezel structure 330 may include, for example, metal and/or polymer.

According to an embodiment, the front plate 310 may include a first curved part 3001 and a second curved part 3002 curved and seamlessly extending from the front surface 300A toward the rear surface 300B. The first curved part 3001 and the second curved part 3002 may be formed to be adjacent to opposite edges of the front plate 310, which are positioned opposite to each other. For example, the first curved part 3001 and the second curved part 3002 may be arranged to be symmetrical to each other by interposing a plane part (not shown) of the front plate 310 therebetween.

According to an embodiment, the first rear plate 321 may include a third curved part 3003 and a fourth curved part 3004 curved and seamlessly extending from the rear surface 300B toward the front surface 300A. The third curved part 3003 may be formed to be adjacent to an edge on one side of the first rear plate 321, so as to correspond to the first curved part 3001 of the front plate 310. The fourth curved part 3004 may be formed to be adjacent to an edge on the other side of the first rear plate 321, so as to correspond to the second curved part 3002 of the front plate 310. In an embodiment, a part 331 of the bezel structure 330 may include a fifth curved part 3005 seamlessly connected to the fourth curved part 3004 of the first rear plate 321, so as to correspond to the second curved part 3002 of the front plate 310. For example, a curved part on one side, which includes the fourth curved part 3004 and the fifth curved part 3005, may be disposed to be symmetrical to the third curved part 3003 on the other side. In an embodiment, the second rear plate 322 may be positioned to correspond to the fifth curved part 3005. For example, the part 331 of the bezel structure 330, which forms the fifth curved part 3005, may extend along a partial margin (e.g., a margin following a dotted line indicated by a reference numeral "E") by the second rear plate 322, among a margin (or an edge or a border) of the rear plate 320, and may come into contact with the second rear plate 320. In an embodiment, the fifth curved part 3005 may be formed by the first rear plate 321 or the second rear plate 322. In an embodiment, the first rear plate 321 and the second rear plate 322 may be integrally formed. In an embodiment, the first rear plate 321 and/or the second rear plate 322 may be integrally formed with the bezel structure 330, and may include the same material (e.g., a metal material such as aluminum) as the bezel structure 330.

In an embodiment, the housing 300 may be implemented without at least one of a curved part including the first curved part 3001, the second curved part 3002, the third curved part 3003, or the fourth curved part 3004 and the fifth curved part 3005.

According to an embodiment, the electronic device 200 may include at least one of a display 201, a first audio module 202, a second audio module 203, a third audio module 204, a fourth audio module 205, a sensor module 206, a first camera module 207, multiple second camera modules 208, a light emitting module 209, an input module 210, a first connection terminal module 211, or a second connecting terminal module 212. In an embodiment, the electronic device 200 may omit at least one of the elements above, or may additionally include other elements.

A display area (e.g., a screen display area or an active area) of the display 201 may be visually exposed (e.g., visible) through, for example, the front plate 310. In an embodiment, in the electronic device 200, a display area seen through the front plate 310 may be implemented as large as possible (e.g., a large screen or a full screen). For example, the display 201 may be implemented to have an outer periphery having the substantially same shape as the outer peripheral shape of the front plate 310. In an embodiment, the display 201 may include a touch detection circuit. In an embodiment, the display 201 may include a pressure sensor capable of measuring the intensity (pressure) of a touch. In an embodiment, the display 201 may be coupled to a digitizer (e.g., an electromagnetic induction panel) for detecting a magnetic field-type electronic pen (e.g., a stylus pen), or may be positioned to be adjacent to the digitizer.

The first audio module 202 may include, for example, a first microphone positioned in the electronic device 200, and a first microphone hole formed through the side surface 200C to correspond to the first microphone. The second audio module 203 may include, for example, a second microphone positioned in the electronic device 200, and a second microphone hole formed through the rear surface 300B of the second microphone. The second microphone hole may be formed through, for example, the first rear plate 321. In an embodiment, the second microphone hole may be formed through the second rear plate 322. The positions and the number of audio modules of a microphone may not be limited to the illustrated examples and there may be various positions and numbers of audio modules. In an embodiment, the electronic device 200 may include multiple microphones used for detection of the direction of sound.

The third audio module 204 may include, for example, a first speaker positioned in the electronic device 200, and a first speaker hole formed through the side surface 300C to correspond to the first speaker. The fourth audio module 205 may include, for example, a second speaker positioned in the electronic c device 200 and a second speaker hole formed through the front surface 300A to correspond to the second speaker. In an embodiment, the first speaker may include an external speaker. In an embodiment, the second speaker may include a call receiver, and the second speaker hole may be called a receiver hole. The positions or the number of the third audio modules 204 or the fourth audio modules 205 may not be limited to the illustrated examples and there may be various positions or numbers of the third audio modules or the fourth audio modules. In an embodiment, the microphone hole and the speaker hole may be implemented as a single hole. In an embodiment, the third audio module 204 or the fourth audio module 205 may include a piezo speaker from which a speaker hole is omitted.

The sensor module 206 may generate, for example, an electric signal or a data value corresponding to an internal operational state or an external environment state of the electronic device 200. In an embodiment, the sensor module 206 may include an optical sensor positioned in the electronic device 200 to correspond to the front surface 300A of the sensor module 206. The optical sensor may include, for example, a proximity sensor or an illuminance sensor. The optical sensor may be aligned with an opening formed on the display 201. External light may be introduced into the optical sensor through the opening of the display 201 and the front plate 310. In an embodiment, the optical sensor may be disposed under the display 201, and may perform a related function without visually distinguishing (or exposing) the position of the optical sensor. For example, the optical sensor may be positioned on the rear surface of the display 201, or may be positioned under (below or beneath) the display 201. In an embodiment, the optical sensor may be positioned to be aligned with a recess formed on the rear surface of the display 201. The optical sensor may be disposed to overlap with at least a part of a screen and perform a sensing function without being exposed to the outside. In this case, a partial area of the display 201, which at least partially overlaps with the optical sensor, may include a different pixel structure and/or wiring structure from other areas. For example, the partial area of the display 201, which at least partially overlaps with the optical sensor, may have different pixel density from other areas. In an embodiment, multiple pixels may not be arranged in the partial area of the display 201, which at least partially overlaps the optical sensor. In an embodiment, the electronic device 200 may include a biometric sensor (e.g., a fingerprint sensor) positioned under the display 201. The biometric sensor may be implemented in an optical type, a captive type, or an ultrasonic type, and there may be various positions and numbers of the biometric sensors. The electronic device 200 may further include other various sensor modules, for example, at least one of a gesture sensor, a gyro sensor, an atmospheric pressure sensor, a magnetic sensor, an acceleration sensor, a grip sensor, a color sensor, an infrared (IR) sensor, a temperature sensor, or a humidity sensor.

The first camera module 207 (e.g., a front camera module) may be positioned, for example, in the electronic device 200 to correspond to the front surface 300A. The multiple second camera modules 208 (e.g., rear camera modules) may be positioned, for example, in the electronic device 200 to correspond to the rear surface 300B. In an embodiment, the multiple second camera modules 208 may be positioned to correspond to the second rear plate 322. The first camera module 207 and/or the multiple second camera modules 208 may include one or multiple lenses, image sensors, and/or image signal processors. The positions and the number of the first camera modules or the second camera modules may not be limited to the illustrated example and there may be various positions and numbers of the first camera modules or the second camera modules.

According to an embodiment, the display 201 may include an opening aligned with the first camera module 207. External light may reach the first camera module 207 through the opening of the display 201 and the front plate 310. In an embodiment, the opening of the display 201 may be formed in a notch shape according to the position of the first camera module 207. In an embodiment, the first camera module 207 may be disposed under the display 201, and may perform a related function (e.g., image capturing) without visually distinguishing (or exposing) the position of the first camera module 207. For example, the first camera module 207 may be positioned on the rear surface of the display 201, or may be positioned under (below or beneath) the display 201, and may include a hidden display rear camera (e.g., an under-display camera (UDC)). In an embodiment, the first camera module 207 may be positioned to be aligned with a recess formed on the rear surface of the display 201. The first camera module 207 may be disposed to overlap with at least a part of a screen, and may acquire an image of an external subject, without being visually exposed to the outside. In this case, a partial area of the display 201, which at least partially overlaps with the first camera module 207, may include a different pixel structure and/or wiring structure from other areas. For example, the partial area of the first display 201, which at least partially overlaps with the first camera module 207, may have different pixel density from other areas. The pixel structure and/or the wiring structure formed in the partial area of the display 201, which at least partially overlaps with the first camera module 207, may reduce an optical loss between the outside and the first camera module 207. In an embodiment, a pixel may not be disposed in the partial area of the display 201, which at least partially overlaps with the first camera module 207. In an embodiment, the electronic device 200 may further include a light emitting module (e.g., a light source) positioned in the electronic device 200 to correspond to the front surface 300A. For example, the light emitting module may provide state information of the electronic device 200 in an optical type. In an embodiment, the light emitting module may provide a light source linked with an operation of the first camera module 207. The light emitting module may include, for example, an LED, an IR LED, or a xenon lamp.

According to an embodiment, the multiple second camera modules 208 may have different attributes (e.g., angles of view) or functions, and may include, for example, a dual camera or a triple camera. The multiple second camera modules 208 may include multiple camera modules including a lens having different angles of view, and the electronic device 200 may control a change in an angle of view of a camera module, performed in the electronic device 200, based on a user selection. The multiple second camera modules 208 may include at least one of a wide-angle camera, a telephoto camera, a color camera, a monochrome camera, or an infrared (IR) camera (e.g., a time of flight (TOF) camera and a structure light camera). In an embodiment, the IR camera may operate as at least a part of a sensor module. The light emitting module 209 (e.g., flash) may include a light source for the multiple second camera modules 208. The light emitting module 209 may include, for example, an LED or a xenon lamp.

The input module 210 may include, for example, one or more key input devices. The one or more key input devices may be positioned, for example, on an opening formed on the side surface 300C. In an embodiment, the electronic device 200 may not include some or all of the key input devices, and the key input device that is not included may be implemented as a soft key using the display 201. There may be various positions and numbers of the input modules 210, and in an embodiment, the input module 210 may include at least one sensor module.

The first connection terminal module 211 (e.g., a first connector module or a first interface terminal module) may include, for example, a first connector (or a first interface terminal) positioned in the electronic device 200, and a first connector hole formed through the side surface 300C to correspond to the first connector. The second connection terminal module 212 (e.g., a second connector module or a second interface terminal module) may include, for example, a second connector (or a second interface terminal) positioned in the electronic device 200, and a second connector hole formed through the side surface 300*c* to correspond to the second connector. The electronic device 200 may transmit and/or receive power and/or data to and/or from an external electronic device electrically connected to the first connector or the second connector. In an embodiment, the first connector may include a universal serial bus (USB) connector or a high-definition multimedia interface (HDMI) connector. In an embodiment, the second connector may include a connector for a memory card (e.g., a secure digital (SD) memory card or a subscriber identity module (SIM) card). In an embodiment, the second connector may include an audio connector (e.g., a headphone connector or an earset connector). The positions or the number of the connection terminal modules may not be limited to the illustrated example and there may be various positions or numbers of the connection terminal modules.

According to an embodiment, the electronic device 200 may include a second antenna structure 5 positioned in the housing 300. For example, the electronic device 200 may perform a positioning function (e.g., angle of arrival (AOA)) for a signal source (e.g., a responder, a transmitter, or a Tx device) using the second antenna structure 5. The electronic device 200 may include a wireless communication circuit (e.g., the wireless communication module 192 of FIG. 1) electrically connected to the second antenna structure 5, and a processor (e.g., the processor 120 of FIG. 1) electrically connected to the wireless communication circuit. In an embodiment, the processor may identify (or estimate) a reception angle (e.g., the direction of a signal) of a signal for a configured axis of the electronic device 200, or the distance from the electronic device or the signal source, using a time difference between signals received through the second antenna structure 5 and a phase difference due to the time difference. The electronic device 200 may support a positioning function using a bandwidth (e.g., UWB) of a broadband. For example, the UWB corresponds to a technology following the international standard of IEEE 802.15.4, and may indicate a technology in which communication is performed with a bandwidth of a broadband.

The electronic device 200 may further include various elements according to a providing form thereof. Such elements may have forms changed in various ways according to the trend toward convergence of the electronic device 200, but the electronic device 200 may further include having equal levels to those of the abovementioned elements although all of the elements are not listed herein. In various embodiments, the electronic device 200 may omit specific elements of the above-described elements or substitute the same with other elements according to a providing form thereof.

Figure 4:
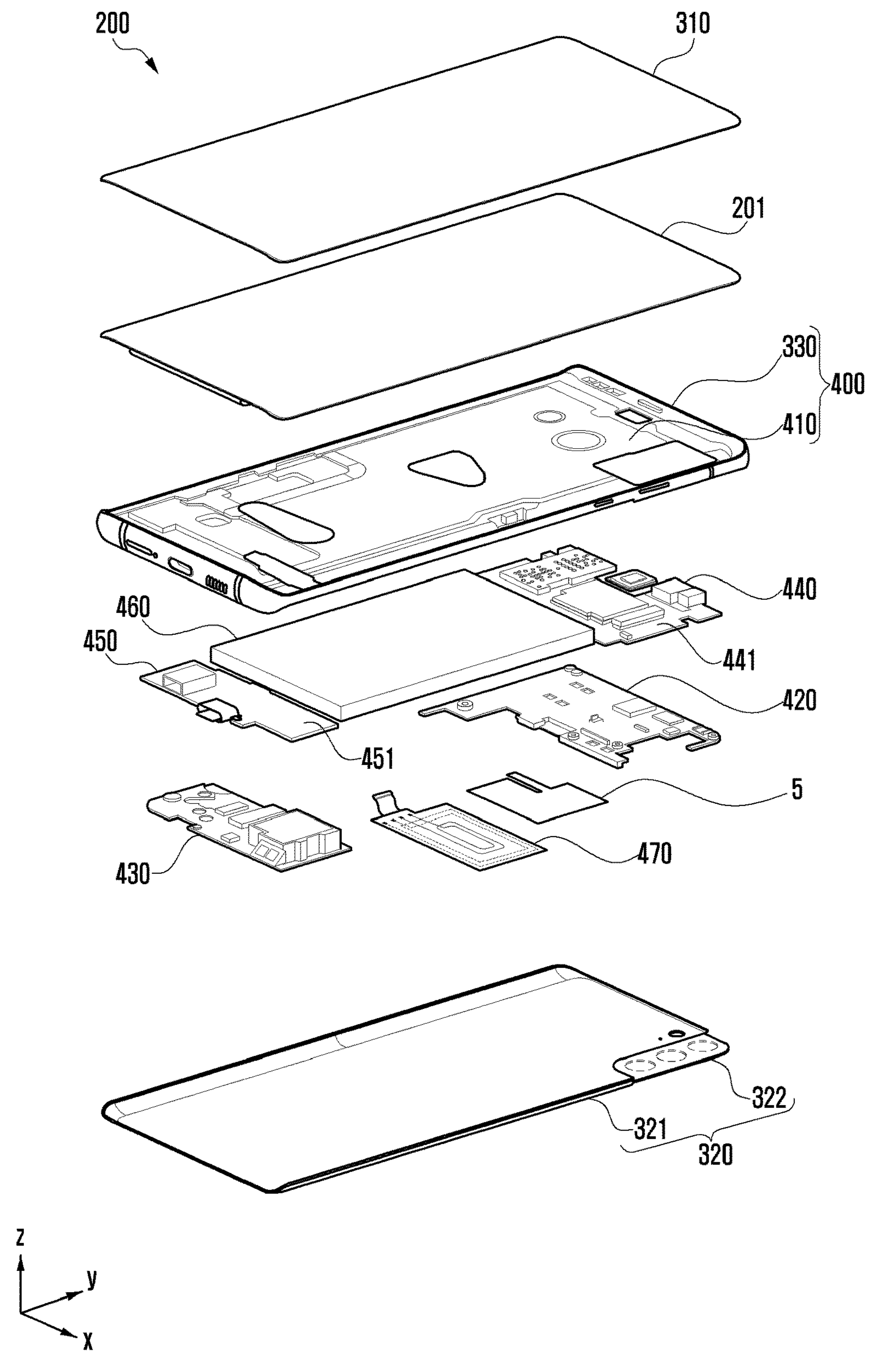
FIGS. 4 and 5 are exploded perspective views illustrating the electronic device of FIG. 2 according to various embodiments.
Figure 5:
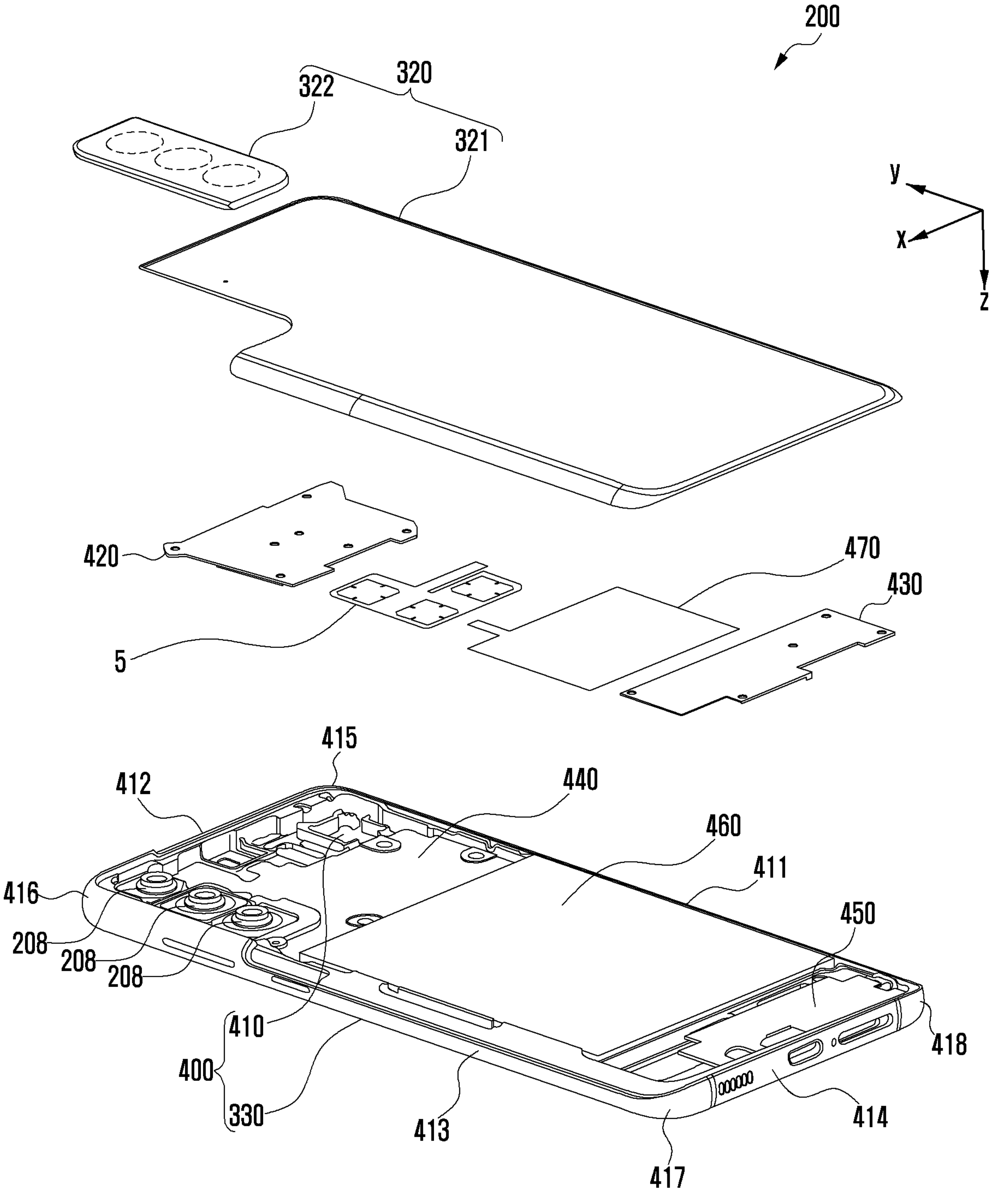
Figure 6:
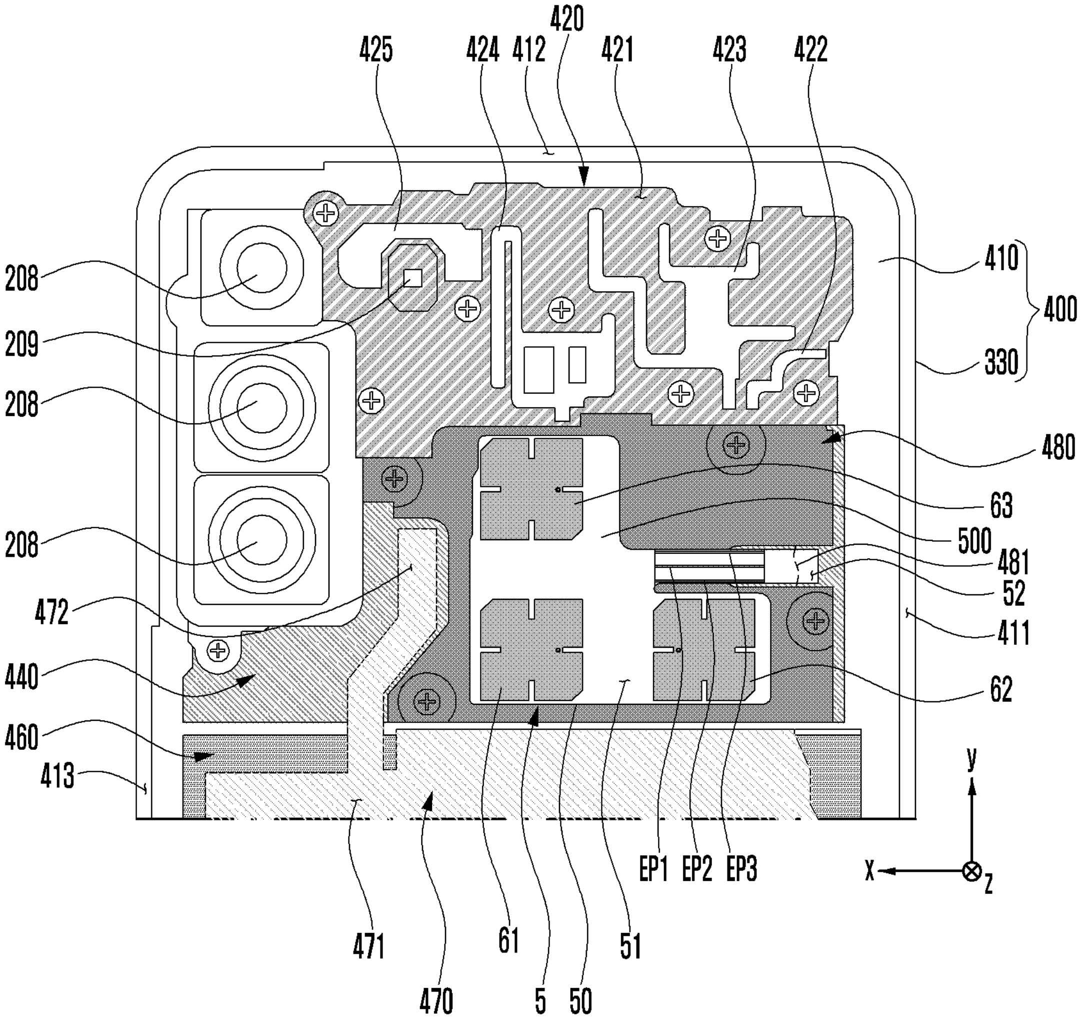
FIG. 6 is a diagram illustrating a part of an electronic device according to various embodiments.
Figure 7:
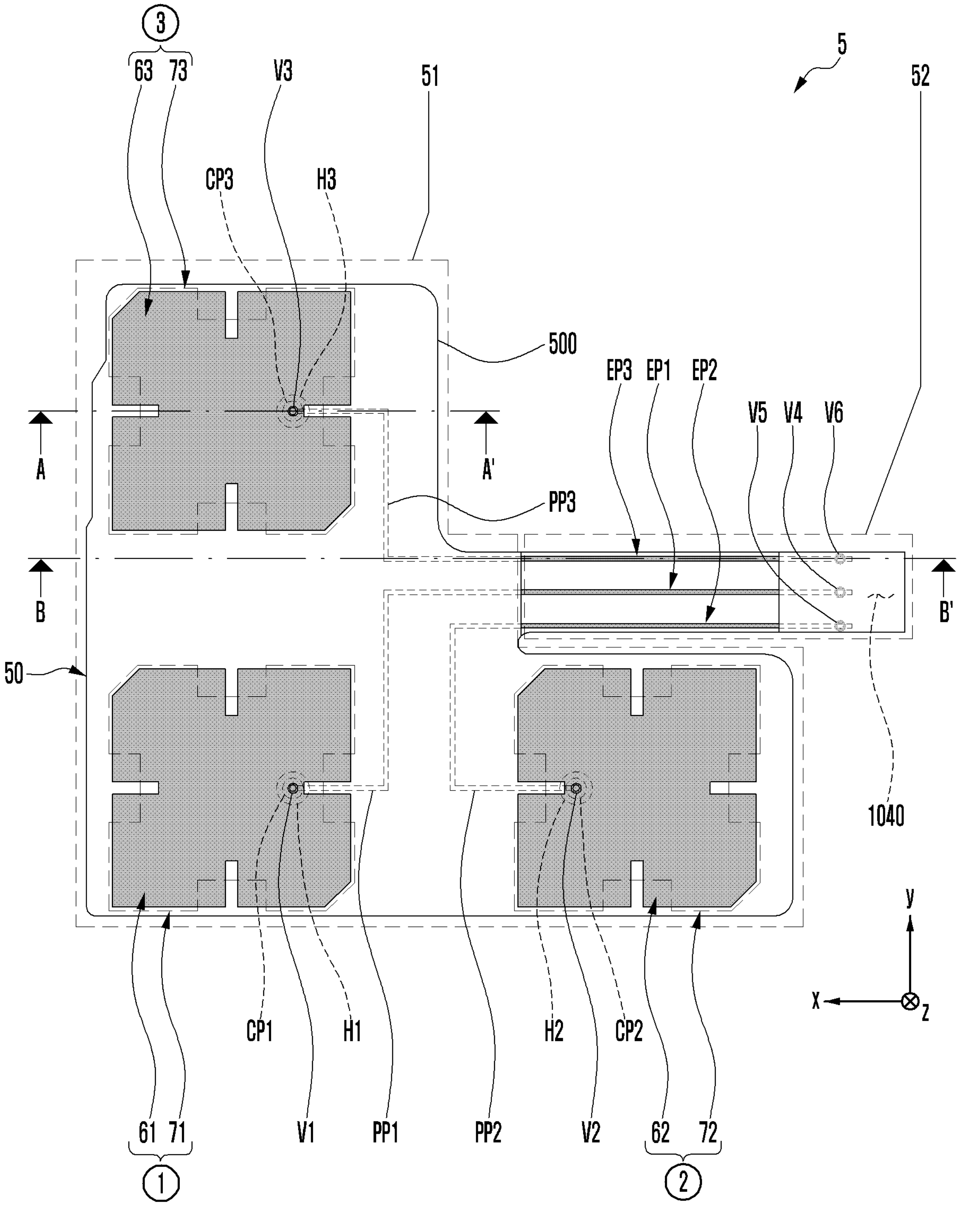
FIG. 7 is a diagram illustrating a second antenna structure according to various embodiments.

FIGS. 4 and 5 are exploded perspective views of an electronic device 200 of FIG. 2 according to various embodiments. FIG. 6 is a diagram illustrating a part of an electronic device 200 according to various embodiments. FIG. 7 a diagram illustrating a second antenna structure 5 according to various embodiments.

Referring to FIGS. 4, 5, 6, and 7, in an embodiment, the electronic device 200 may include a front plate 310, a rear plate 320, a bezel structure 330, a first support member 410, a second support member 420, a third support member 430, a display 201, a first substrate assembly 440, a second substrate assembly 450, a battery 460, a first antenna structure 470, and/or a second antenna structure 5. In an embodiment, the electronic device 200 may omit at least one of the elements or may additionally include other elements.

According to an embodiment, the bezel structure 330 (or a side member) may include a first bezel structure 411 (or a first side surface part), a second bezel structure 412 (or a second side surface part), a third bezel part 413 (or a third surface part), or a fourth bezel part 414 (or a fourth side surface part). The first bezel part 411 and the third bezel part 413 may be spaced apart from each other and extend in parallel to each other. The second bezel part 412 may connect one end of the first bezel part 411 to one end of the third bezel part 413. The fourth bezel part 414 may connect the other end of the first bezel part 411 to the other end of the third bezel part 413, and the fourth bezel part 414 and the second bezel part 412 may be spaced apart from each other and extend in parallel to each other. At least a part of a first corner part 415 connecting the first bezel part 411 and the second bezel part 412, a second corner part 416 connecting the second bezel part 412 and the third bezel part 413, a third corner part 417 connecting the third bezel part 413 and the fourth bezel part 414, and/or a fourth corner part 418 connecting the first bezel part 411 and the fourth bezel part 414 may be formed to have a circular shape. Each of the first bezel part 411 and the third bezel part 413 may have a first length extending in the y-axis direction, and each of the second bezel part 412 and the fourth bezel part 414 may have a second length which is shorter than the first length and extends in the x-axis direction. In an embodiment, the first length and the second length may be substantially identical to each other. The first support member 410 may be disposed in the electronic device 200 and connected to the bezel structure 330, or may be integrally formed with the bezel structure 330. The first support member 410 may be formed of, for example, a metal material and/or a non-metal material (e.g., polymer). In an embodiment, a conductive part included in the first support member 440 may function as an electromagnetic shield for the display 201, the first substrate assembly 440, and/or the second substrate assembly 450. The first support member 410 and the bezel structure 330 may be called a front case 400. The first support member 410 corresponds to a part of the front case 400, in which elements such as the display 201, the first substrate assembly 440, the second substrate assembly 450, and the battery 460 are arranged, and may contribute to durability and rigidity (e.g., torsional rigidity) of the electronic device 200. In an embodiment, the first support member 410 may be called a "bracket", a "mounting plate", or a "support structure". In an embodiment, the first support member 410 may be defined as a part of the housing 300 (see FIG. 2).

For example, the display 201 may be positioned between the first member 410 and the front plate 310 and disposed on one surface of the first support member 410. In an embodiment, the front plate 310 and the display 201 may be integrally formed. For example, the first substrate assembly 440 and the second substrate assembly 450 may be positioned between the first support member 410 and the rear plate 320, and disposed on the other surface of the first support member 410. For example, the battery 460 may be positioned between the first support member 410 and the rear plate 320, and disposed on the first support member 410.

According to an embodiment, the first substrate assembly 440 may include a first printed circuit board 441 (e.g., a printed circuit board (PCB) or a printed circuit board assembly (PBA). The first substrate assembly 440 may include various electronic components electrically connected to the first printed circuit board 441. The electronic components may be arranged on the first printed circuit board 441, and may be electrically connected to the first printed circuit board 441 through an electrical path such as a cable or a flexible printed circuit board (FPCB). Referring to FIGS. 2 and 3, the electronic components may include, for example, a second microphone included in the second audio module 203, a second speaker included in the fourth audio module 205, the sensor module 206, the first camera module 207, the multiple second camera modules 208, the light emitting module 209, or the input module 210.

According to an embodiment, when seen from above the front plate 310 (e.g., when seen in the −z axis direction), the second substrate assembly 450 and the first substrate assembly 440 may be spaced apart from each other by interposing the battery 460 therebetween. The second substrate assembly 450 may include a second printed circuit board 451 electrically connected to the first printed circuit board 441 of the first printed circuit 440. The second substrate assembly 450 may include various electronic components electrically connected to the second printed circuit board 451. The electronic components may be arranged on the second printed circuit board 451, or may be electrically connected to the second printed circuit board 451 through an electrical path such as a cable of an FPCB. Referring to FIGS. 2 and 3, the electronic components may include, for example, a first microphone included in the first audio module 202, a first speaker included in the third audio module 204, a first connector included in the first connection terminal module 211, or a second connector included in the second connection terminal module 212.

According to an embodiment, the first substrate assembly 440 or the second substrate assembly 450 may include a primary PCB (or a main PCB or a master PCB), a secondary PCB (or a slave PCB) disposed to overlap with the primary PCB, and/or an interposer substrate between the primary PCB and the secondary PCB.

The battery 460 corresponds to a device for supplying power to at least one element of the electronic device 200, and may include, for example, a primary cell which is not rechargeable, a secondary cell which is rechargeable, or a fuel cell. The battery 460 may be integrally formed in the electronic device 200, or may be detachably disposed to the electronic device 200.

According to an embodiment, the second support member 420 may be positioned between the first support member 410 and the rear plate 320, and may be coupled to the first support member 410 and/or the first substrate assembly 440 using a coupling element such as a bolt. At least a part of the first substrate assembly 440 may be positioned between the first support member 410 and the second support member 420, and the second support member 420 may cover and protect the first substrate assembly 440. When seen from above the rear plate 320 (when seen from the +z axis direction), the third support member 430 and the second support member 420 may be at least partially spaced apart from each other by interposing the battery 460 therebetween. The third support member 430 may be positioned between the first support member 410 and the rear plate 320, and may be coupled to the first support member 410 and/or the second substrate assembly 450 using a coupling element such as a bolt. At least a part of the second substrate assembly 450 may be positioned between the first support member 410 and the third support member 430, and the third support member 430 may cover and protect the second substrate assembly 450. The second support member 420 and/or the third support member 430 may be formed of a metal material and/or a non-metal material (e.g., polymer). In an embodiment, the second support member 420 may function as an electromagnetic shield for the first substrate assembly 440, and the third support member 430 may function as an electromagnetic shield for the second substrate assembly 450. In an embodiment, the second support member 420 and/or the third support member 430 may be called a rear case. In an embodiment, the second support member 420 and/or the third support member 430 may be defined as a part of the housing 300 (see FIG. 2).

In an embodiment, an integrated substrate assembly including the first substrate assembly 440 and the second substrate assembly 450 may be implemented. For example, when seen from above the rear plate 320 (e.g., when seen from above +z axis direction), the substrate assembly may include a first part and a second part, which are spaced apart from each other by interposing the battery 460 therebetween, and a third part extending between the battery 460 and the bezel structure 330 and connecting the first part and the second part. The third part may be substantially implemented to be rigid. In an embodiment, the third part may be substantially implemented to be flexible. In an embodiment, an integrated support member including the second support member 420 and the third support member 430 may be implemented.

According to an embodiment, the second support member 420 (e.g., a rear case) may include a non-conductive member 421 formed of a non-metal material (e.g., polymer) and/or multiple conductive patterns 422, 423, 424, and 425 arranged on the non-conductive member. For example, the conductive pattern 422, 423, 424, or 425 may be implemented by laser direct structuring (LDS). The LDS may correspond to, for example, a scheme of designing a pattern on the non-conductive member 421 using a laser and plating a conductive material such as copper or nickel on the pattern, so as to form a conductive pattern. The multiple conductive patterns 422, 423, 424, and 425 may be electrically connected to a wireless communication circuit (e.g., the wireless communication module 192 of FIG. 1) included in the first substrate assembly 440 so as to operate as an antenna radiator. In an embodiment, at least a part of a conductive part included in the bezel structure 330 may operate as an antenna radiator electrically connected to the wireless communication circuit. The wireless communication circuit may process a transmission signal or a reception signal in at least one selected or designated frequency band through at least one antenna radiator. The selected or designated frequency band may include at least one of, for example, a low band (LB) (about 600 MHz to about 1 GHz), a middle band (MB) (about 1 GHz to about 2.3 GHZ), a high band (HB) (about 2.3 GHz to about 2.7 GHZ), or an ultra-high band (UHB) (about 2.7 GHZ to about 6 GHZ). The designated frequency band may include various other frequency bands.

According to an embodiment, the first antenna structure 470 may be at least partially positioned between the battery 460 and the rear plate 320. The first antenna structure 470 may be implemented as, for example, a film type such as an FPCB. The first antenna structure 470 may include at least one conductive pattern utilized as a loop-type radiator. For example, the at least one conductive pattern may include a plane-type spiral conductive pattern (e.g., a plane coil or a pattern coil). The first antenna structure 470 may be disposed on, for example, the battery 460, and may include a first area 471 including a spiral conductive pattern and a second area 472 extending from the first area 471 and electrically connected to the first substrate assembly 440. The at least one conductive pattern included in the first antenna structure 470 may be electrically connected to a wireless communication circuit (or a wireless communication module) included in the first substrate assembly 440. For example, the at least one conductive pattern may be utilized for short-distance wireless communication such as a near-field communication (NFC). In another example, the at least one conductive pattern may be utilized for magnetic secure transmission (MST) for transmitting and/or receiving a magnetic signal. In an embodiment, the at least one conductive pattern included in the antenna structure 470 may be electrically connected to a power transmission/reception circuit included in the first substrate assembly 440. The power transmission/reception circuit may wirelessly receive power from an external electronic device using the at least one conductive pattern, or wireless transmit power to the external electronic device. The power transmission/reception circuit may include a power management module, and may include, for example, a power management integrated circuit (PMIC) or a charger integrated circuit (IC). The power transmission/reception circuit may charge the battery 460 using power wirelessly received using the conductive pattern.

According to an embodiment, the second antenna structure 5 may include a circuit substrate (a circuit board or substrate) 500, multiple first antenna elements 61, 62, and 63, and multiple second antenna elements 71, 72, and 73. The circuit substrate 500 may indicate an insulation material for allowing the conductive pattern (e.g., a copper clad pattern) such as the multiple first antenna elements 61, 62, and 63 and the multiple second elements 71, 72, and 73 to be disposed. In an embodiment, the second antenna structure 5 has a shape in which a circuit (e.g., a conductive pattern) is positioned on the circuit substrate 500 (e.g., an insulation substrate), and may include a printed circuit board (PCB) 50. The printed circuit board 50 of the second antenna structure may include, for example, a rigid printed circuit board (RPCB), a flexible printed circuit board (FPCB), or a rigid flexible printed circuit board (RFPCB).

According to an embodiment, the second antenna structure 5 may be at least partially positioned between the first substrate assembly 440 and the rear plate 320. In another example, the second antenna structure 5 may be positioned between the second support member 420 and the battery 460 when seen from above the rear plate 320 (when seen in the +2 axis direction). The second antenna structure 5 may be disposed to substantially not to overlap with the second support member 420, the first antenna structure 470, the battery 460, the multiple second camera modules 208, or the light-emitting module 209 when seen from above the rear plate 320. For example, the second antenna structure 5 may not substantially overlap with the multiple conductive patterns 422, 423, 424, and 425 of the second support member 420 or the conductive pattern of the first antenna structure 470 when seen from above the rear plate 320.

According to an embodiment, the electronic device 200 may include a cover member 480 (or a cover structure or a support structure) positioned between the first substrate assembly 440 and the rear plate 320. The cover member 480 may include metal and/or polymer, and may be coupled to the first substrate assembly 440 and/or the first support member 410 using a bolt. When seen from above the rear plate 320 (e.g., when seen in the +z direction), a part of the first substrate assembly 440 may overlap with the second support member 420, and another part of the second substrate assembly 440 may overlap with the cover member 480. The second support member 420 and the cover member 480 may be arranged not to hide the multiple second camera modules 208 using external light having passed through the rear plate 320 and the light emitting module 209 outputting light passing through the rear plate 320. In an embodiment, the second antenna structure 5 may be disposed to the cover member 480. For example, a polymer adhesive material may be positioned between the second antenna structure 5 and the cover member 480. The printed circuit board 50 of the antenna structure 5 may include a first part 51 including the multiple first antenna elements 61, 62, and 63 and the multiple second antenna elements 71, 72, and 73, and a second part 52 extending from the first part 51 and electrically connected to the first substrate assembly 440. The first part 51 of the printed circuit board 50 may be disposed to the cover member 480. The second part 52 of the printed circuit board 50 may be electrically connected to the first substrate assembly 440 through, for example, an opening 481 (e.g., a notch-type opening) of the cover member 480. In an embodiment, the second support member 420 and the cover member 480 may be integrally formed.

According to an embodiment, the printed circuit board 50 of the antenna structure 5 may include multiple conductive layers stacked thereon, the multiple conductive layers including at least one conductive pattern, and a dielectric (or an insulator) may be positioned between the multiple conductive layers. One or more conductive patterns included in the multiple conductive layers may be utilized as antenna radiators. The one or more conductive patterns included in the multiple conductive layers may be utilized as electrical paths (e.g., signal lines). The one or more conductive patterns included in the multiple conductive layers may be utilized as ground planes. A conductive pattern utilized as an antenna radiator may be called an "antenna element" or a "radiation pattern". A conductive pattern utilized as at least part of an electrical path may be called a "path pattern". A conductive pattern utilized as at least a part of a ground plane may be called a "ground pattern". The printed circuit board 50 may include multiple conductive vias. A conductive via may correspond to a conductive hole made to allow a connection wire for electrically connecting conductive patterns in different conductive layers to be disposed. A conductive via may include, for example, a plated through-hole (PTH), a laser via-hole (LVH), a buried via-hole (BVH), or a stacked via.

According to an embodiment, the multiple first antenna elements 61, 62, and 63 may include a first conductive layer (not shown) among the multiple conductive layers of the printed circuit board 50. The multiple second antenna elements 71, 72, and 73 may include a second conductive layer (not shown) that is different from the first conductive layer, among the multiple conductive layers of the printed circuit board 50. For example, when seen from above the rear plate 320 (when seen in the +z axis direction), the multiple first antenna elements 61, 62, and 63 may include substantially the same shape. For example, when seen from above the rear plate 320, the multiple second antenna elements 71, 72, and 73 may include substantially the same shape. When seen from above the rear plate 320, the multiple first antenna elements 61, 62, and 63 may be aligned with the multiple second antenna elements 71, 72, and 73 one-to-one and overlap with each other.

According to an embodiment, the antenna structure 5 may include a first antenna ① (or a first patch antenna), a second antenna ② (or a second patch antenna), and/or a third antenna ③ (or a third patch antenna). For example, the first antenna ① may include the first antenna elements 61 and the second antenna element 71 aligning and overlapping with each other when seen from above the rear plate 320. For example, the second antenna ② may include the first antenna elements 62 and the second antenna element 72 aligning and overlapping with each other when seen from above the rear plate 320. For example, the third antenna ③ may include the first antenna elements 63 and the second antenna element 73 aligning and overlapping with each other when seen from above the rear plate 320. In an embodiment, the first antenna ①, the second antenna ②, and the third antenna ③ may be included in and called as an antenna array (AR).

According to an embodiment, when a radiation current (or an electromagnetic signal) is provided to the first antenna ①, the first antenna ① may generate dual-band circular polarization. In an embodiment, the first antenna ① may include a feeding unit corresponding to a part into which the radiation current is fed. For example, a printed communication circuit (e.g., the wireless communication module 192 of FIG. 1) included in the first substrate assembly 440 may provide the radiation current to the feeding unit of the first antenna ①. The first antenna ① may emit the fed electromagnetic signal (e.g., a UWB signal) to the outside or may receive the electromagnetic signal from the outside. The second antenna ② may be implemented in the substantially same manner as the first antenna ① and operate. The third antenna ③ may be implemented in the substantially same manner as the first antenna ①) and operate.

According to an embodiment, the electronic device 200 may communicate with a signal source (e.g., a responder, a transmitter, or a Tx device) using an antenna array (AR). For example, the electronic device 200 may perform a positioning function (e.g., AOA) for a signal source (e.g., a responder, a transmitter, or a Tx device) using an antenna array (AR). In an embodiment, the antenna array (AR) may be disposed in an “L” shape. For example, according to the “L”-shaped disposition, the first antenna ① and the second antenna ② among the antenna array (AR) may be arranged to be spaced from each other in the x-axis direction, and the first antenna ① and the third antenna ③ among the antenna array (AR) may be arranged to be spaced from each other in the y-axis direction. A processor (e.g., the processor 120 of FIG. 1) may identify or estimate a first angle (e.g., a first signal reception angle) at which a signal is received with respect to a configured x axis of the electronic device 200, using a time different and a phase difference between signals received through the first antenna ① and the second antenna ② arranged in the x-axis direction. For example, the configured x axis of the electronic device 200 may be in a direction in which the second bezel part 412 and the fourth bezel part 414 of FIG. 5 extend in parallel to each other. The processor may identify or estimate a second angle (e.g., a second signal reception angle) at which a signal is received with respect to a configured y axis of the electronic device 200, using a time difference and a phase difference between signals received through the first antenna ① and the third antenna ③ arranged in the y-axis direction. For example, the configured y axis of the electronic device 200 may be in a direction in which the first bezel part 411 and the third bezel part 413 of FIG. 5 extend in parallel to each other. The processor may identify or estimate a direction of a signal source for the electronic device 200 using the first angle and the second angle. The electronic device 200 may identify or estimate a distance between the electronic device 200 and the signal source using a time difference between signals received through the antenna array (AR) and a phase difference due to the time difference. In an embodiment, when the first antenna ① and the second antenna ② are in a misalign state in the x-axis direction, or when the first antenna ① and the third antenna ③ are in a misalign state in the y-axis direction, in order to reduce a positioning recognition error, the electronic device 200 may be implemented to perform compensation by applying an offset value based on a misaligned distance between antennas. In an embodiment, the positions and the number of antennas included in the antenna array (AR) may not be limited to the illustrated example and there may be various positions and numbers of antennas. In an embodiment, the antenna array (AR) may be disposed in various shapes other than the illustrated “L” shape.

In an embodiment, the antenna structure 5 may include multiple antenna arrays which are formed in a manner at least partially similar to or substantially identical to that of the antenna array (AR). For example, the antenna structure 5 may include a printed circuit board (e.g., an RPCB, an FPCB, or an RFPCB) including a first antenna array and a second antenna array. In another example, the antenna structure 5 may include a printed circuit board (e.g., an RPCB, an FPCB, or an RFPCB) including a first antenna array, a second antenna array, and a third antenna array. The first antenna array and the second antenna array may be arranged in a first direction, and the first antenna array and the third antenna array may be arranged in a second direction different from the first direction. In an embodiment, the first direction may correspond to an x-axis direction, and the second direction may correspond to a y-axis direction. In another example, the antenna structure 5 may include a printed circuit board (e.g., an RPCB, an FPCB, or an RFPCB) including three or more antenna arrays.

In an embodiment, the antenna structure 5 may further include another antenna array (not shown) which transmits and/or receives a signal of a frequency band that is at least partially different from that of a signal transmitted and/or received by the antenna array (AR).

According to an embodiment, when a positioning function (e.g., AOA) for a signal source may not be implemented, or a design is made to include an antenna, the antenna structure 5 may be formed to include one antenna.

According to an embodiment, the electronic device 200 may further include at least one another antenna structure that is substantially at least partially identical to the antenna structure 5. For example, the antenna structure 5 and the at least another antenna structure may be arranged in the x-axis direction or the y-axis direction. For example, the antenna structure 5 and one antenna structure may be arranged in the x-axis direction, and the antenna structure 5 and the other antenna structure may be arranged in the y-axis direction. In an embodiment, the antenna structure 5 and the at least one another antenna structure may be implemented as an integrated printed circuit board (e.g., an RPCB, an FPCB, or an RFPCB). In an embodiment, when the antenna structure 5 and the at least one another antenna structure is implemented as a PCB, one connector 1040 may be formed, or connectors corresponding to the antenna structure 5 and the at least one antenna structure may be formed, respectively.

In an embodiment, a wireless communication circuit (e.g., the wireless communication module 192 of FIG. 1) may be configured to communicatively transmit and/or receive a signal of at least one selected or designated frequency band through an antenna (e.g., the first antenna ①, the second antenna ②, or the third antenna ③. For example, the wireless communication circuit may be configured to communicatively transmit and/or receive a first signal (or a first frequency signal) of a first frequency and a second signal (or a second frequency signal) of a second frequency different from the first frequency through an antenna (e.g., the first antenna ①), the second antenna ②, or the third antenna ③. In an embodiment, the multiple first antenna elements 61, 62, and 63 may have a first resonance frequency corresponding to the first signal, and the multiple second antenna elements 71, 72, and 73 may have a second resonance frequency corresponding to the second signal. For example, the frequency of the first signal may be about 8 GHZ, and the frequency of the second signal may be about 6.5 GHZ.

According to an embodiment, the multiple first antenna elements 61, 62, and 63 may be formed to have an electrical length (e.g., a length indicated in a wavelength ratio) corresponding to a length of ½ of a wavelength (a half wavelength) of a signal of a first frequency (e.g., about 8 GHZ) transmitted from a signal source. In an embodiment, the multiple second antenna elements 71, 72, and 73 may be formed to have an electrical length corresponding to a length of ½ of a wavelength (a half wavelength) of a signal of a second frequency (e.g., about 6.5 GHZ) transmitted from a signal source. In an embodiment, the multiple first antenna elements 61, 62, and 63 or the multiple second antenna elements 71, 72, and 73 may be formed to have an electrical length corresponding to a length of ¼ of a wavelength of a signal transmitted from a signal source.

According to an embodiment, the printed circuit board 50 of the second antenna structure 5 may include a first path pattern PP1, a second path pattern PP2, or a third path pattern PP3. The first path pattern PP1, the second path pattern PP2, or the third path pattern PP3 may be included in a first conductive layer (not shown) including the multiple first antenna elements 61, 62, and 63 of multiple conductive layers of the printed circuit board 50, and a third conductive layer (not shown) including the multiple second antenna elements 71, 72, and 73 among the multiple conductive layers of the printed circuit board 50, the third conductive layer being different from a second conductive layer (not shown). The second antenna structure 5 may include a connector 1040 disposed in the second part 52 of the printed circuit board 50. The first path pattern (or a first signal line pattern) PP1 may be electrically connected to the first antenna element 61 of the first antenna ① through a first conductive via V1 of the printed circuit board 50. The first path pattern PP1 may be electrically connected to the connector 1040 through a fourth conductive via V4 of the printed circuit board 50. The second path pattern (or a second signal line pattern) PP2 may be electrically connected to the first antenna element 62 of the second antenna ② through a second conductive via V2 of the printed circuit board 50. The second path pattern PP2 may be electrically connected to the connector 1040 through a fifth conductive via V5 of the printed circuit board 50. The third path pattern (or a third signal line pattern) PP3 may be electrically connected to the first antenna element 63 of the third antenna ③ through a third conductive via V3 of the printed circuit board 50. The third path pattern PP3 may be electrically connected to the connector 104 through a sixth conductive via V6 of the printed circuit board 50. A first electrical path (EP1) including the first path pattern PP1, the first conductive via V1, and the fourth conductive via V4 may form a first signal line which connects the first antenna element 61 of the first antenna ① to the connector 1040. A second electrical path (EP2) including the second path pattern PP2, the second conductive via V2, and the fifth conductive via V5 may form a second signal line which connects the first antenna element 62 of the second antenna ② to the connector 1040. A third electrical path (EP3) including the third path pattern PP3, the third conductive via V3, and the sixth conductive via V6 may form a third signal line which connects the first antenna element 63 of the third antenna ③ to the connector 1040. The wireless communication circuit (e.g., the wireless communication module 192 of FIG. 1) included in the first substrate assembly 440 may provide a radiation current (an electromagnetic signal) to the first antenna element 61 of the first antenna ① through the first electrical path (EP1), and the first antenna element 61 may emit a radio wave. The first antenna element 61 of the first antenna ① may emit an electromagnetic signal fed through the first electrical path (EP1) (e.g., a first feeding line) to the outside or receive an electromagnetic signal from the outside. The wireless communication circuit included in the first substrate assembly 440 may provide a radiation current (or an electromagnetic signal) to the first antenna element 62 of the second antenna ② through the second electrical path (EP2), and the first antenna element 62 of the second antenna ② may emit a radio wave. The first antenna element 62 of the second antenna ② may emit an electromagnetic signal fed through the second electrical path (EP2) (e.g., a second feeding line) to the outside, or receive an electromagnetic signal from the outside. The wireless communication circuit included in the first substrate assembly 440 may provide a radiation current (or an electromagnetic signal) to the first antenna element 63 of the third antenna ③ through the third electrical path (EP3), and the first antenna element 63 of the third antenna ③ may emit a radio wave. The first antenna element 63 of the third antenna ③ may emit an electromagnetic signal fed through the third electrical path (EP3) (e.g., a third feeding line) to the outside, or may receive an electromagnetic signal from the outside.

According to an embodiment, the second antenna element 72 of the first antenna ① may include a first hole H1 (or a first opening). In an embodiment, the first conductive via V1 may be positioned to extend through the first hole H1. The second conductive layer (not shown) including the second antenna element 71 of the first antenna ①, among the multiple conductive layers of the printed circuit board 50 may include a first coupling conductive pattern CP1 positioned through the first hole H1. The first coupling conductive pattern CP1 may be physically separated from the second antenna element 71 of the first antenna ①. The first conductive via V1 may electrically connect the first antenna element 61 of the first antenna ① included in the first conductive layer, the first coupling conductive pattern CP1 included in the second conductive layer, and the first path pattern PP1 included in the third conductive layer. In an embodiment, due to electromagnetic coupling between the first coupling conductive pattern CP1 and the second antenna element 71 of the first antenna ①, the second antenna element 71 may be indirectly fed. The second antenna element 71 of the first antenna ① may emit an indirectly fed electromagnetic signal to the outside, or receive an electromagnetic signal from the outside. The first coupling conductive pattern CP1 and the second antenna element 71 of the first antenna ① may be positioned to be spaced apart from each other by a corresponding distance so as to be electromagnetically coupled to each other, based on a wavelength corresponding to a resonance frequency of the second antenna element 71. For example, the first coupling conductive pattern CP1 and the second antenna element 71 of the first antenna ① may be positioned to be spaced apart from each other by a distance of about 0.2 mm to about 0.5 mm. The first coupling conductive pattern CP1 corresponds to an element which allows the second antenna element 71 of the first antenna ①) to be fed in an electromagnetic coupling scheme, and may be called various other terms such as a "feeding conductive pattern". The first coupling conductive pattern CP1 may be called as a part of the first electrical path EP1, and in an embodiment, due to electromagnetic coupling between the second antenna element 71 of the first antenna ①) and the first electrical path EP1, the second antenna element 71 may be indirectly fed.

According to an embodiment, the second antenna element 72 of the second antenna ② may include a second hole H2 (or a second opening). In an embodiment, the second conductive via V2 may be positioned to extend through the second hole H2. The second conductive layer (not shown) included in the second antenna element 72 of the second antenna ②, among the multiple conductive layers of the printed circuit board 50 may include a second coupling conductive pattern CP2 positioned through the second hole H2. The second coupling conductive pattern CP2 may be physically separated from the second antenna element 72 of the second antenna ②. The second conductive via V2 may be electrically connected to the first antenna element 62 of the second antenna ② included in the first conductive layer, the second coupling conductive pattern CP2 included in the second conductive layer, and the second path pattern PP2 included in the third conductive layer. In an embodiment, due to electromagnetic coupling between the second coupling conductive pattern CP2 and the second antenna element 72 of the second antenna ②, the second antenna element 72 may be indirectly fed. The second antenna element 72 of the second antenna ② may emit an indirectly fed electromagnetic signal to the outside, or receive an electromagnetic signal from the outside. The second coupling conductive pattern CP2 may be called as a part of the second electrical path EP2, and in an embodiment, due to electromagnetic coupling between the second antenna element 72 of the second antenna ② and the second electrical path EP2, the second antenna element 72 may be indirectly fed.

According to an embodiment, the second antenna element 73 of the third antenna ③ may include a third hole H3 (or a third opening). The third conductive via V3 may be positioned to extend through the third hole H3. The second conductive layer (not shown) included in the second antenna element 73 of the third antenna ③, among the multiple conductive layers of the printed circuit board 50, may include a third coupling conductive pattern CP3 positioned through the third hole H3. The third coupling conductive pattern CP3 may be physically separated from the second antenna element 73 of the third antenna ③. The third conductive via V3 may be electrically connected to the first antenna element 63 of the third antenna ③ included in the first conductive layer, the third coupling conductive pattern CP3 included in the second conductive layer, and the third path pattern PP3 included in the third conductive layer. In an embodiment, due to electromagnetic coupling between the third coupling conductive pattern CP3 and the second antenna element 73 of the third antenna ③, the second antenna element 73 may be indirectly fed. The second antenna element 73 of the third antenna ③ may emit an indirectly fed electromagnetic signal to the outside, or receive an electromagnetic signal from the outside. The third coupling conductive pattern CP3 may be called as a part of the third conductive path EP3, and in an embodiment, due to electromagnetic coupling between the second antenna element 73 of the third antenna ③ and the third electrical path EP3, the second antenna element 73 may be indirectly fed.

According to an embodiment, the first hole H1 may be a circle having a radius when seen from above the rear plate 320 (e.g., when seen in the +z axis-direction). For example, the first coupling conductive pattern CP1 may be a circular corresponding to the circular first hole H1 when seen from above the rear plate 320. When seen from above the rear plate 320, a circular slot may be formed between the first coupling conductive pattern CP1 and the second antenna element 71 of the first antenna ①. In an embodiment, the first hole H1 or the first coupling conductive pattern CP1 corresponding to the first hole H1 may not be limited to the illustrated example, and may have various other shapes (e.g., an oval shape or a polygonal shape). For example, the first hole H1 may have a circular shape, an oval shape, or a polygonal shape, and the first coupling conductive pattern CP1 may have a circular shape, an oval shape, or a polygonal shape. The second hole H2 or the third hole H3 may be formed to have substantially the same shape as the first hole H1. The second coupling conductive pattern CP2 or the third coupling conductive pattern CP3 may be formed to have substantially the same shape as the first coupling conductive pattern CP1.

According to an embodiment, the second antenna element 71 of the first antenna ① may be implemented to be indirectly fed by the first conductive via V1 without the first coupling conductive pattern CP1. In the same manner, the second antenna element 72 of second antenna ② may be implemented to be indirectly fed by the second conductive via V2 without the second coupling conductive pattern CP2. In the same manner, the second antenna element 73 of the third antenna ③ may be implemented to be indirectly fed by the third conductive via V3 without the third coupling conductive pattern CP3.

According to an embodiment, the first coupling conductive pattern CP1 may be defined as a part of the first conductive via V1 or a part of a first via structure for the first conductive via V1, and in this case, the second antenna element 71 of the first antenna ① may be indirectly fed by the first conductive via V1. In the same manner, the second coupling conductive pattern CP2 may be defined as a part of the second conductive via V2 or a part of a second via structure for the second conductive via V2, and in this case, the second antenna element 72 of the second antenna ② may be indirectly fed by the second conductive via V2. In the same manner, the third coupling conductive pattern CP3 may be defined as a part of the third conductive via V3 or as a part of a third via structure for the third conductive via V3, and in this case, the second antenna element 73 of the third antenna ③ may be indirectly fed by the third conductive via V3.

Figure 8:
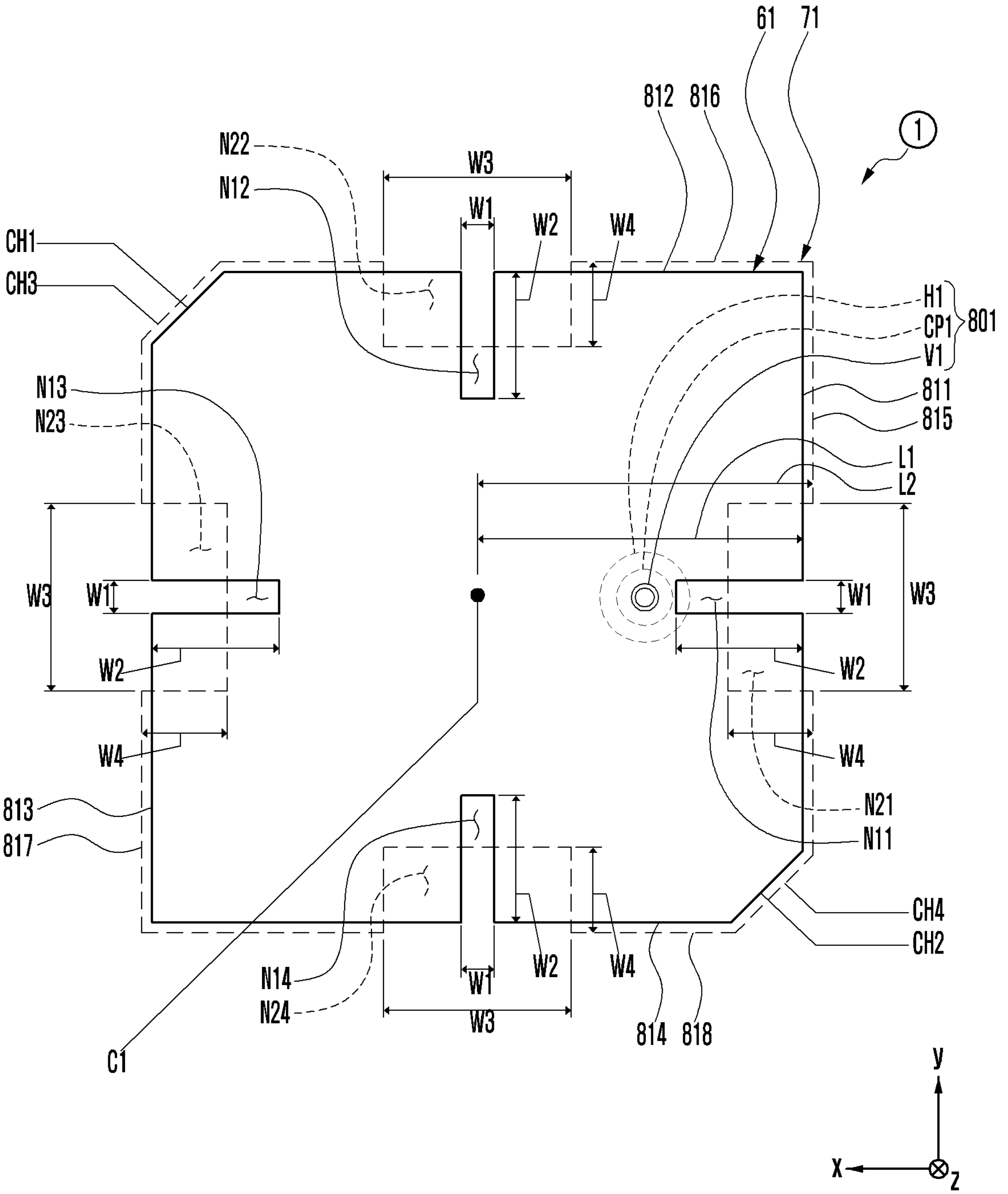
FIG. 8 is a diagram illustrating a first antenna including a first antenna element and a second antenna element according to various embodiments.

FIG. 8 is a diagram illustrating a first antenna ① including a first antenna element 61 and a second antenna element 71 according to various embodiments.

Referring to FIG. 8, in an embodiment, when seen on an x-y plane (e.g., when seen in the +z axis direction in FIG. 5), the first antenna element 61 of the first antenna ① may include a first border 811, a second border 812, a third border 813, or a fourth border 814. For example, the first border 811 and the third border 813 may be positioned to be spaced from each other and substantially extend in parallel to each other in the x-axis direction. For example, the second border 812 and the fourth border 814 may be positioned to be spaced from each other and substantially extend in parallel to each other in the y-axis direction. The first border 811 and the third border 813 may be substantially perpendicular to the second border 812 and the fourth border 814. In an embodiment, the distance between the first border 811 and the third border 813 may be substantially identical to the distance between the second border 812 and the fourth border 814. In an embodiment, the first antenna element 61 of the first antenna ① may include multiple first notches (or slits) N11, N12, N13, and N14. The multiple first notches N11, N12, N13, and N14 may include a (1-1)th notch N11 formed on the first border 811, a (1-2)th notch N12 formed on the second border 812, a (1-3)th notch N13 formed on the third border 813, and a (1-4)th notch N14 formed on the fourth border 814. In an embodiment, the multiple first notches N11, N12, N13, and N14 may include substantially the same rectangular shape. The (1-1)$^{th}$ notch N11 formed on the first border 811 corresponds to a recessed opening on the first border 811, and may have a first width W1 formed in the y-axis direction and a second width W2 formed in the x-axis direction. The (1-2)$^{th}$ notch N12 formed on the second border 812 corresponds to a recessed opening on the second border 812, and may have a first width W1 formed in the x-axis direction and a second width W2 formed in the y-axis direction. The (1-3)$^{th}$ notch N13 formed on the third border 813 corresponds to a recessed opening on the third border 813, and may have a first width W1 formed in the y-axis direction and a second width W2 formed in the x-axis direction. The (1-4)$^{th}$ notch N14 formed on the fourth border 814 corresponds to a recessed opening on the fourth border 814, and may have a first width W1 formed in the x-axis direction and a second width W2 formed in the y-axis direction. In an embodiment, the (1-1)$^{th}$ notch N11 formed on the first border 811 and the (1-3)$^{th}$ notch N13 formed on the third border 813 may be formed to be substantially symmetrical to each other with reference to the center C1 of the first antenna element 61 when seen from the x-y plane. The center C1 may indicate, for example, a point on the first antenna element 61, which has substantially the same distance from the first border 811, the second border 812, the third border 813, and the fourth border 814. In an embodiment, the (1-2)$^{th}$ notch N12 formed on the second border 812 and the (1-4)$^{th}$ notch N14 formed on the fourth border 814 may be formed to be substantially symmetrical to each other with reference to the center C1 of the first antenna element 61 when seen from the x-y plane. In an embodiment, the multiple first notches N11, N12, N13, and N14 may be arranged substantially at a 90-degree angle with reference to the center C1 of the first antenna element 61 when seen from the x-y plane.

According to an embodiment, when seen on the x-y plane (e.g., when seen in the + % axis direction in FIG. 5), the second antenna element 71 of the first antenna ① may include may include a fifth border 815, a sixth border 816, a seventh border 817, or an eighth border 818. For example, the fifth border 815 and the seventh border 817 may be positioned to be spaced from each other and substantially extend in parallel to each other in the x-axis direction. For example, the sixth border 816 and the eighth border 818 may be positioned to be spaced from each other and substantially extend in parallel to each other in the y-axis direction. In an embodiment, when seen on the x-y plane, the fifth border 815, the sixth border 816, the seventh border 817, and the eighth border 818 may be positioned to be spaced apart from each other by substantially the same distance with reference to the center C1 of the first antenna element 61. For example, the distance between the fifth border 815 and the seventh border 817 may be substantially identical to the distance between the sixth border 816 and the eighth border 818. In an embodiment, the second antenna element 71 of the first antenna ① may include multiple second notches (or second slits) N21, N22, N23, and N24. The multiple second notches N21, N22, N23, and N24 may include a (2-1)$^{th}$ notch N21 formed on the fifth border 815, a (2-2)$^{th}$ notch N22 formed on the sixth border 816, a (2-3)$^{th}$ notch N23 formed on the seventh border 817, and a (2-4)$^{th}$ notch N24 formed on the eighth border 818. In an embodiment, the multiple second notches N21, N22, N23, and N24 may include substantially the same rectangular shape. The (2-1)$^{th}$ notch N21 formed on the fifth border 815 corresponds to a recessed opening on the fifth border 815, and may have a third width W3 formed in the y-axis direction and a fourth width W4 formed in the x-axis direction. The (2-2)$^{th}$ notch N22 formed on the sixth border 816 corresponds to a recessed opening on the sixth border 816, and may have a third width W3 formed in the x-axis direction and a fourth width W4 formed in the y-axis direction. The (2-3)$^{th}$ notch N23 formed on the seventh border 817 corresponds to a recessed opening on the seventh border 817, and may have a third width W3 formed in the y-axis direction and a fourth width W4 formed in the x-axis direction. The (2-4)$^{th}$ notch N24 formed on the eighth border 818 corresponds to a recessed opening on the eighth border 818, and may have a third width W3 formed in the x-axis direction and a fourth width W4 formed in the y-axis direction. In an embodiment, the (2-1)$^{th}$ notch N21 formed on the fifth border 815 and the (2-3)$^{th}$ notch N23 formed on the seventh border 817 may be formed to be substantially symmetrical to each other with reference to the center C1 of the first antenna element 61 when seen from the x-y plane. In an embodiment, the (2-2)$^{th}$ notch N22 formed on the sixth border 816 and the (2-4)$^{th}$ notch N24 formed on the eighth border 818 may be formed to be substantially symmetrical to each other with reference to the center C1 of the first antenna element 61 when seen from the x-y plane. In an embodiment, the multiple second notches N21, N22, N23, and N24 may be arranged substantially at a 90-degree angle with reference to the center C1 of the first antenna element 61 when seen from the x-y plane. For example, the center of the second antenna element 71 may substantially overlap with the center C1 of the first antenna element 61 when seen on the x-y plane.

According to an embodiment, when seen on the x-y plane (e.g., when seen in the + % axis direction in FIG. 5), the first border 811, the second border 812, the third border 813, or the fourth border 814 of the first antenna element 61 included in the first antenna ① may be positioned to be spaced apart from the center C1 of the first antenna element 61 by a first distance L1. When seen on the x-y plane, the fifth border 815, the sixth border 816, the seventh border 817, or the eighth border 818 of the second antenna element 71 included in the first antenna ① may be positioned to be spaced apart from the center C1 of the first antenna element 61 by a second distance L2 that is greater than the first distance L1. In an embodiment, the first distance L1 and the second distance L2 may be implemented to be substantially identical to each other. In an embodiment, the first distance L1 may be implemented to be greater than the second distance L2.

According to an embodiment, when seen on the x-y plane (e.g., when seen in the + % axis direction in FIG. 5), the multiple first notches N11, N12, N13, and N14 overlap with the multiple second notches N21, N22, N23, and N24 one-to-one. In an embodiment, a structure in which when seen from the x-y plane, the multiple first notches N11, N12, N13, and N14 overlap with the multiple second notches N21, N22, N23, and N24 one-to-one may contribute so that the multiple first antenna elements 61, 62, and 63 and the multiple second antenna elements 71, 72, and 73 can be divided and used for each use frequency. In an embodiment, a structure in which when seen from the x-y plane, the multiple first notches N11, N12, N13, and N14 overlap with the multiple second notches N21, N22, N23, and N24 one-to-one may contribute so that an internal electric field of the second antenna structure 5 forms both a transverse magnetic (TM) 01 mode and a TM10 mode each corresponding to a basic mode of a patch antenna.

According to an embodiment, according to the shapes of the multiple first notches N11, N12, N13, and N14, a resonance characteristic (e.g., a response frequency) of the first antenna element 61 included in the first antenna ① may vary. For example, according to the first width W1 or the second width W2, a resonance characteristic (e.g., a response frequency) of the first antenna element 61 included in the first antenna ① may vary. In an embodiment, according to the shapes of the multiple second notches N21, N22, N23, and N24, a resonance characteristic (e.g., a response frequency) of the second antenna element 71 included in the first antenna ① may vary. For example, according to the third width W3 or the fourth width W4, a resonance characteristic (e.g., a response frequency) of the second antenna element 71 included in the first antenna ① may vary.

According to an embodiment, the multiple first notches N11, N12, N13, and N14 may have different shapes from those of the multiple second notches N21, N22, N23, and N24, and accordingly, a resonance frequency of the first antenna element 61 included in the first antenna ① may be different from a resonance frequency of the second antenna element 71 included in the first antenna ①. As shown in FIG. 8, the first width W1 may be different from the third width W3, and the second width W2 may be different from the fourth width W4. In an embodiment, the first width W1 may be smaller than the third width W3, and the second width W2 may be greater than the fourth width W4. For example, the first width W1 may have a value equal to or lower than about 0.5 mm, and the third width W3 may have a value equal to or lower than about 5 mm greater than the first width W1. In an embodiment, the first width W1 and the third width W3 may be substantially identical to each other, and the second width W2 and the fourth width W4 may be different from each other. In an embodiment, the first width W1 and the third width W3 may be different from each other, and the second width W2 and the fourth width W4 may be substantially identical to each other.

According to an embodiment, the shapes of the multiple first notches N11, N12, N13, and N14 or the shapes of the multiple second notches N21, N22, N23, and N24 may not be limited to the illustrated rectangular shape, and may be implemented in various different shapes. In an embodiment, the shapes of the multiple first notches N11, N12, N13, and N14 or the shapes of the multiple second notches N21, N22, N23, and N24 may include a shape in which both sides are symmetrical to each other, for example, an isosceles trapezoid or a circular shape.

According to an embodiment, the first antenna element 61 of the first antenna ① may include, when seen on the x-y plane (e.g., when seen in the +z axis direction in FIG. 5), a first chamfer CH1 formed at a part at which the second border 812 and the third border 813 are connected. The first chamfer CH1 may indicate a diagonal border for connecting the second border 812 and the third border 813. The first antenna element 61 of the first antenna ① may include, when seen on the x-y plane, a second chamfer CH2 formed at a part at which the first border 811 and the fourth border 814 are connected. The second chamfer CH2 may indicate a diagonal border for connecting the first border 811 and the fourth border 814. In an embodiment, the first chamfer CH1 may be called a first truncated corner, and the second chamfer CH2 may be called a second truncated corner. In an embodiment, the first chamfer CH1 and the second chamfer CH2 may be formed to be substantially symmetrical to each other with reference to the center C1 of the first antenna element 61. For example, the first chamfer CH1 may form a first angle of about 45 degrees with respect to the second border 812 or the third border 813, and the second chamfer CH2 may form a second angle of about 45 degrees with respect to the first border 811 or the fourth border 814. In an embodiment, the first antenna element 61 of the first antenna ① may substantially form circular polarization by the first chamfer CH1 and the second chamfer CH2. The first chamfer CH1 and the second chamfer CH2 formed at two corners, respectively, the two corners being positioned at opposite sides in a diagonal direction, may contribute so that the first antenna element 61 of the first antenna ① may form circular polarization. In an embodiment, the first angle and the second angle may be formed as an angle that is different from that in the illustrated example.

According to an embodiment, the second antenna element 71 of the first antenna ①) may include, when seen on the x-y plane (e.g., when seen in the +z axis direction in FIG. 5), a third chamfer CH3 formed at a part at which the sixth border 816 and the seventh border 817 are connected. The third chamfer CH3 may indicate a diagonal border for connecting the sixth border 816 and the seventh border 817. The second antenna element 71 of the first antenna ① may include, when seen on the x-y plane, a fourth chamfer CH4 formed at a part at which the fifth border 815 and the eighth border 818 are connected. The fourth chamfer CH4 may indicate a diagonal border for connecting the fifth border 815 and the eighth border 818. In an embodiment, the third chamfer CH3 may be called a third truncated corner, and the fourth chamfer CH4 may be called a fourth truncated corner. In an embodiment, the third chamfer CH3 and the fourth chamfer CH4 may be formed to be substantially symmetrical to each other with reference to the center C1 of the first antenna element 61. In an embodiment, the first chamfer CH1 and the third chamfer CH3 may be substantially parallel to each other, and the second chamfer CH2 and the fourth chamfer CH4 may be substantially parallel to each other. For example, the third chamfer CH3 may form a first angle of about 45 degrees with respect to the sixth border 816 or the seventh border 817, and the fourth chamfer CH4 may form a second angle of about 45 degrees with respect to the fifth border 815 or the eighth border 818. When seen on the x-y plane, the third chamfer CH3 may be formed not to overlap with the first chamfer CH1, or in an embodiment, may be formed to overlap with the first chamfer CH1. When seen on the x-y plane, the fourth chamfer CH4 may be formed not to overlap with the second chamfer CH2, or in an embodiment, may be formed to overlap with the second chamfer CH2. In an embodiment, the second antenna element 71 of the first antenna ① may substantially form circular polarization by the third chamfer CH3 and the fourth chamfer CH4. The third chamfer CH3 and the fourth chamfer CH4 formed at two corners, respectively, the two corners being positioned at opposite sides in a diagonal direction, may contribute so that the second antenna element 71 of the first antenna ① may form circular polarization.

According to an embodiment, a first feeding structure 801 including the first hole H1, the first coupling conductive pattern CP1, and the first conductive via V1 of the first antenna element 61 included in the first antenna ① may be positioned between the center C1 of the first antenna element 61 and the (1-1)$^{th}$ notch N11 formed on the first border 811 when seen from the x-y plane (e.g., when seen in the +z axis direction in FIG. 5). In an embodiment, the first feeding structure 801 may be closer to the (1-1)$^{th}$ notch N11 than the center C1 of the first antenna element 61. When the first feeding structure 801 is formed to be closer to the (1-1)$^{th}$ notch N11 than the center C1 of the first antenna element 61, the second antenna structure 5 may have impedance reducing a power loss in a dual band. In an embodiment, the first conductive via V1 may be positioned to be spaced apart from the center C1 of the first antenna element 61 by about 3 mm when seen on the x-y plane. In an embodiment, the (2-1)$^{th}$ N21 formed on the fifth border 815 may not substantially overlap with the first feeding structure 801 when seen on the x-y plane.

According to an embodiment, the first antenna element 62 and the second antenna element 72 of the second antenna ② may be formed in substantially the same manner as the first antenna element 61 and the second antenna element 71 included in the first antenna ① according to an embodiment of FIG. 7, and for example, may be implemented to include the multiple borders 811, 812, 813, 814, 815, 816, 817, and 818, the multiple first notches N11, N12, N13, and N14, the multiple second notches N21, N22, N23, and N24, and the multiple chamfers CH1, CH2, CH3, and CH4. In an embodiment (see FIG. 7), when seen on the x-y plane (e.g., when seen in the +z axis direction in FIG. 5), a second feeding structure including the second hole H2, the second coupling conductive pattern CP2, and the second conductive via V2 of the first antenna element 62 included in the second antenna ② may be positioned between the center of the first antenna element 62 and the (1-3)$^{th}$ notch N11 formed on the third border 813. For example, the second feeding structure may be closer to the first notch N11 formed on the third border 813 than the center of the first antenna element 62 included in the second antenna ②.

According to an embodiment, the first antenna element 63 and the second antenna element 73 included in the third antenna ③ may be formed in substantially the same manner as the first antenna element 61 and the second antenna element 71 included in the first antenna ① according to an embodiment of FIG. 7, and for example, may be implemented to include the multiple borders 811, 812, 813, 814, 815, 816, 817, and 818, the multiple first notches N11, N12, N13, and N14, the multiple second notches N21, N22, N23, and N24, and the multiple chamfers CH1, CH2, CH3, and CH4. In an embodiment (see FIG. 7), when seen on the x-y plane (e.g., when seen in the +z axis direction in FIG. 5), a third feeding structure including the third hole H3, the third coupling conductive pattern CP3, and the third conductive via V3 of the first antenna element 63 included in the third antenna ③ may be positioned between the center of the first antenna element 63 and the first notch N11 formed on the first border 811. For example, the third feeding structure may be closer to the first notch N11 formed on the first border 811 than the center of the first antenna element 63 included in the third antenna ③.

According to an embodiment, when seen on the x-y plane (e.g., when seen in the +z axis direction in FIG. 5), the distance between centers of two first antenna elements 61 and 62 (see FIG. 7) arranged in the x-axis direction, or the distance between centers of two first antenna elements 61 and 63 (see FIG. 7) arranged in the y-axis direction may be formed as a ½ length (a half wavelength) or a ¼ length of a wavelength of a first frequency signal transmitted from a signal source. In an embodiment, when seen on the x-y plane, the distance between centers of two second antenna elements 71 and 72 (see FIG. 7) arranged in the x-axis direction, or the distance between two second antenna elements 71 and 73 (see FIG. 7) arranged in the y-axis direction may be formed as a ½ length (a half wavelength) or a ¼ length of a wavelength of a second frequency signal transmitted from a signal source. For example, when seen on the x-y plane, the distance between centers of two first antenna elements 61 and 62 (see FIG. 7) arranged in the x-axis direction, the distance between centers of two first antenna elements 61 and 63 (see FIG. 7) arranged in the y-axis direction, the distance between centers of two second antenna elements 71 and 72 arranged in the x-axis direction, or the distance between two second antenna elements 71 and 73 (see FIG. 7) arranged in the y-axis direction may be about 12 mm to about 20 mm.

Figure 9:
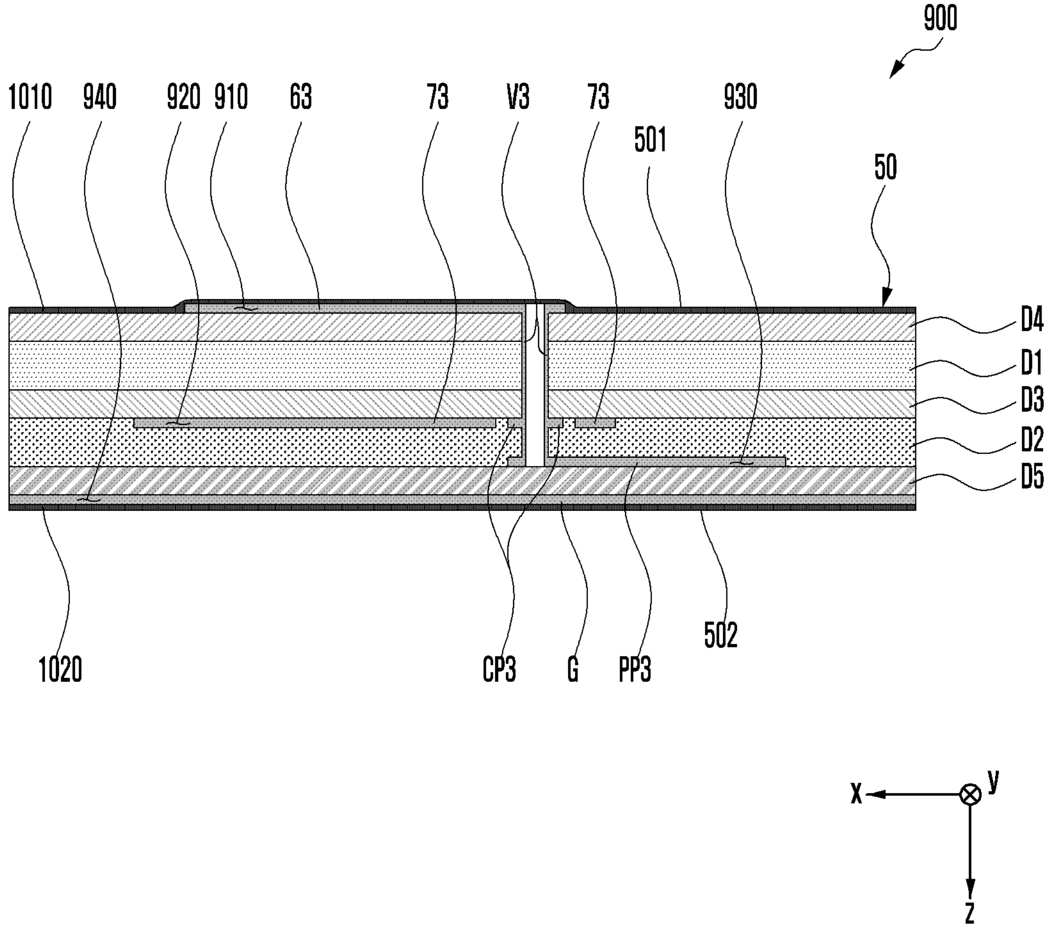
FIG. 9 is a cross-sectional view of an x-z plane of a second antenna structure for an A-A' line in FIG. 7 according to various embodiments.
Figure 10:
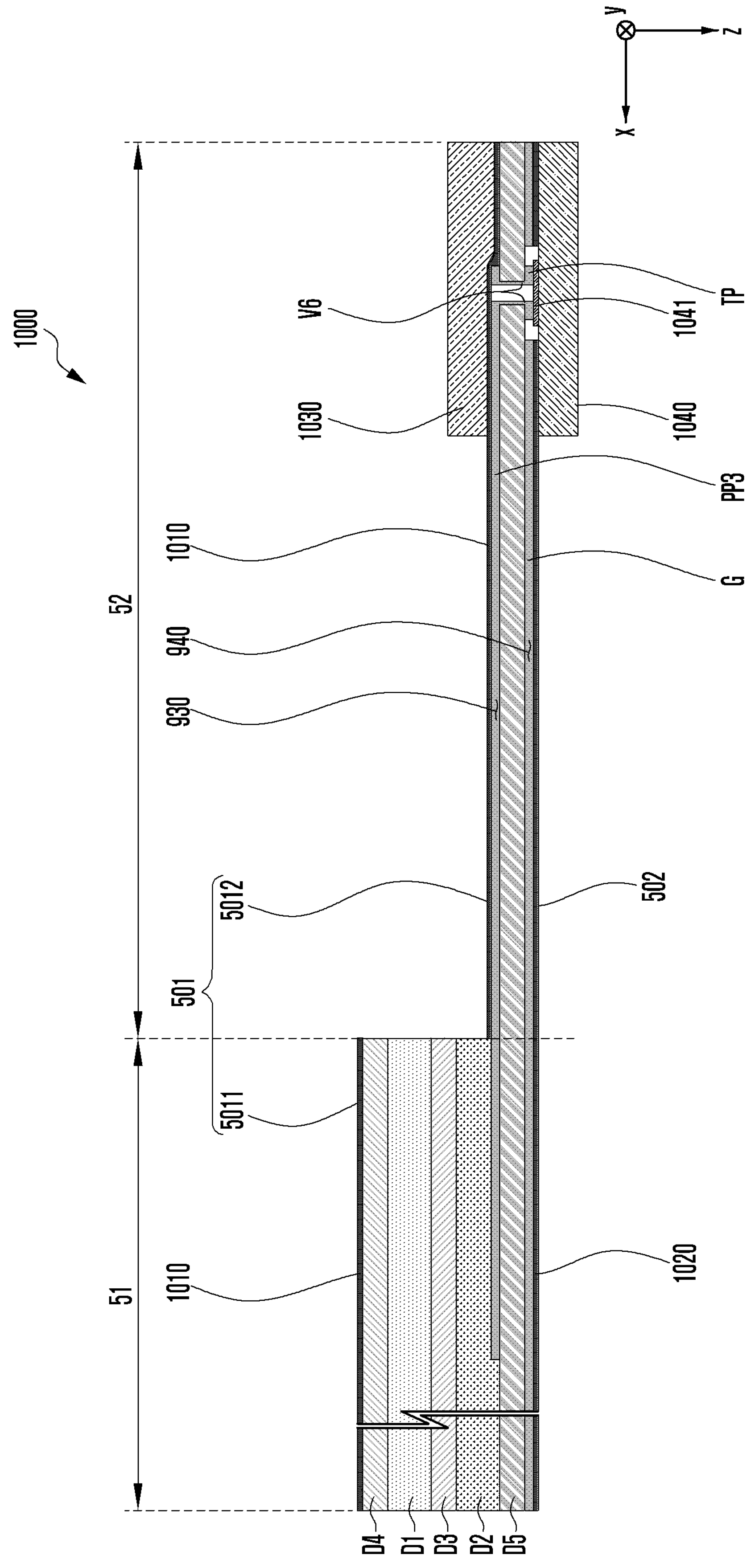
FIG. 10 is a cross-sectional view of an x-z plane of a second antenna structure for a B-B' line in FIG. 7 according to various embodiments.

FIG. 9 is a cross-sectional view 900 of an x-z plane of a second antenna structure 5 taken along line A-A' in FIG. 7 according to various embodiments. FIG. 10 is a cross-sectional view 1000 of an x-z plane of a second antenna structure 5 taken along line B-B' in FIG. 7 according to various embodiments.

Referring to FIGS. 7, 9, and 10, in an embodiment, the second part 52 of the printed circuit board 50 may have flexibility greater than that of the first part 51 of the printed circuit board 50. The second part 52 may have a bending characteristic (e.g., flexibility) which allows bending without damage while reducing occurrence of stress in the same condition, compared to the first part 51. In an embodiment, the first part 51 and the second part 52 may be substantially flexible, and the second part 52 may have flexibility greater than that of the first part 51. For example, the second part 52 may have a thinner thickness or a smaller number of laminates than the first part 51, and accordingly, may be implemented to be more flexible than the first part 51. In another example, the second part 52 may include materials different from those of the first part 51 and may be implemented to be more rigid than the first part 51. In an embodiment, the second part 52 may correspond to a substantially flexible part (or a flexible interval) of the printed circuit board 50, and the first part 51 may correspond to substantially rigid parts (or rigid intervals) of the printed circuit board 50. The printed circuit board 50 may be formed by including a flexible part and a rigid part or other parts having flexibility using various other structures.

According to an embodiment, the printed circuit board 50 included in the second antenna structure 5 may include a first surface 501 and a second surface 502 oriented in a direction opposite to the first surface 501. The first surface 501 may face, for example, the rear plate 320 (see FIG. 4 or 5). In an embodiment, a first thickness between the first surface 501 and the second surface 502 in the first part 51 of the printed circuit board 50 may be greater than the second thickness between the first surface 501 and the second surface 502 in the second part 52 of the printed circuit board 50. The first part 51 of the printed circuit board 50 may include more laminates than the second part 52 of the printed circuit board 50, and may have the first thickness that is thicker than the second thickness of the second part 52. In an embodiment, there may be a height difference between a first area 5011 included in the first part 51 of the first surface 501 and a second area 5012 included in the second part 52 of the first surface 501 due to a thickness difference between the first part 51 and the second part 52.

According to an embodiment, the printed circuit board 50 may include a first dielectric D1, a second dielectric D2, a third dielectric D3, a fourth dielectric D4, a fifth dielectric D5, a first conductive layer 910, a second conductive layer 920, a third conductive layer 930, a fourth conductive layer 940, a first surface protection layer 1010, a second surface protection layer 1020, a connector 1040, or a reinforcing member 1030.

According to an embodiment, the first dielectric D1, the second dielectric D2, the third dielectric D3, and the fourth dielectric D4 may be positioned in the first part 51 of the printed circuit board 50. The fifth dielectric D5 may extend from the first part 51 to the second part 52. The fourth dielectric D4 may be closest to the first surface 501 among the multiple dielectrics D1, D2, D3, D4, and D5, and the fifth dielectric D5 may be closest to the second surface 502 among the multiple dielectrics D1, D2, D3, D4, and D5. The first dielectric D1 may be positioned between the third dielectric D3 and the fourth dielectric D4. The third dielectric D3 may be positioned between the first dielectric D1 and the second dielectric D2. The second dielectric D2 may be positioned between the third dielectric D3 and the fifth dielectric D5. The first dielectric D1, the second dielectric D2, the third dielectric D3, the fourth dielectric D4, or the fifth dielectric D5 may include various insulation materials or a non-conductive material.

According to an embodiment, the first conductive layer 910 may be positioned to be closest to the first surface 501 among conductive layers included in the first part 51 of the printed circuit board 50. The first conductive layer 910 may be disposed on the fourth dielectric D4. For example, the first conductive layer 910 may be positioned on a surface of the fourth dielectric D4, the surface being opposite to a surface facing the first dielectric D1. The second conductive layer 920 may be positioned between the second dielectric D2 and the third dielectric D3. The third conductive layer 930 may be positioned between the second dielectric D2 and the fifth dielectric D5. The fourth conductive layer 940 may be positioned to be closest to the second surface 502 among conductive layers included in the printed circuit board 50. The fourth conductive layer 940 may be positioned on the fifth dielectric D5. For example, the fourth conductive layer 940 may be disposed on a surface of the fifth dielectric D5, the surface being opposite to a surface facing the second dielectric D2. In an embodiment, the first conductive layer 910 may include multiple first antenna elements 61, 62, and 63. In an embodiment, the second conductive layer 920 may include the multiple second antenna elements 71, 72, and 73, the first coupling conductive pattern CP1, the second coupling conductive pattern CP2, and/or the third coupling conductive pattern CP3. In an embodiment, the third conductive layer 930 may include the first path pattern PP1, the second path pattern PP2, and/or the third path pattern PP3. The third conductive layer 930 may include, for example, a part of a first signal line between the connector 1040 and the first antenna element 61 of the first antenna ①, a part of a second signal line between the connector 1040 and the first antenna element 62 of the second antenna ②, and/or a part of a third signal line between the connector 1040 and the first antenna element 63 of the third antenna ③. In an embodiment, the third conductive layer 930 and the fourth conductive layer 940 may form a coplanar waveguide (CPW) for transferring a frequency signal.

According to an embodiment, at least a part of the fourth conductive layer 940 may be utilized as a ground plane G. The ground plane G included in the fourth conductive layer 940 may reduce an electromagnetic effect (e.g., electromagnetic interference (EMI)) to a circuit (or a circuit pattern) of the printed circuit board 50. For example, the ground plane G included in the fourth conductive layer 940 may reduce an effect on a circuit of the printed circuit board 50, the effect being exerted by external electromagnetic noise toward the second surface 502. For example, the ground plane G included in the fourth conductive layer 940 may reduce an effect on an electrical element around the printed circuit board 50, the effect being exerted by an electromagnetic field generated when a current flows through the circuit of the printed circuit 50.

According to an embodiment, at least a part of the printed circuit board 50 may be formed using, for example, a flexible copper clad laminate (FCCL). The flexible copper clad laminate corresponds to a laminate used for a printed circuit, and may include a structure in which copper clad is attached to one side or opposite sides of an insulation film (or a dielectric film) having flexibility using an adhesive material (e.g., an acrylic adhesive). The insulation film having flexibility may include, for example, various non-conductive materials such as a polyimide film or a polyester film. For example, a flexible printed circuit board may be processed through a series of processes such as circuit printing, etching, and resist peeling, so that a laminate structure including a dielectric and a conductive layer disposed on one surface and/or the other surface of the dielectric can be formed. In an embodiment, the first conductive layer 910 and the fourth dielectric D4 may be formed using the flexible copper clad laminate. In an embodiment, the second conductive layer 920 and the third dielectric D3 may be formed using the flexible copper clad laminate. In an embodiment, the third conductive layer 930, the fourth conductive layer 940, and the fifth dielectric D5 may be formed using the flexible copper clad laminate. In an embodiment, the third dielectric D3, the fourth dielectric D4, and/or the fifth dielectric D5 corresponds to an insulation film (a dielectric film) based on the flexible copper clad laminate, and may include, for example, prepreg (pre-impregnated materials) (e.g., an insulation resin layer). The prepreg may be, for example, a material obtained by impregnating liquid synthetic resin into a fabric enhancer (e.g., a reinforcing base material) such as carbon fiber or glass fiber. In an embodiment, the third dielectric D3, the fourth dielectric D4, and/or the fifth dielectric D5 may further include a reinforcing base material such as paper or nonwoven glass fabric, and the reinforcing base material may increase intensity (e.g., longitudinal/traverse directional intensity) of a dielectric, which may be insufficient only with resin, or may reduce a temperature dimensional change ratio. In another example, the prepreg may include a thermosetting resin system such as phenol resin or epoxy resin, and a thermoplastic resin system such as polyetherkethone. In an embodiment, the prepreg may include unidirectional prepreg and cloth prepreg.

According to an embodiment, the fifth dielectric D5 may include a material capable of securing flexibility of the second part 52 of the printed circuit board 50.

According to an embodiment, the first dielectric D1 may include a first non-conductive adhesive material for coupling (or bonding) the third dielectric D3 and the fourth dielectric D4. The second dielectric D2 may include a second non-conductive adhesive material for coupling (or bonding) the third dielectric D3 and the fifth dielectric D5. The first dielectric D1 or the second dielectric D2 may include, for example, an acryl-based or an epoxy-based non-conductive adhesive material. The first dielectric D1 or the second dielectric D2 may include, for example, a flexible polymer adhesive material.

According to an embodiment, the first surface protection layer 1010 and the second surface protection layer 1020 may play a role of protecting a circuit (or a circuit pattern) of the printed circuit board 50, and may include, for example, an insulation layer or a non-conductive layer. The first surface protection layer 1010 may form at least a part of the first surface 501 of the printed circuit board 50, and the second surface protection layer 1020 may form at least a part of the second surface 502 of the printed circuit board 50. In an embodiment, the first surface protection layer 1010 or the second surface protection layer 1020 may be called a "coverlay". The first surface protection layer 1010 or the second surface protection layer 1020 may include, for example, various insulation materials such as epoxy component solder mask insulation ink (e.g., photo-imageable solder resist (PSR) ink (PSR mask ink)). In an embodiment, the first surface protection layer 1010 may include an electromagnetic shield composition (or an electromagnetic wave shield composition), and in this case, may be positioned, when seen in the +z axis direction, not to overlap the multiple first antenna elements 61, 62, and 63 and the multiple second antenna elements 71, 72, and 73.

According to an embodiment, the connector 1040 may be disposed at the second part 52 of the printed circuit board 50. The connector 1040 may be positioned on the second surface 502 of the printed circuit board 50. The fourth conductive layer 940 may include a third terminal pattern TP electrically connected to the third path pattern PP3 of the first conductive layer 910 through the sixth conductive via V6. The fourth conductive layer 940 may include a first terminal pattern (not shown) electrically connected to the first path pattern PP1 of the first conductive layer 910 through the fourth conductive via V4. The fourth conductive layer 940 may include a second terminal pattern (not shown) electrically connected to the second path pattern PP2 of the first conductive layer 910 through the fifth conductive via V5. The first terminal pattern, the second terminal pattern, and the third terminal pattern (TP) may be arranged to be physically separated from one another. The first terminal pattern, the second terminal pattern, and the third terminal pattern TP may be arranged to be physically separated from the ground plane G included in the fourth conductive layer 940. The first terminal pattern, the second terminal pattern, and the third terminal pattern TP may be electrically or mechanically connected to the connector 1040 using a conductive adhesive material 1041 such as solder. The first terminal pattern, the second terminal pattern, and the third terminal pattern TP correspond parts for connection to the connector 1040 using a conductive adhesive material, and may be called, in an embodiment, a "conductive pad" or a "land". In an embodiment, the second part 62 of the printed circuit board 50 may be inserted into a connector included in the first substrate assembly 440, without the connector 1040, so as to be electrically connected to the first substrate assembly 440. In an embodiment, the second part 62 of the printed circuit board 50 may be electrically connected to the first substrate assembly 440 (see FIG. 6) using a conductive adhesive material such as solder, without the connector 1040.

According to an embodiment, the ground plane G of the fourth conductive layer 940 may be electrically connected to the connector 1040. The ground plane G of the fourth conductive layer 940 may be electrically connected to a ground structure (e.g., a ground plane) included in the first substrate assembly 440 through the connector 1040.

According to an embodiment, the reinforcing member 1030 may be disposed in the second part 52 of the printed circuit board 50 to correspond to the connector 1040. The reinforcing member 1030 may be disposed, when seen from above the first surface 501 of the printed circuit board 50, on the first surface 502 to at least partially overlap the connector 1040. The reinforcing member 1030 may be positioned between the second part 52 of the printed circuit board 50 and the rear plate 320 (see FIG. 4 or 5) to press the connector 1040 toward the first substrate assembly 440 so that a connection between the connector 1040 and the first substrate assembly 440 is maintained. In an embodiment, the reinforcing member 1030 may include a non-conductive material (e.g., polymer) or a metal material. In an embodiment, the reinforcing member 1030 may be substantially rigid, and may include, for example, a stiffener such as a reinforcing plate. In an embodiment, the reinforcing member 1030 may have a dielectric constant (e.g., a low dielectric constant) for reducing an electromagnetic effect exerted on the circuit board 50. In an embodiment, the reinforcing member 1030 may include a flexible material, or may be replaced with a flexible member.

According to an embodiment, the second antenna structure 5 may have directivity which allows electromagnetic waves to be concentrated in a direction (e.g., −z axis direction) to the rear surface 300B of the electronic device 200 (see FIG. 3), or allows transmission or reception of waves. The first antenna ①, the second antenna ②, and the third antenna ③ illustrated in FIG. 7 may form a beam pattern (or an antenna radiation pattern). The beam pattern may correspond to a valid area in which a signal can be emitted or detected. The beam pattern may include, for example, a main beam (or a main lobe) formed in a maximum radiation direction (boresight). The main beam may indicate a beam through which a relatively large amount of energy is emitted, and the first antenna ①, the second antenna ②, and the third antenna ③ may form a main beam substantially in a direction (e.g., −z axis direction) to the rear surface 300B of the electronic device 200 (see FIG. 3). A ground plane (or a ground layer) included in the fourth conductive layer 940 may contribute so that, in an embodiment, a beam for irritating a relatively large amount of energy is formed substantially in a direction to the rear surface 300B of the electronic device 200 (see FIG. 3) through the first antenna ①, the second antenna ②, and the third antenna ③.

According to an embodiment, a dielectric constant, a dielectric loss, and/or a z-axis direction thickness of a dielectric (e.g., the first dielectric D1, the third dielectric D3, and/or the fourth dielectric D4) between the first conductive layer 910 and the second conductive layer 920 may correspond to conditions to be considered when the multiple first antenna elements 61, 62, and 63 are implemented. For example, when the multiple first antenna elements 61, 62, and 63 are implemented so that a first signal of a selected or designated first frequency band is transmitted and/or received while reducing a loss, or antenna radiation efficiency is secured, a dielectric constant, a dielectric loss, and/or a z-axis direction thickness of the first dielectric D1, the third dielectric D3, or the fourth dielectric D4 may be considered. For example, the shapes of the multiple first antenna elements 61, 62, and 63 may be implemented in consideration of the dielectric constant, the dielectric loss, and/or the z-axis direction thickness of the first dielectric D1, the third dielectric D3, or the fourth dielectric D4.

According to an embodiment, a dielectric constant, a dielectric loss, and/or a z-axis direction thickness of a dielectric (e.g., the second dielectric D2 and/or the fifth dielectric D5) between the second conductive layer 920 and the fourth conductive layer 940 may correspond to conditions to be considered when the multiple second antenna elements 71, 72, and 73 are implemented. For example, when the multiple second antenna elements 71, 72, and 73 are implemented so that a second signal of a selected or designated second frequency band is transmitted and/or received while reducing a loss, or antenna radiation efficiency is secured, a dielectric constant, a dielectric loss, and/or a z-axis direction thickness of the second dielectric D2 or the fifth dielectric D5 may be considered. For example, the shapes of the multiple second antenna elements 71, 72, and 73 may be implemented in consideration of the dielectric constant, the dielectric loss, and/or the z-axis direction thickness of the second dielectric D2 or the fifth dielectric D5.

According to an embodiment, the second dielectric D2 (e.g., a second non-conductive adhesive material) may have a greater dielectric constant than the first dielectric D1 (e.g., a first non-conductive adhesive material). When a first dielectric constant of the second dielectric D2 is greater than a second dielectric constant of the first dielectric D1, it may be easy to reduce sizes of the multiple second antenna elements 71, 72, and 73 for transmitting and/or receiving signals in lower frequency bands, compared to the multiple first antenna elements 61, 62, and 63. In an embodiment, the first dielectric constant (a relative dielectric constant) of the first dielectric D1 may be about 1 to 4, and the second dielectric constant (a relative dielectric constant) of the second dielectric D2 may be about 5 to 10. The first dielectric constant or the second dielectric constant greater than the first dielectric constant may have various other values.

According to an embodiment, a third dielectric constant of the third dielectric D3, a fourth dielectric constant of the fourth dielectric D4, or a fifth dielectric constant of the fifth dielectric D5 may be smaller than the second dielectric constant of the second dielectric D2. In an embodiment, the third dielectric constant, the fourth dielectric constant, or the fifth dielectric constant may be substantially identical to the first dielectric constant of the first dielectric D1, or may be different from the first dielectric constant. In an embodiment, the third dielectric constant, the fourth dielectric constant, or the fifth dielectric constant may be greater than the first dielectric constant of the first dielectric D1. For example, the dielectric constant of the first dielectric D1 may be about 2.8, and a dielectric loss of the first dielectric D1 may be about 0.0025. For example, the dielectric constant of the second dielectric D2 may be about 7.4, and a dielectric loss of the second dielectric D2 may be about 0.06. For example, the dielectric constant of the third dielectric D3, the fourth dielectric D4, or the fifth dielectric D5 may be about 3.3, and a dielectric loss of the dielectric constant of the third dielectric D3, the fourth dielectric D4, or the fifth dielectric D5 may be about 0.0035.

According to an embodiment, the first conductive layer 910 may be formed to have a thickness of about 20 micrometers (μm), but is not limited thereto and there may be various thicknesses. The second conductive layer 920, the third conductive layer 930, or the fourth conductive layer 940 may be formed to have a thickness thinner than that of the first conductive layer 910, and may have, for example, a thickness of about 5 μm, but is not limited thereto and there may be various thicknesses.

According to an embodiment, the fourth dielectric D4 may have a thickness of about 25 μm, but is not limited thereto and there may be various thicknesses. According to an embodiment, the third dielectric D3 may have a thickness of about 25 μm, but is not limited thereto and there may be various thicknesses. According to an embodiment, the fifth dielectric D5 may have a thickness of about 75 μm, but is not limited thereto and there may be various thicknesses.

According to an embodiment, the first dielectric D1 or the second dielectric D2 may have a thickness that is different from or substantially identical to the thickness of the third dielectric D3, the fourth dielectric D4, or the fifth dielectric D5. For example, the first dielectric D1 may have a thickness of about 100 μm, but is not limited thereto and there may be various thicknesses. For example, the second dielectric D2 may have a thickness of about 75 μm, but is not limited thereto and there may be various thicknesses.

According to an embodiment, at least two of the first dielectric D1, the third dielectric D3, and the fourth dielectric D4 may be replaced with one dielectric. In an embodiment, the antenna structure 5 may omit at least one of elements positioned on the printed circuit board 50, or may additionally include other elements.

According to an embodiment, the second antenna structure 5 may individually adjust a resonance frequency of each of the multiple first antenna elements 61, 62, and 63 and the multiple second antenna elements 71, 72, and 73 for each use frequency. A description thereof will be made below with reference to FIGS. 11 and 12.

Figure 11:
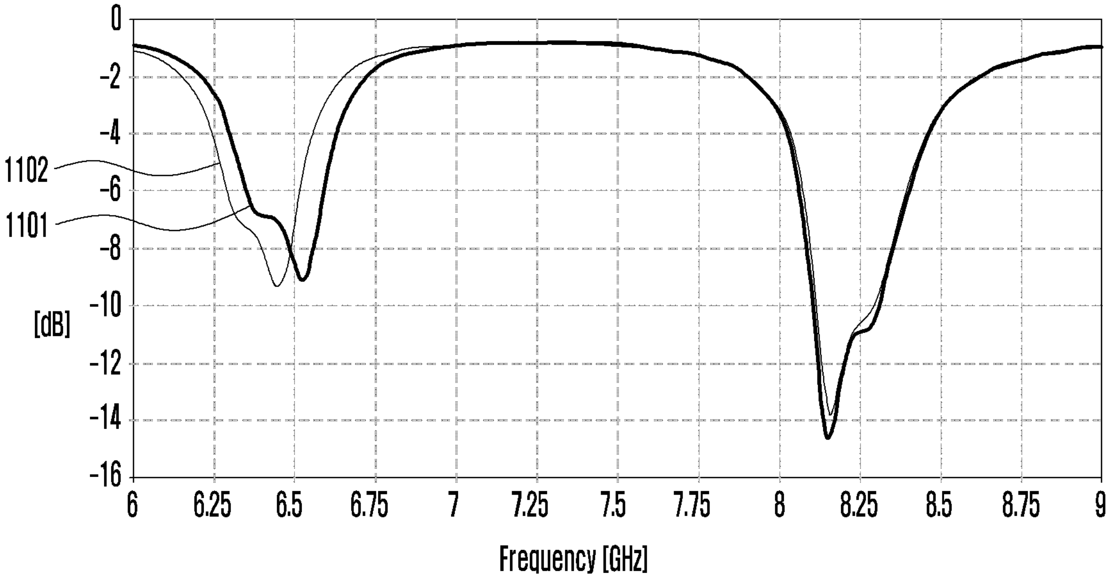
FIG. 11 is a graph illustrating a resonance characteristic of a second antenna structure when changing a third width of each of multiple second notches included in multiple second antenna elements according to various embodiments

FIG. 11 is a graph illustrating a resonance characteristic of a second antenna structure 5 when changing a third width W3 of each of multiple second notches N21, N22, N23, and N24 included in multiple second antenna elements 71, 72, and 73 (see FIG. 7) according to various embodiments.

Referring to FIGS. 7, 8, and 11, for example, reference numeral "1101" and reference numeral "1102" indicate resonance characteristics for cases where there are different third widths W3. FIG. 11 shows a parameter sweep according to change in the third width W3 of each of the second notches N21, N22, N23, and N24, and for example, a frequency band in which the second antenna structure 5 can transmit or receive a signal substantially without a power loss may change according to the change in the third width W3. Although not shown, a frequency band in which the second antenna structure 5 can transmit or receive a signal substantially without a power loss may change according to a change in a fourth width W4 of each of the second notches N21, N22, N23, and N24. In an embodiment, a resonance frequency of the second antenna structure 5 may vary according to the change in the third width W3 and/or the change in the fourth width W4 of each of the multiple second notches N21, N22, N23, and N24. In an embodiment, the second antenna structure 5 may substantially resonate in a second use frequency (e.g., about 6.5 GHZ) through adjustment of the third width W3 and/or the fourth width W4.

According to an embodiment, when at least one of the third width W3 and the fourth width W4 of each of the multiple second notches N21, N22, N23, and N24, a resonance frequency of the second antenna structure 5 may move downward or upward. For example, when at least one of the third width W3 and the fourth width W4 increases, a resonance frequency of the second antenna structure 5 may move upward. For example, when at least one of the third width W3 and the fourth width W4 decreases, a resonance frequency of the second antenna structure 5 may move upward.

According to an embodiment, an effect exerted on consonant frequency movement (e.g., downward movement of a frequency or upward movement of a frequency) of the second antenna structure 5 by the change in in the fourth width W4 may be greater than that exerted by the change in the third width W3.

Figure 12:
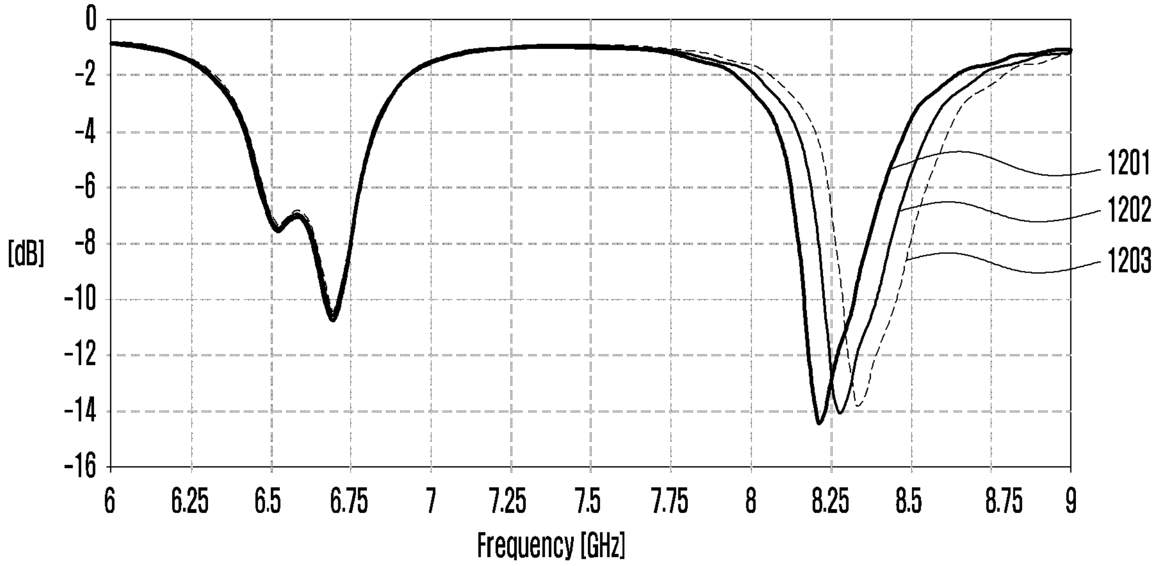
FIG. 12 is a graph illustrating a resonance characteristic of a second antenna structure when changing a second width of each of multiple first notches included in multiple first antenna elements according to various embodiments.

FIG. 12 is a graph illustrating a resonance characteristic of a second antenna structure 5 when changing a second width W2 of each of multiple first notches N11, N12, N13, and N14 included in multiple first antenna elements 61, 62, and 63 (see FIG. 7) according to various embodiments.

Referring to FIGS. 7, 8, and 12, for example, reference numeral "1201", reference numeral "1202", and reference numeral "1203" indicate resonance characteristics for cases where there are different second widths W2. FIG. 12 shows a parameter sweep according to change in the second width W2 of each of the first notches N11, N12, N13, and N14, and for example, a resonance frequency band in which the second antenna structure 5 can transmit or receive a signal may change according to the change in the second width W2. Although not shown, a frequency band in which the second antenna structure 5 can transmit or receive a signal may change according to a change in the first width W1 of each of the first notches N11, N12, N13, and N14. In an embodiment, a resonance frequency of the second antenna structure 5 may vary according to the change in the first width W1 and/or the change in the second width W2 of each of the multiple first notches N11, N12, N13, and N14. In an embodiment, the second antenna structure 5 may substantially resonate in a first use frequency (e.g., about 8 GHZ) through adjustment of the first width W1 and/or the second width W2.

According to an embodiment, when at least one of the first width W1 and the second width W2 of each of the multiple first notches N11, N12, N13, and N14 changes, a resonance frequency of the second antenna structure 5 may move downward or upward. For example, when at least one of the first width W1 and the second width W2 increases, a resonance frequency of the second antenna structure 5 may move upward. For example, when at least one of the first width W1 and the second width W2 decreases, a resonance frequency of the second antenna structure 5 may move upward.

According to an embodiment, an effect exerted on consonant frequency movement (e.g., downward movement of a frequency or upward movement of a frequency) of the second antenna structure 5 by the change in in the second width W2 may be greater than that exerted by the change in the first width W1.

Figure 13:
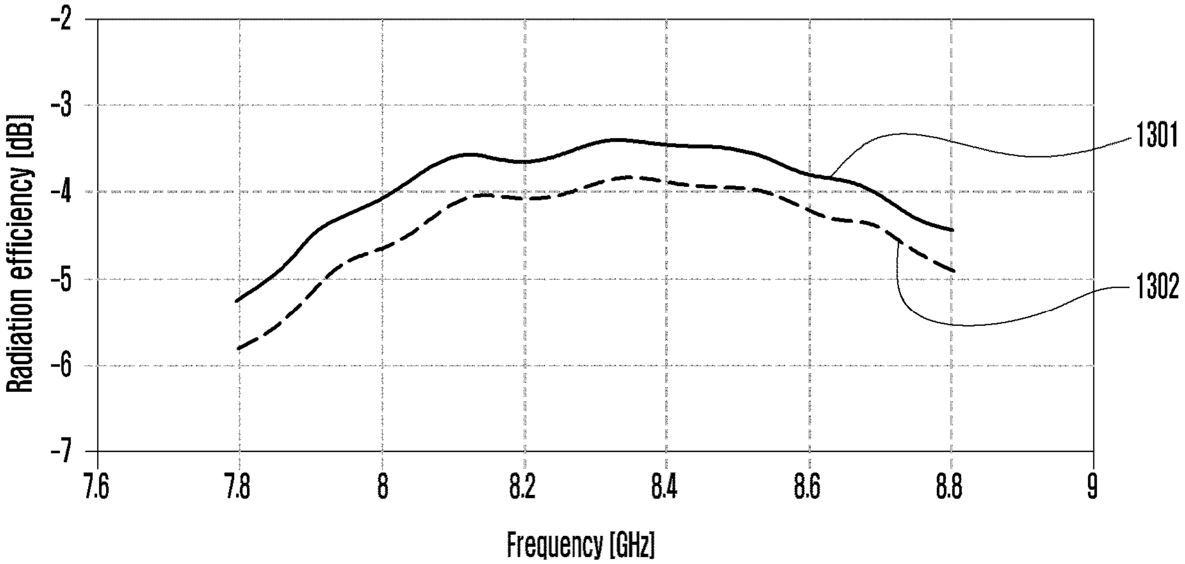
FIG. 13 is a graph illustrating antenna radiation efficiency of multiple first antenna elements when fixing a first width of each of multiple first notches included in the multiple first antenna elements and changing a third width of each of multiple second notches included in multiple second antenna elements according to various embodiments.

FIG. 13 is a graph illustrating antenna radiation efficiency of multiple first antenna elements 61, 62, and 63 when fixing a first width W1 of each of multiple first notches N11, N12, N13, and N14 included in the multiple first antenna elements 61, 62, and 63 and changing a third width W3 of each of multiple second notches N21, N22, N23, and N24 (see FIG. 8) included in multiple second antenna elements 71, 72, and 73 (see FIG. 7), according to various embodiments.

Referring to FIGS. 7, 8, and 13, for example, reference numeral "1301" indicates antenna radiation efficiency of the multiple first antenna elements 61, 62, and 63 for a case where a first width W1 of each of the multiple first notches N11, N12, N13, and N14 is different from a third width W3 of each of the multiple second notches N21, N22, N23, and N24. For example, the first width W1 may be about 0.2 mm, and the third width W3 may be about 2 mm. Reference numeral "1302", as a comparative example, indicates antenna radiation efficiency of the multiple first antenna elements 61, 62, and 63 for a case where the third width W3 of each of the multiple second notches N21, N22, N23, and N24 is wider, compared to reference numeral "1301". For example, the first width W1 may be about 0.2 mm, and the third width W3 may be about 4 mm. When the first width W1 of each of the multiple first notches N11, N12, N13, and N14 is different from the third width W3 of the multiple second notches N21, N22, N23, and N24, antenna radiation efficiency of the multiple first antenna elements 61, 62, and 63 may be enhanced in a first use frequency (e.g., 8 GHZ), compared to the comparative example.

According to an embodiment, in a first embodiment in which the third width W3 of each of the multiple second notches N21, N22, N23, and N24 is substantially identical to the first width W1 of each of the multiple first notches N11, N12, N13, and N14, or greater than the first width W1, an antenna radiation performance can be enhanced compared to a first comparative example in which the third width W3 is smaller than the first width W1. In the first embodiment, an electromagnetic effect between the multiple antenna elements 61, 62, and 63 and the multiple second antenna elements 71, 72, and 73 can be reduced, whereby contribution to securing of the antenna radiation performance can be made, compared to the first comparative example. In an embodiment, in a second embodiment in which the third width W3 is greater than the first width W1, an antenna radiation performance can be enhanced compared to a second comparative example in which the third width W3 is substantially identical to the first width W1, or smaller than the first width W1. In the second embodiment, an electromagnetic effect between the multiple antenna elements 61, 62, and 63 and the multiple second antenna elements 71, 72, and 73 can be reduced, whereby contribution to securing of the antenna radiation performance can be made, compared to the second comparative example.

Figure 14:
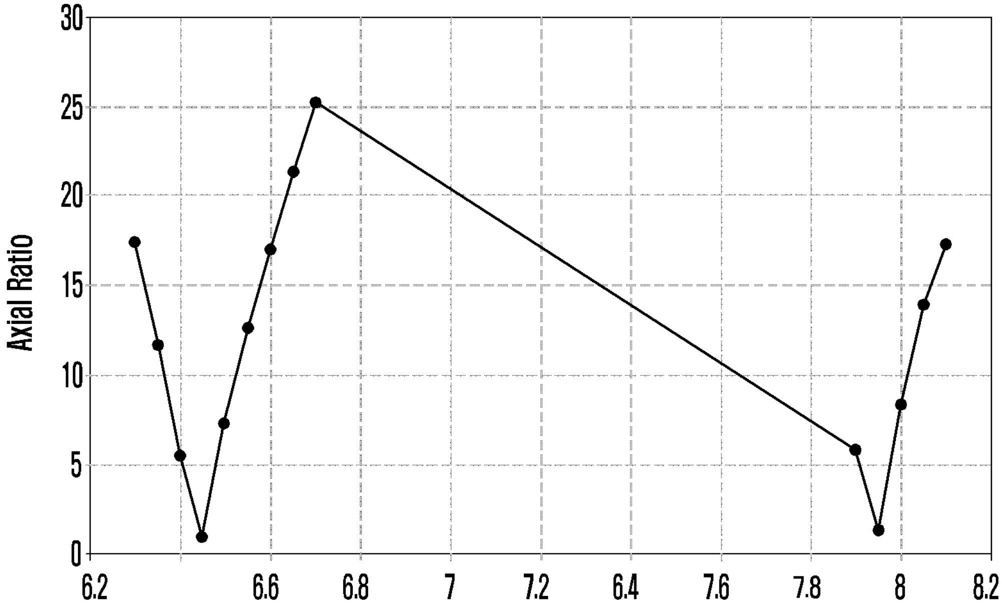
FIG. 14 is a graph illustrating an axis ratio characteristic of a second antenna structure according to an embodiment.

FIG. 14 is a graph illustrating an axis ratio of a second antenna structure 5 according to various embodiments.

Referring to FIG. 14, the second antenna structure 5 according to an embodiment may have an axis ratio formed closer to 1 in the first use frequency (e.g., about 8 GHZ) and a second use frequency (e.g., about 6.5 GHZ) and substantially have a circular polarization characteristic.

Figure 15:
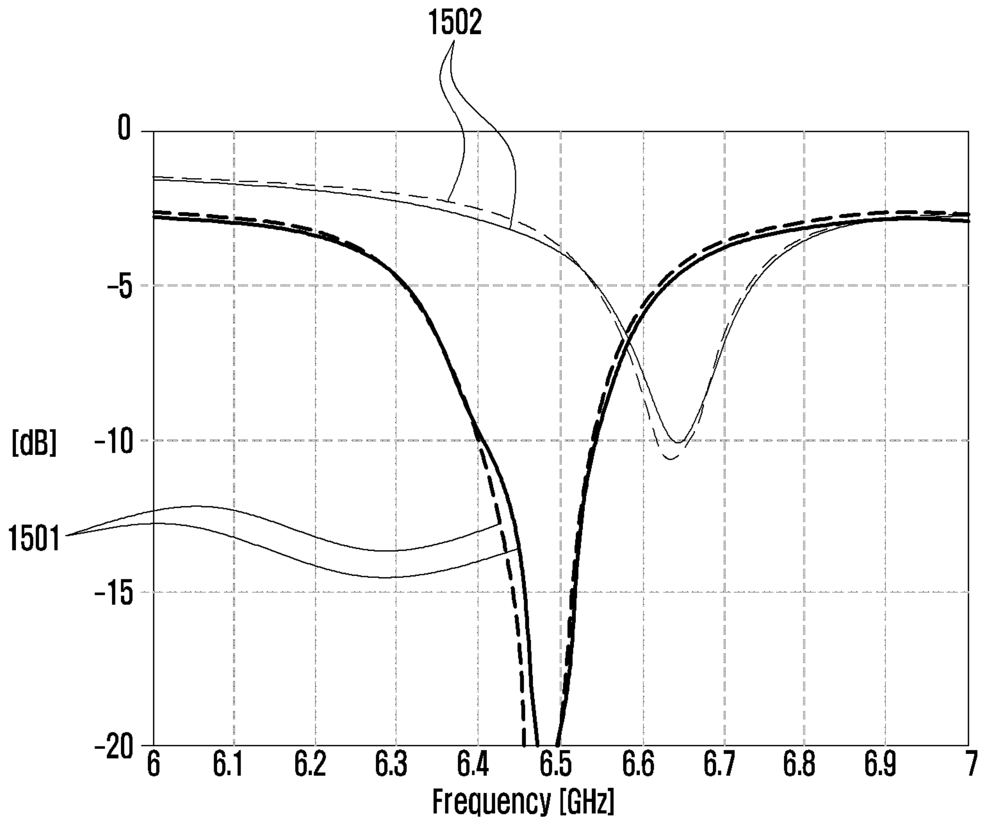
FIGS. 15 and 16 are graphs illustrating an impedance characteristic of a second antenna structure and an impedance characteristic of an antenna structure using linear polarization in a comparative example according to various embodiments.
Figure 16:
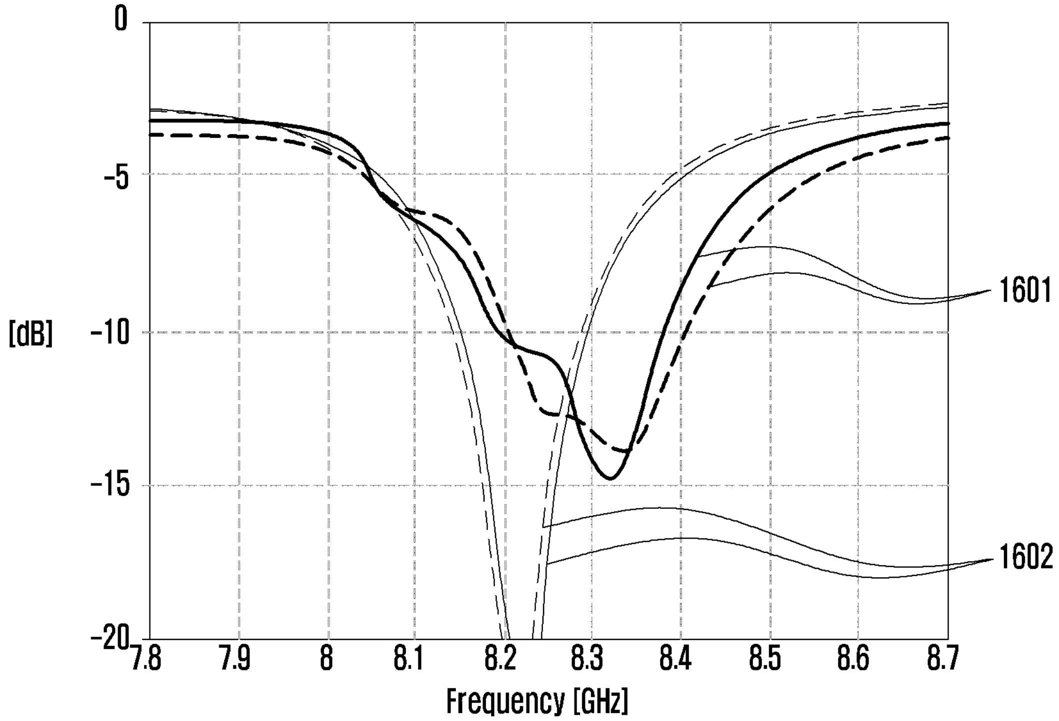

FIGS. 15 and 16 are graphs illustrating an impedance characteristic of a second antenna structure 5 and an impedance characteristic of an antenna structure using linear polarization in a comparative example according to various embodiments.

Referring to FIGS. 15 and 16, reference numerals "1501" and "1601" indicate impedance characteristics of the second antenna structure 5 according to an embodiment using circular polarization. Reference numerals "1502" and "1602" indicate impedance characteristics of the antenna structure according to the comparative example using linear polarization.

For example, the antenna structure using the linear polarization may have an about 3% bandwidth corresponding to about 8.08 GHZ to about 8.38 GHz in the first use frequency (e.g., about 8 GHZ). The second antenna structure 5 using circular polarization according to an embodiment may have an about 4.75% enhanced bandwidth corresponding to about 8.05 GHz to about 8.45 GHz in the first use frequency (e.g., about 8 GHZ), compared to the antenna structure using linear polarization according to the comparative example.

For example, the antenna structure using linear polarization may have an about 3% bandwidth corresponding to about 6.52 GHz to about 6.72 GHz in the second use frequency (e.g., about 6.5 GHZ). The second antenna structure 5 using circular polarization according to an embodiment may have an about 4.3% enhanced bandwidth corresponding to about 6.32 GHz to about 6.6 GHz in the second use frequency (e.g., about 6.5 GHZ), compared to the antenna structure using linear polarization according to the comparative example.

The second antenna structure 5 according to an embodiment may divide and use the multiple first antenna elements 61, 62, and 63 and the multiple second antenna elements 71, 72, and 73 for each use frequency, and use both a TM01 mode and a TM10 mode each corresponding to a basic mode of a patch antenna, and thus, the second antenna structure 5 may be a wider impedance bandwidth compared to the antenna structure using linear polarization according to the comparative example.

Figure 17:
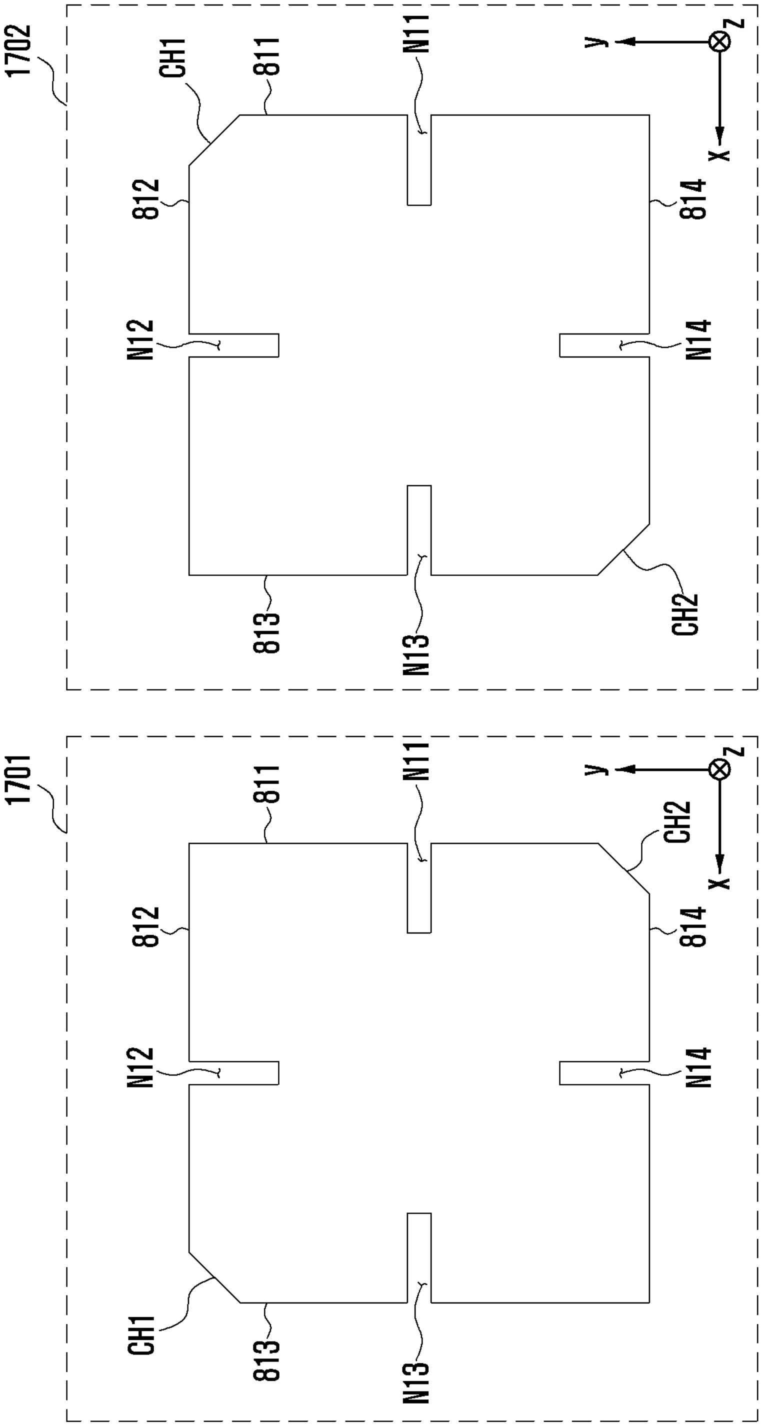
FIG. 17 is a diagram illustrating a first antenna element according to various embodiments.

FIG. 17 is diagram illustrating a first antenna element according to various embodiments.

Referring to FIG. 17, in an embodiment, a first antenna element 1701 or 1702 may include multiple first notches N11, N12, N13, and N14, a first chamfer CH1, and a second chamfer CH2. In FIG. 17, a conductive via for feeding the first antenna elements 1701 and 1702 is omitted. Reference numerals "1701" and "1702" illustrate first antenna elements for cases where the first chamfer CH1 and the second chamfer CH2 are arranged at different positions. For example, like the multiple first antenna elements 61, 62, and 63 according to the embodiment of FIG. 8, the first antenna element indicated by reference numeral "1701" may include a first chamfer CH1 formed at a part at which the second border 812 and the third border 813 are connected, and a second chamfer CH2 formed at a part at which the first border 811 and the fourth border 814 are connected. The first antenna element indicated by reference numeral "1702" is another example for replacing the multiple first antenna elements 61, 62, and 63 according to the embodiment of FIG. 8, and may include a first chamfer CH1 formed at a part at which the first border 811 and the second border 812 are connected, and a second chamfer CH2 formed at a part at which the third border 813 and the fourth border 814 are connected. In an embodiment, the first antenna element indicated by reference numeral "1701" may form light-handed circular polarization (LHCP). In an embodiment, the first antenna element indicated by reference numeral "1702" may form right-handed circular polarization (RHCP).

Figure 18:
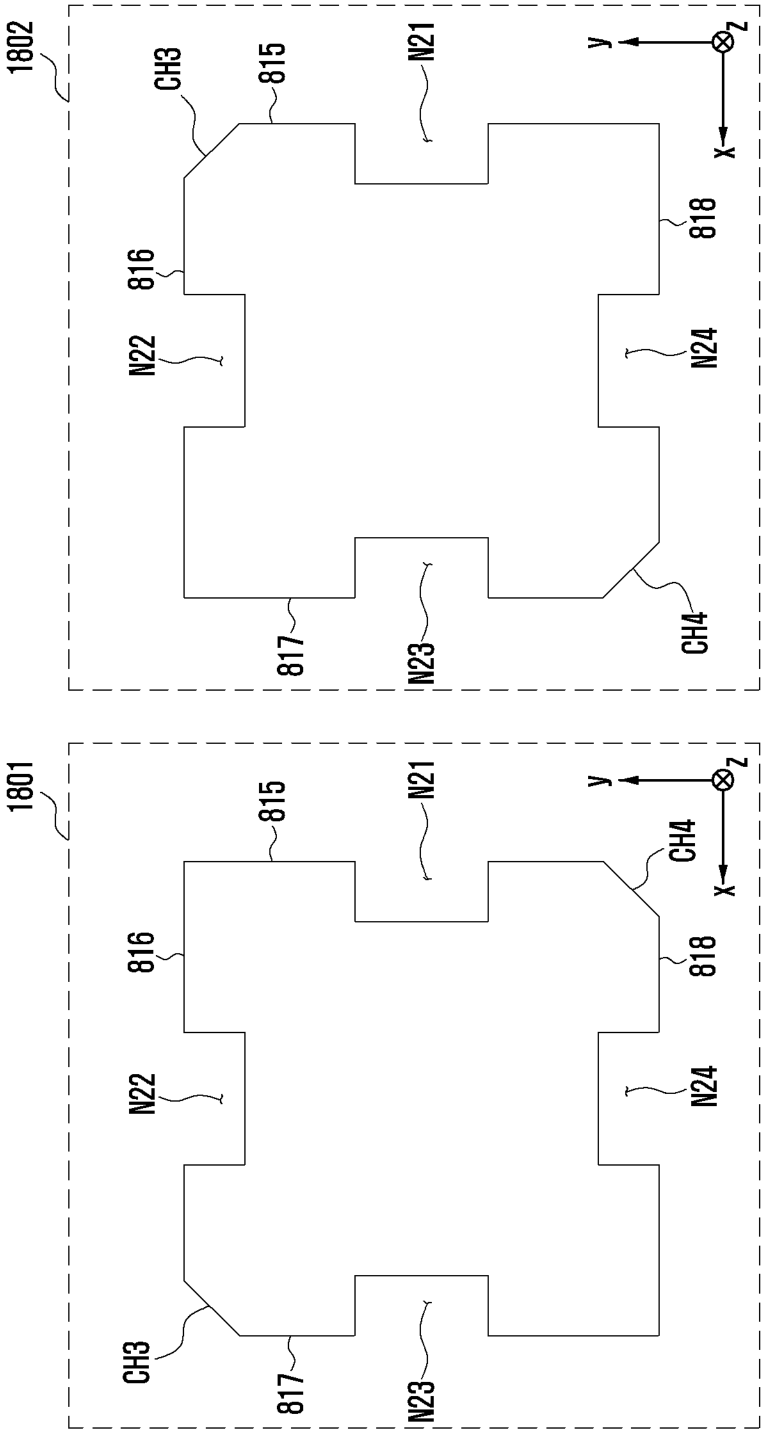
FIG. 18 is a diagram illustrating a second antenna element according to various embodiments.

FIG. 18 is a diagram illustrating a second antenna element according various embodiments.

Referring to FIG. 18, in an embodiment, a second antenna element 1801 or 1802 may include multiple second notches N21, N22, N23, and N24, a third chamfer CH3, and a fourth chamfer CH4. In FIG. 18, a hole and a coupling conductive pattern related to feeding of the second antenna elements 1801 and 1802 are omitted. Reference numerals "1801" and "1802" illustrate second antenna elements for cases where the third chamfer CH3 and the fourth chamfer CH4 are arranged at different positions. For example, like the multiple second antenna elements 71, 72, and 73 according to the embodiment of FIG. 8, the second antenna element indicated by reference numeral "1801" may include a third chamfer CH3 formed at a part at which the sixth border 816 and the seventh border 817 are connected, and a fourth chamfer CH4 formed at a part at which the fifth border 815 and the eighth border 818 are connected. The second antenna element indicated by reference numeral "1802" is another example for replacing the multiple second antenna elements 71, 72, and 73 according to the embodiment of FIG. 8, and may include a third chamfer CH3 formed at a part at which the fifth border 815 and the sixth border 816 are connected, and a fourth chamfer CH4 formed at a part at which the seventh border 817 and the eighth border 818 are connected. In an embodiment, the second antenna element indicated by reference numeral "1801" may form LHCP. In an embodiment, the second antenna element indicated by reference numeral "1802" may form RHCP.

Figure 19:
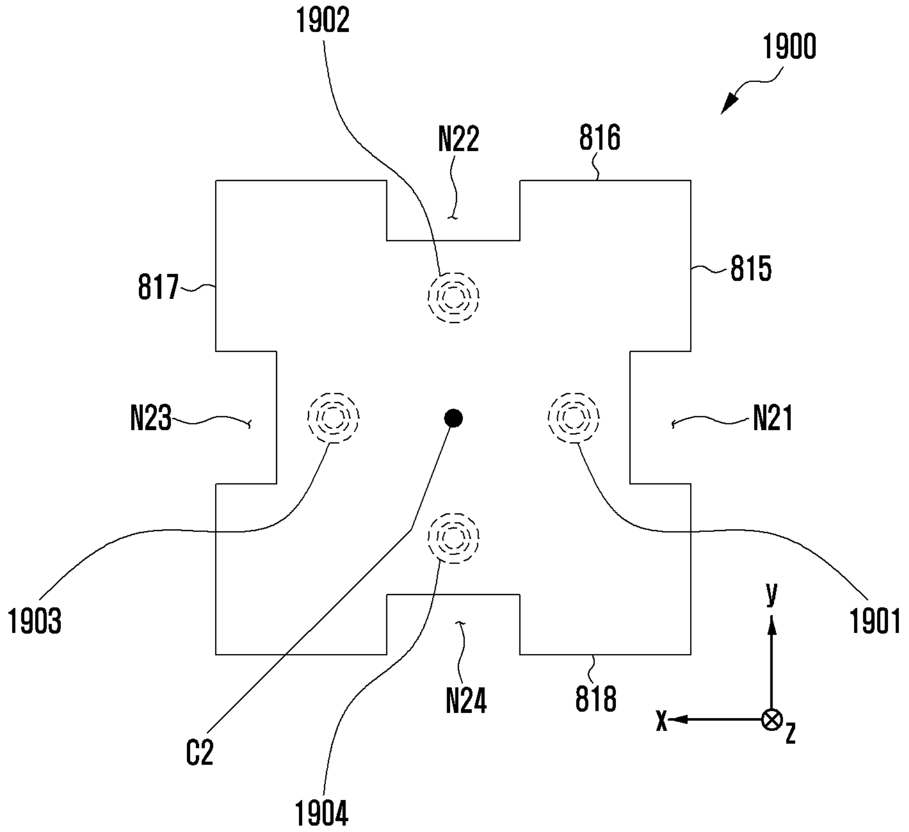
FIG. 19 is a diagram illustrating a second antenna element according to various embodiments.

FIG. 19 is a diagram illustrating a second antenna element 1900 according to various embodiments.

Referring to FIG. 19, in an embodiment, a second antenna element 1900 is another example for replacing the multiple second antenna elements 71, 72, and 73 according to the embodiment of FIG. 8, and may be implemented without a third chamfer CH3 and a fourth chamfer CH4. The second antenna element 1900 implemented without the third chamfer CH3 and the fourth chamfer CH4 may form linear polarization.

According to an embodiment, a feeding structure, as shown in reference numeral "1901", formed in substantially the same manner as the first feeding structure 801 according to the embodiment of FIG. 8, may be positioned between the second notch N21 formed on the fifth border 815 and the center C2 (e.g., the center aligned with the center C1 of FIG. 8) of the second antenna element 1900 and positioned to be closer to the second notch N21 than the center C2, and in this case, the second antenna element 1900 may form horizontal polarization. In an embodiment, as shown in reference numeral "1903", the feeding structure may be positioned between the second notch N23 formed on the seventh border 817 and the center C2 of the second antenna element 1900 and positioned to be closer to the second notch N22 than the center C2, and in this case, the second antenna element 1900 may form horizontal polarization.

According to an embodiment, as shown in reference numeral "1902", a feeding structure formed in substantially the same manner as the first feeding structure 801 according to the embodiment of FIG. 8 may be positioned between the second notch N22 formed on the sixth border 816 and the center C2 of the second antenna element 1900 and positioned to be closer to the second notch N22 than the center C2, and in this case, the second antenna element 1900 may form vertical polarization. In an embodiment, as shown in reference numeral "1904", the feeding structure may be positioned between the second notch N24 formed on the eighth border 818 and the center C2 of the second antenna element 1900 and positioned to be closer to the second notch N24 than the center C2, and in this case, the second antenna element 1900 may form vertical polarization.

Figure 20:
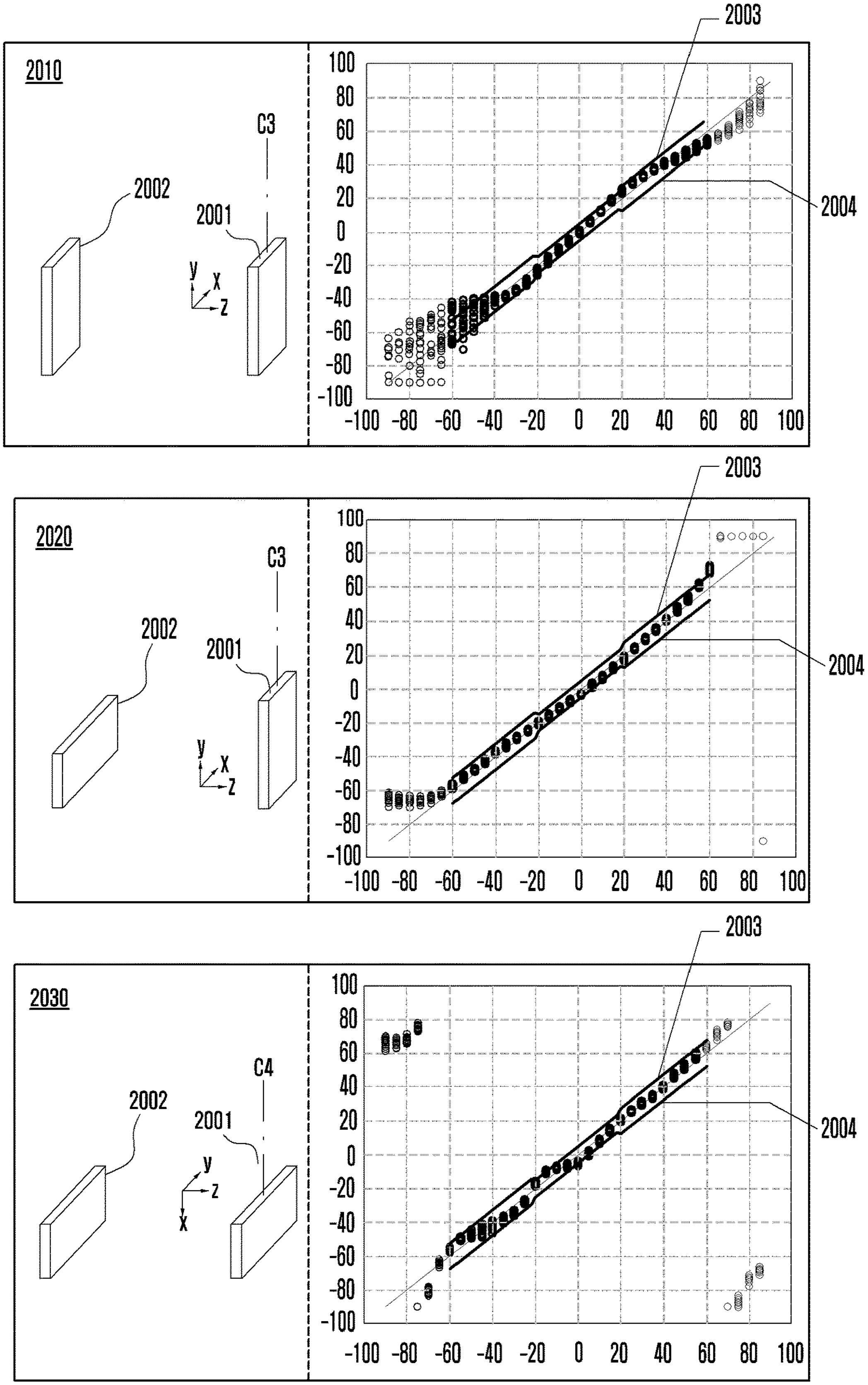
FIG. 20 is a graph illustrating a value obtained by measuring an angle at which a signal transmitted from a second electronic device is received by a first electronic device according to the orientation or the direction in which the first electronic device and the second electronic device face according to various embodiments.

FIG. 20 are graphs illustrating a value obtained by measuring an angle at which a signal transmitted from a second electronic device 2002 is received by a first electronic device 2001 according to the orientation or the direction in which the first electronic device 2001 and the second electronic device 2002 face according to various embodiments. In an embodiment, the first electronic device 2001 may be the electronic device 200 of FIG. 2, and may measure an angle at which a signal transmitted from the second electronic device 2002 is received, using the second antenna structure 5 (see FIG. 7) which generates circulation polarization. The second electronic device 2002, as a signal source, may generate linear polarization or circular polarization. For example, the second electronic device 2002 may transmit a signal to the first electronic device 2001 using various types of antennas such as a monopole antenna, a dipole antenna, a planar inverted-F antenna (PIFA), an IFA, or a patch antenna.

Referring to FIG. 20, according to a first measurement condition indicated by reference numeral "2010", the first electronic device 2001 and the second electronic device 2002 may be arranged in the portrait orientation, and the first electronic device 2001 may rotate with reference to a central axis C3 that is in parallel to a y axis. According to a second measurement condition indicated by reference numeral "2020", the first electronic device 2001 may be disposed in the portrait orientation, the second electronic device 2002 may be disposed in the landscape orientation, and the first electronic device 2001 may rotate with reference to the central axis C3 that is in parallel to a y axis. According to a third measurement condition indicated by reference numeral "2030", the first electronic device 2001 and the second electronic device 2002 may be arranged in the landscape orientation, and the first electronic device 2001 may rotate with reference to the central axis C4 that is in parallel to an x axis. A horizontal axis in each of the graphs indicates a rotation angle of the first electronic device 2001. A vertical axis in each of the graphs may indicate a value obtained by measuring an angle (e.g., an angle at which a signal is received with respect to an x axis, or an angle at which a signal is received with respect to a y axis) at which a signal transmitted from the second electronic device 2002 (e.g., a signal source) is received according to the rotation angle of the first electronic device 2001. For example, the graph indicated by reference numeral "2003" and the graph indicated by reference numeral "2004" may indicate a design range in which reliability of data received from the second electronic device 2002 according to the rotation angle of the first electronic device 2001 can be secured. In an embodiment, the design range may be configured so that the first electronic device 2001 should secure reliability of data received from the second electronic device 2002 at an about −60 degree angle to an about +60 degree angle. In an embodiment, the first electronic device 2001 includes the second antenna structure 5 (see FIG. 7) which generates circular polarization, and thus, a signal reception angle having reliability satisfying a design range without a substantial effect on the orientation of the first electronic device 2001 or the orientation of the second electronic device 2002 can be measured.

According to an embodiment, Table 1 below indicates a distance recognized (or measured or estimated) by the electronic device 200 (see FIG. 2) including an antenna (hereinafter, referred to as a circular polarization antenna) which generates circular polarization, with respect to a signal source according to a polarization characteristic of a signal transmitted from the signal source. Table 1 below indicates a distance recognized (or measured or estimated), by an electronic device in a comparative example including an antenna (hereinafter, referred to as a linear polarization antenna) which generates linear polarization, with respect to a signal source according to a polarization characteristic of a signal transmitted from the signal source. The electronic device 200 including the circular polarization antenna (e.g., the second antenna structure 5 of FIG. 7) can reduce deviation (or error) of a recognized distance with respect to the signal source, compared to the electronic device in the comparative example.

TABLE 1

| Signal transmitted from signal source | Circular polarization antenna | | Linear polarization antenna | |
|---|---|---|---|---|
| | Portrait orientation | Landscape orientation | Portrait orientation (occurrence of vertical polarization) | Landscape orientation (occurrence of horizontal polarization) |
| Horizontal polarization | 37 m | 35 m | 6.5 m | 38 m |
| Vertical polarization | 37 m | 33 m | 39 m | 7.5 m |
| 45-degree polarization | 35 m | 35 m | 25 m | 35 m |
| Recognized distance deviation | 4 m | | 32.5 m | |

In an embodiment, referring to FIG. 13 and Table 1, the electronic device 200 including the circular polarization antenna receives a signal of a bandwidth (e.g., UWB) of a broadband using the circular polarization, and thus, positioning accuracy can be secured without an substantial effect on the orientation of a signal source or a polarization characteristic of a signal transmitted to the signal source. For example, in a case of the electronic device in the comparative example, when the liner polarization generated in the linear polarization antenna does not match with a polarization characteristic of a signal received from the signal source, the strength of the signal received from to the linear polarization antenna deteriorates and phase information may be distorted, whereby it may be difficult to secure the positioning accuracy.

Figure 21:
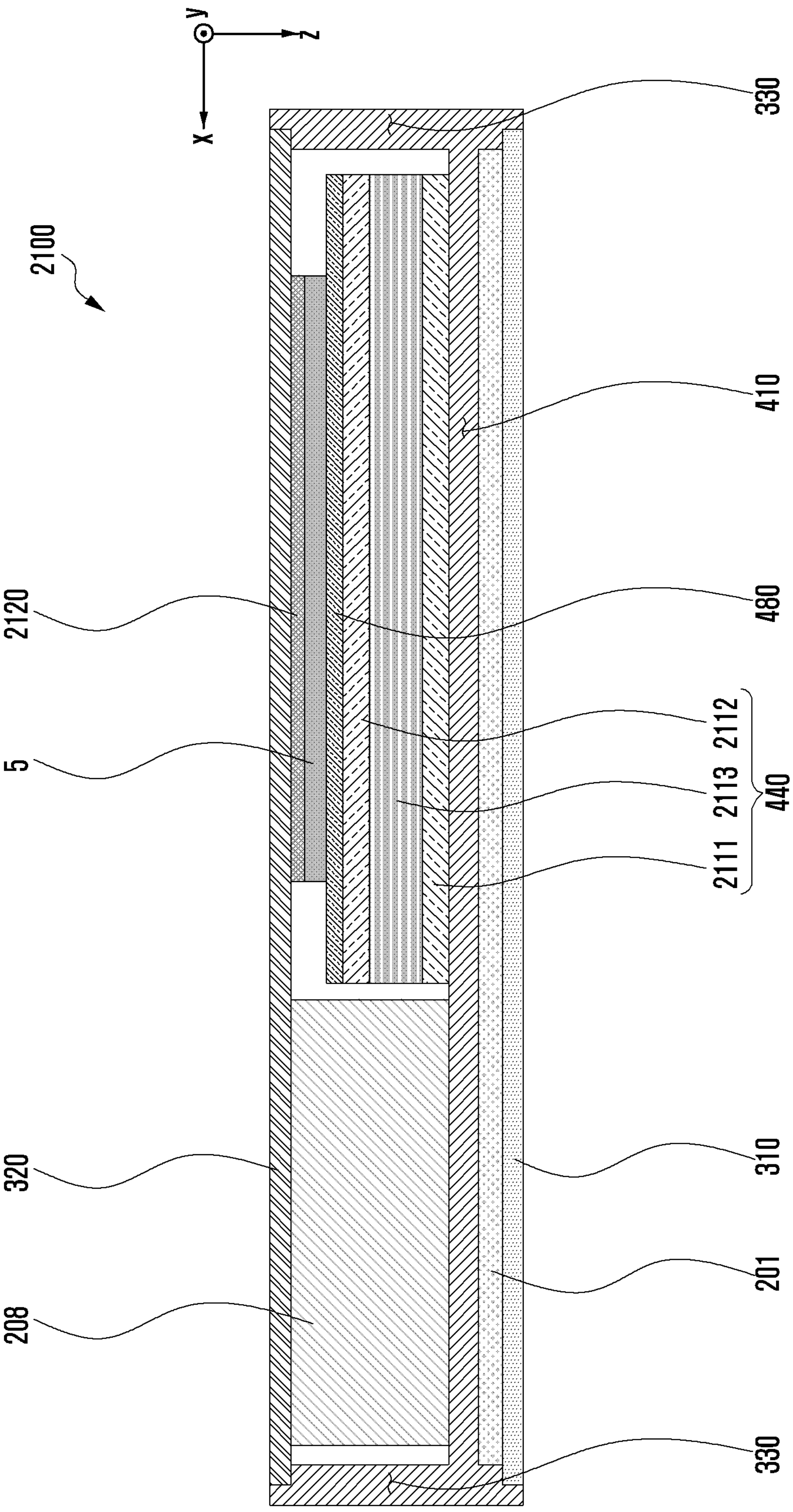
FIG. 21 is a cross-sectional view on an x-z plane of a part of the electronic device illustrated in FIG. 3, according to various embodiments.
Figure 22:
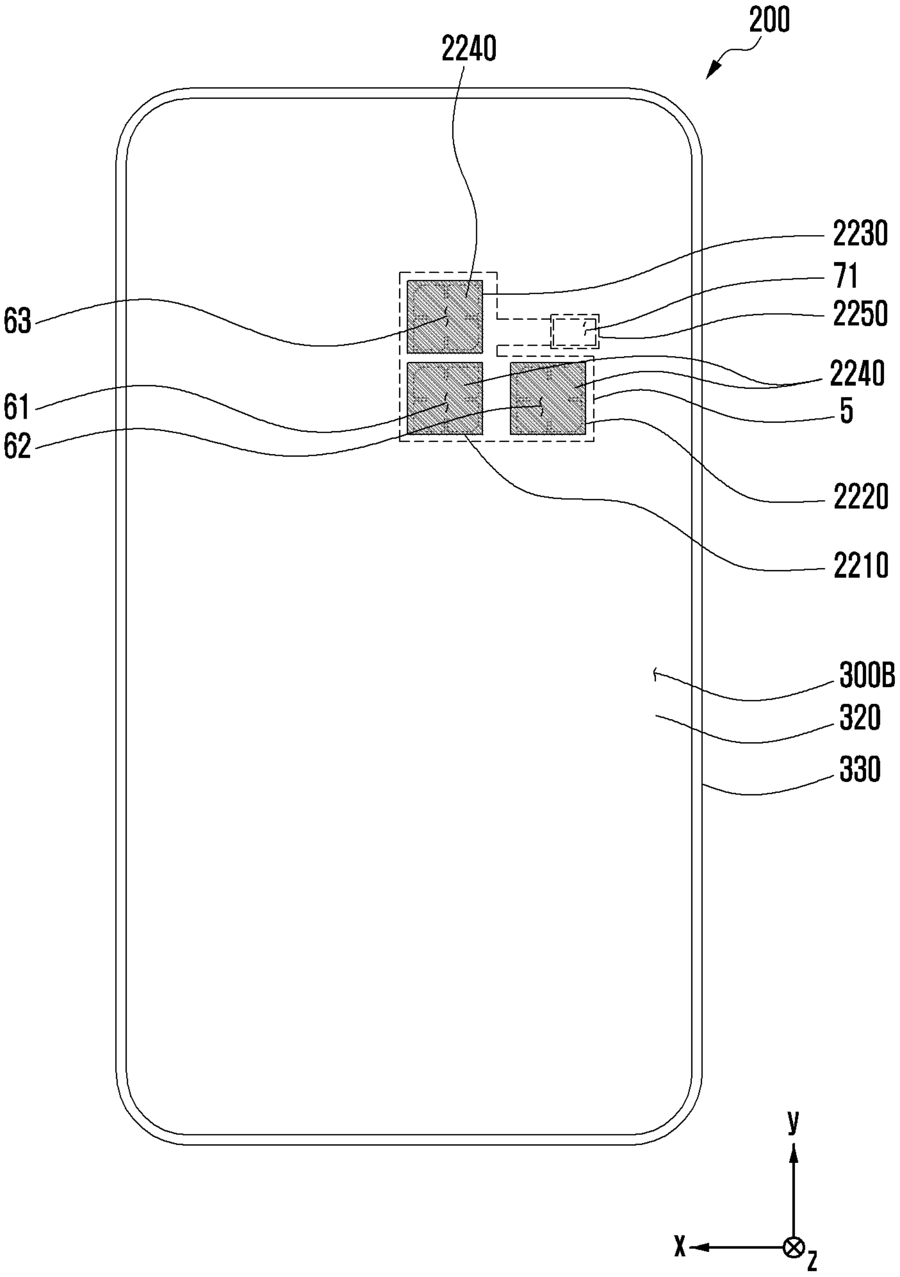
FIG. 22 is a diagram illustrating the electronic device illustrated in FIG. 3, according to various embodiments.

FIG. 21 is a cross-sectional view 2100 taken on an x-z plane of a part of the electronic device 200 illustrated in FIG. 3, according to various embodiments. FIG. 22 is a diagram illustrating the electronic device 200 illustrated in FIG. 3, according to various embodiments.

Referring to FIGS. 21 and 22, in an embodiment, the cross-sectional view 2100 may include a bezel structure 330, a first support member 410, a front plate 310, a rear plate 320, a display 201, multiple second camera modules 208, a first substrate assembly 440, a cover member 480, a second antenna structure 5, or a buffer member 2120.

According to an embodiment, the display 201 may be positioned between the first support member 410 and the front plate 310. The multiple second camera modules 208, the first substrate assembly 440, the cover member 480, the second antenna structure 5, or the buffer member 2120 may be positioned between the first support member 410 and the rear plate 320. The cover member 480 may be positioned between the first substrate assembly 440 and the rear plate 320. The second antenna structure 5 may be at least partially positioned on the cover member 480 and the rear plate 320. The buffer member 2120 may be positioned between the second antenna structure 5 and the rear plate 320. In an embodiment, the multiple second camera modules 208 may not substantially overlap with the first substrate assembly 440, the cover member 480, the second antenna structure 5, or the buffer member 2120 when seen above from the rear plate 320 (e.g., when seen in the +z axis direction).

According to an embodiment, the first substrate assembly 440 may include a primary PCB 2111, a secondary PCB 2112, and an interposer substrate 2113 between the primary PCB 2111 and the secondary PCB 2112. The primary PCB 2111 may be disposed on the first support member 410. The secondary PCB 2112 may be disposed to at least partially overlap with the primary PCB 2111 when seen from above the rear plate 320 (e.g., when seen in the + % axis direction). The interposer substrate 2113 may electrically connect the primary PCB 2111 and the secondary PCB 2112. The interposer substrate 2113 may include, for example, multiple conductive vias (not shown) for electrically connecting the primary PCB 2111 and the secondary PCB 2112. At least a part of the multiple conductive vias included in the interposer substrate 2113 may be a part of a signal line through which a signal is transferred between a first electronic component disposed on the primary PCB 2111 and a second electronic component disposed on the secondary PCB 2112. In an embodiment, a part of the multiple conductive vias included in the interposer substrate 2112 may be a part of a ground path for electrically connecting a first ground plane included in the primary PCB 2111 and a second ground plane included in the secondary PCB 2112.

According to an embodiment, the cover member 480 may be in contact with the secondary PCB 2112. The cover member 480 may include, for example, metal and/or polymer. The second antenna structure 5 may be disposed on the cover member 480.

According to an embodiment, the buffer member 2120 may be disposed in the second antenna structure 5, or disposed on the rear plate 320. The buffer member 2120 may be positioned on a gap between the second antenna structure 5 and the rear plate 320. The buffer member 2120 may be disposed between the second antenna structure 5 and the rear plate 320 to press the second antenna structure 5 toward the first substrate assembly 440. The buffer member 2120 may reduce an effect (e.g., scratch) between the second antenna structure 5 and the rear plate 320. In an embodiment, the buffer member 2120 may reduce a frictional joint between the second antenna structure 5 and the rear plate 320. The buffer member 2120 may include a non-conductive material which can reduce an antenna radiation performance when the second antenna structure 5 transmits or receives a frequency signal toward the rear surface 300B. The buffer member 2120 may have a dielectric constant (e.g., a low dielectric constant) which can reduce deterioration in the antenna radiation performance of the second antenna structure 5. For example, the buffer member 2120 may be in a film shape, or include a flexible member such as a sponge.

According to an embodiment, the rear plate 320 may be formed of a non-conductive material such as polymer or glass.

According to an embodiment, the rear plate 320 may include a metal material, and in this case, may include multiple openings 2210, 2220, and 2230 positioned to correspond to the multiple first antenna elements 61, 62, and 63 of the second antenna structure 5. In an embodiment, the multiple openings 2210, 2220, and 2230 may be formed as a single opening. The multiple openings 2210, 2220, and 2230 may overlap with the multiple first antenna elements 61, 62, and 63 and the multiple second antenna elements 71, 72, and 73 when seen from above the rear plate 320 (e.g., when seen in the +z axis direction). A non-conductive member 2240 may be positioned on the multiple openings 2210, 2220, and 2230 to form a part of the rear surface 300B of the electronic device 200. In an embodiment, the non-conductive member 2240 positioned on the multiple openings 2210, 2220, and 2230 may be a radio frequency (RF) window area (or a radiating aperture area). When the second antenna structure 5 transmits or receives a frequency signal, propagation of the frequency signal may be performed by going through the non-conductive member 2240. The non-conductive member 2240 may secure coverage while reducing deterioration in the radiation performance of the second antenna structure 5 with respect to the rear plate 320. In an embodiment, when seen from above the rear plate 320, the multiple openings 2210, 2220, and 2230 may have sizes that are enough to overlap with the whole of the multiple first antenna elements 61, 62, and 63.

According to an embodiment, the electronic device 200 may further include a flexible member 2250 (e.g., a sponge) positioned between the second antenna structure 5 and the rear plate 320. The flexible member 2250 may be disposed in the second antenna structure 5, or disposed on the rear plate 320. The flexible member 2250 may not overlap with the buffer member 2120 when seen from above the rear plate 320. The flexible member 2250 may be disposed between the connector 1040 and the rear plate 320 elastically press the connector 1040 toward the first substrate assembly 440 so that the connector 1040 does not separated from the first substrate assembly 440. In an embodiment, the flexible member 2250 may be positioned between the reinforcing member 1030 (see FIG. 10) and the rear plate 320. In an embodiment, the flexible member 2250 may be implemented to be replaced with the reinforcing member 1030. In an embodiment, the reinforcing member 2120 may be extended to be replaced with the flexible member 2250.

According to an example embodiment of the disclosure, an electronic device (e.g., the electronic device 200 of FIG. 2) may include: a housing (e.g., the housing 300 of FIG. 2). The electronic device may include: an antenna structure (e.g., the second antenna structure 5 of FIG. 3) positioned in the housing. The antenna structure may include: a printed circuit board (e.g., the printed circuit board 50 of FIG. 9 or 10). The printed circuit board may include: a first surface (e.g., the first surface 501 of FIG. 9 or 10) oriented in a first direction and a second surface (e.g., the second surface 502 of FIG. 9 or 10) oriented in a second direction opposite to the first direction. The antenna structure may include: multiple first antenna elements (e.g., the first antenna elements 61, 62, and 63 of FIG. 7) positioned in the printed circuit board on the first surface or to be closer to the first surface than the second surface. The multiple first antenna elements may be configured to generate circular polarization. The multiple first antenna elements may include, when seen from above the first surface, a first border (e.g., the first border 811 of FIG. 8) and a third border (e.g., the third border 813 of FIG. 8) spaced apart from each other and extending in parallel to each other. The multiple first antenna elements may include, when seen from above the first surface, a second border (e.g., the second border 812 of FIG. 8) and a fourth border (e.g., the fourth border 814 of FIG. 8) spaced apart from each other by a distance between the first border and the third border and extending in parallel to each other. The second border and the fourth border may be arranged to be perpendicular to the first border or the third border. The multiple first antenna elements may include, when seen from above the first surface, multiple first notches (e.g., the multiple first notches N11, N12, N13, and N14 of FIG. 8) formed on the first border, the second border, the third border, and the fourth border. The multiple first notches may be arranged at a 90-degree angle with reference to a center (e.g., the center C1 of FIG. 8) of each of the multiple first antenna elements. The antenna structure may include multiple second antenna elements (e.g., the multiple second antenna elements 71, 72, and 73 of FIG. 7) positioned in the printed circuit board to be closer to the second surface than the multiple first antenna elements. The multiple second antenna elements may overlap, when seen from above the first surface, the multiple first antenna elements one-to-one. The multiple second antenna elements may be configured to generate circular polarization. The multiple second antenna elements may include, when seen from above the first surface, a fifth border (e.g., the fifth border 815 of FIG. 8) and a seventh border (e.g., the seventh border 817 of FIG. 7) spaced apart from each other and extending in parallel to each other. The multiple second antenna elements may include, when seen from above the first surface, a sixth border (e.g., the sixth border 816 of FIG. 8) and an eighth border (e.g., the eighth border 818 of FIG. 8) spaced apart from each other by a distance between the fifth border and the seventh border. The sixth border and the eighth border may be arranged to be perpendicular to the fifth border or the seventh border. The multiple second antenna elements may include, when seen from above the first surface, multiple second notches (e.g., the multiple second notches N21, N22, N23, and N24 of FIG. 8) formed on the fifth border, the sixth border, the seventh border, and the eighth border. The multiple second notches are arranged at a 90-degree angle with reference to the center, and may overlap with at least some of the multiple first notches one-to-one. The antenna structure may include multiple electrical paths (e.g., the first electrical path EP1, the second electrical path EP2, and the third electrical path EP3 of FIG. 7) positioned on the printed circuit board. The multiple electrical paths may include multiple conductive vias (e.g., the first conductive via V1, the second conductive via V2, and the third conductive via V3 of FIG. 7). The electronic device may include a wireless communication circuit (e.g., the wireless communication module 192 of FIG. 1) electrically connected to the multiple first antenna elements through the electrical paths. The printed circuit board may include a first conductive layer (e.g., the first conductive layer 910 of FIG. 9) including the multiple first antenna elements. The printed circuit board may include a second conductive layer (e.g., the second conductive layer 920 of FIG. 8) including the multiple second antenna elements. The printed circuit board may include a first dielectric (e.g., the first dielectric D1 of FIG. 9) positioned between the first conductive layer and the second conductive layer. The printed circuit board may include a third conductive layer (e.g., the third conductive layer 930 of FIG. 9) configured to electrically connect the multiple conductive vias to the wireless communication circuit. The third conductive layer may be positioned in the printed circuit board to be closer to the second surface than the second conductive layer. The printed circuit board may include a fourth conductive layer (e.g., the fourth conductive layer 940 of FIG. 9) positioned in the printed circuit board to be closer to the second surface than the third conductive layer. The fourth conductive layer may include a ground plane. The printed circuit board may include a second dielectric (e.g., the second dielectric D2 of FIG. 9) positioned between the third conductive layer and the fourth conductive layer. The second dielectric may have a greater dielectric constant than the first dielectric. Each of the multiple second antenna elements may include a hole (e.g., the first hole H1, the second hole H2, or the third hole H3 of FIG. 7). Each of the multiple conductive vias may be positioned to extend through the hole. The multiple second antenna elements may be configured to be indirectly fed by the multiple conductive vias. The multiple first notches may have different shapes from the multiple second notches.

According to an example embodiment of the disclosure, each (e.g., the first conductive via V1, the second conductive via V2, or the third conductive via V3) of the conductive vias may be positioned, when seen from above the first surface (e.g., the first surface 501 of FIG. 9), between two first notches (e.g., two first notches N11 and N13 of FIG. 8) symmetrically positioned with reference to the center, among the multiple first notches, and positioned to be closer to one (e.g., the first notch N11 of FIG. 8) of the two first notches.

According to an example embodiment of the disclosure, each of the multiple first antenna elements (e.g., the multiple first antenna elements 61, 62, and 63 of FIG. 7) may include, when seen from above the first surface (e.g., the first surface 501 of FIG. 9), a first chamfer (e.g., the first chamfer CH1 of FIG. 8) formed at a part at which the second border and the third border are connected. Each of the multiple first antenna elements may include, when seen from above the first surface, a second chamfer (e.g., the second chamfer CH2 of FIG. 8) formed at a part at which the first border and the fourth border are connected. The first chamfer and the second chamfer may be, when seen from above the first surface, formed to be symmetrical to each other with reference to the center (e.g., the center C1 of FIG. 8).

According to an example embodiment of the disclosure, each of the multiple second antennas elements (e.g., the second antenna elements 71, 72, and 73 of FIG. 7) may include, when seen from above the first surface (e.g., the first surface 501 of FIG. 9), a third chamfer (e.g., the third chamfer CH3 of FIG. 8) formed at a part at which the sixth border and the seventh border are connected. Each of the multiple second antennas elements may include, when seen from above the first surface, a fourth chamfer (e.g., the fourth chamfer CH4 of FIG. 8) formed at a part at which the fifth border and the eighth border are connected. The third chamfer and the fourth chamfer may be, when seen from above the first surface, formed to be symmetrical to each other with reference to the center (e.g., the center C1 of FIG. 8).

According to an example embodiment of the disclosure, the first border (e.g., the first border 811 of FIG. 8) or the third border (e.g., the third border 813 of FIG. 8) may be parallel to the fifth border (e.g., the fifth border 815 of FIG. 8) or the seventh border (e.g., the seventh border 817 of FIG. 8).

According to an example embodiment of the disclosure, the multiple first notches (e.g., the multiple first notches N11, N12, N13, and N14 of FIG. 8) and the multiple second notches (e.g., the multiple second notches N21, N22, N23, and N24 of FIG. 8) may be formed to have different square shapes.

According to an example embodiment of the disclosure, the printed circuit board (e.g., the printed circuit board 50 of FIG. 10) may include a first part (e.g., the first part 51 of FIG. 10) including the multiple first antenna elements, the multiple second antenna elements, and the multiple conductive vias. The printed circuit board may include a second part (e.g., the second part 52 of FIG. 10) extending from the first part. The second part may have a thickness thinner than the first part, and may be electrically connected to the wireless communication circuit.

According to an example embodiment of the disclosure, when seen from above the first surface, two (e.g., two first antenna elements 61 and 62 of FIG. 7) of the multiple first antenna elements and two (e.g., two second antenna elements 71 and 72 of FIG. 7) of the multiple second antenna elements may be arranged to be spaced apart from each other in an x-axis direction. When seen from above the first surface, two (e.g., two first antenna elements 61 and 63 of FIG. 7) of the multiple first antenna elements and two (e.g., two second elements 71 and 73 of FIG. 7) of the multiple second antenna elements may be arranged to be spaced apart from each other in a y-axis direction.

According to an example embodiment of the disclosure, a distance between centers of two first antenna elements (e.g., two first antenna elements 61 and 62 of FIG. 7) arranged in the x-axis direction, among the multiple first antenna elements, or a distance between centers of two first antenna elements (e.g., two first antenna elements 61 and 63 of FIG. 7) arranged in the y-axis direction, among the multiple first antenna elements, have a length of ½ of a wavelength of a first signal transmitted and/or received through the multiple first antenna elements. A distance between centers of two second antenna elements (e.g., two second antenna elements 71 and 72 of FIG. 7) arranged in the x-axis direction, among the multiple second antenna elements, or a distance between centers of two second antenna elements (e.g., two second antenna elements 71 and 73 of FIG. 7) arranged in the y-axis direction, among the multiple second antenna elements, may have a length of ½ of a wavelength of a second signal transmitted and/or received through the multiple second antenna elements.

According to an example embodiment of the disclosure, the wireless communication circuit (e.g., the wireless communication module 192 of FIG. 1) may be configured to transmit and/or receive a first signal of a selected or designated first frequency band through the multiple first antenna elements (e.g., the multiple first antenna elements 61, 62, and 63 of FIG. 7). The wireless communication circuit may be configured to transmit and/or receive a second signal of a selected or designated second frequency band through the multiple second antenna elements (e.g., the multiple second antenna elements 71, 72 and 73 of FIG. 7). The first signal may have a frequency higher than that of the second signal.

According to an example embodiment of the disclosure, the first frequency band or the second frequency band may include a frequency band relating to an ultra-wide band (UWB).

According to an example embodiment of the disclosure, the first signal may have an 8 GHz frequency, and the second signal may have a 6.5 GHz frequency.

According to an example embodiment of the disclosure, the electronic device may include a processor (e.g., the processor 120 of FIG. 1) electrically connected to the wireless communication circuit. The processor may be configured to perform a positioning function for a signal source, based on signals received through the multiple first antenna elements (e.g., the multiple first antenna elements 61, 62, and 63 of FIG. 7) or the multiple second antenna elements (e.g., the multiple second antenna elements 71, 72, and 73 of FIG. 7).

According to an example embodiment of the disclosure, the electronic device may further include at least one another antenna structure which is at least partially identical to the antenna structure (e.g., the antenna structure 5 of FIG. 3). The antenna structure and the at least one another antenna structure may be integrally formed.

According to an example embodiment of the disclosure, the at least one another antenna structure may be positioned in an x-axis direction or a y-axis direction orthogonal to the first direction with respect to the antenna structure (e.g., the antenna structure 5 of FIG. 3).

According to an example embodiment, an antenna structure (e.g., the antenna structure 5 of FIG. 3) may include: a printed circuit board (e.g., the printed circuit board 50 of FIGS. 9 and 10). The printed circuit board may include a first surface (e.g., the first surface 501 of FIGS. 9 and 10) oriented in a first direction and a second surface (e.g., the second surface 502 of FIGS. 9 and 10) oriented in a second direction opposite to the first direction. The antenna structure may include a first conductive layer (e.g., the first conductive layer 910 of FIG. 9) positioned in the printed circuit board on the first surface or to be closer to the first surface than the second surface. The first conductive layer may include multiple first antenna elements (e.g., the multiple first antenna elements 61, 62, and 63 of FIG. 7) configured to generate circular polarization. The multiple first antenna elements may include, when seen from above the first surface, a first border (e.g., the first border 811 of FIG. 8) and a third border (e.g., the third border 813 of FIG. 8) spaced apart from each other and extending in parallel to each other. The multiple first antenna elements may include, when seen from above the first surface, a second border (e.g., the second border 812 of FIG. 8) and a fourth border (e.g., the fourth border 814 of FIG. 8) spaced apart from each other by a distance between the first border and the third border and extending in parallel to each other. The second border and the fourth border may be arranged to be perpendicular to the first border or the third border. The multiple first antenna elements may include multiple first notches (e.g., the multiple first notches N11, N12, N13, and N14) formed on the first border, the second border, the third border, and the fourth border. The multiple first notches may be arranged at a 90-degree angle with reference to a center (e.g., the center C1 of FIG. 8) of each of the multiple first antenna elements. The antenna structure may include a second conductive layer (e.g., the second conductive layer 920 of FIG. 0.9) positioned in the printed circuit board to be closer to the second surface than the multiple first antenna elements. The second conductive layer may include multiple second antenna elements (e.g., the multiple second elements 71, 72, and 73 of FIG. 7) configured to generate circular polarization. The second antenna elements may overlap with, when seen from above the first surface, the multiple first antenna elements one-to-one. The multiple second antenna elements may include, when seen from above the first surface, a fifth border (e.g., the fifth border 815 of FIG. 8) and a seventh border (e.g., the seventh border 817 of FIG. 8) spaced apart from each other and extending in parallel to each other. The multiple second antenna elements may include, when seen from above the first surface, a sixth border (e.g., the sixth border 816 of FIG. 8) and an eighth border (e.g., the eighth border 818 of FIG. 8) spaced apart from each other by a distance between the fifth border and the seventh border. The sixth border and the eighth border may be arranged to be perpendicular to the fifth border or the seventh border. The multiple second antenna elements may include, when seen from above the first surface, the multiple second notches (e.g., the multiple second notches N21, N22, N23, and N24 of FIG. 8) formed on the fifth border, the sixth border, the seventh border, and the eighth border. The multiple second notches may be arranged at a 90-degree angle from the center, and overlap with at least some of the multiple first notches one-to-one. The antenna structure may include a third conductive layer (e.g., the third conductive layer 930 of FIG. 9) positioned in the printed circuit board to be closer to the second surface than the second conductive layer. The antenna structure may include a fourth conductive layer (e.g., the fourth conductive layer 940 of FIG. 9) positioned in the printed circuit board to be closer to the second surface than the third conductive layer. The fourth conductive layer may include a ground plane. The antenna structure may include a first dielectric (e.g., the first dielectric D1 of FIG. 9) included in the printed circuit board. The first dielectric may be positioned between the first conductive layer and the second conductive layer. The antenna structure may include a second dielectric (e.g., the second dielectric D2 of FIG. 9) included in the printed circuit board. The second dielectric may be positioned between the third conductive layer and the fourth conductive layer. The second dielectric may have a greater dielectric constant than the first dielectric. The antenna structure may include multiple conductive vias (e.g., the first conductive via V1, the second conductive via V2, and the third conductive via V3 of FIG. 7) positioned in the printed circuit board. The multiple conductive vias may electrically connect the multiple first antenna elements and the third conductive layer. The electronic device may include a wireless communication circuit (e.g., the wireless communication module 192 of FIG. 1) electrically connected to the multiple first antenna elements through the third conductive layer. Each of the multiple second antenna elements may include a hole (e.g., the first hole H1, the second hole H2, or the third hole H3 of FIG. 7). Each of the multiple conductive vias may be positioned to extend through the hole. The multiple second antenna elements may be configured to be indirectly fed by the multiple conductive vias. The multiple first notches may have different shapes from the multiple second notches.

According to an example embodiment of the disclosure, each (e.g., the first conductive layer V1, the second conductive via V2, or the third conductive layer V3 of FIG. 7) of the conductive vias may be positioned, when seen from above the first surface (e.g., the first surface 501 of FIG. 9), between two first notches (e.g., two first notches N11 and N13 of FIG. 8) symmetrically positioned with reference to the center, among the multiple first notches, and positioned to be closer to one (e.g., the first notch N11 of FIG. 8) of the two first notches.

According to an example embodiment of the disclosure, each of the multiple first antenna elements (e.g., the multiple first antenna elements 61, 62, and 63 of FIG. 7) may include, when seen from above the first surface (e.g., the first surface 501 of FIG. 9), a first chamfer (e.g., a first chamfer CH1 of FIG. 8) formed at a part at which the second border and the third border are connected. Each of the multiple first antenna elements may include, when seen from above the first surface, a second chamfer formed (e.g., the second chamfer CH2 of FIG. 8) at a part at which the first border and the fourth border are connected. The first chamfer and the second chamfer may be, when seen from above the first surface, formed to be symmetrical to each other with reference to the center (e.g., the center C1 of FIG. 8).

According to an example embodiment of the disclosure, each of the multiple second antennas elements (e.g., the multiple second antenna elements 71, 72, and 73 of FIG. 7) may include, when seen from above the first surface (e.g., the first surface 501 of FIG. 9), a third chamfer (e.g., the third chamfer CH3 of FIG. 8) formed at a part at which the sixth border and the seventh border are connected. Each of the multiple second antennas elements may include, when seen from above the first surface, a fourth chamfer (e.g., the fourth chamfer CH4 of FIG. 8) formed at a part at which the fifth border and the eighth border are connected. The third chamfer and the fourth chamfer may be, when seen from above the first surface, formed to be symmetrical to each other with reference to the center (e.g., the center C1 of FIG. 8).

According to an example embodiment, the multiple first notches (e.g., the multiple first notches N11, N12, N13, and N14 of FIG. 8) may have different rectangular shapes from the multiple second notches (e.g., the multiple second notches N21, N22, N23, and N24 of FIG. 8).

According an example embodiment, when seen from above the first surface, two (e.g., two first antenna elements 61 and 62 of FIG. 7) of the multiple first antenna elements and two (e.g., two second antenna elements 71 and 72 of FIG. 7) of the multiple second antenna elements may be arranged to be spaced apart from each other in an x-axis direction. When seen from above the first surface, two (e.g., two first antenna elements 61 and 63 of FIG. 7) of the multiple first antenna elements and two (e.g., two second antenna elements 71 and 73 of FIG. 7) of the multiple second antenna elements may be arranged to be spaced apart from each other in a y-axis direction.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a housing;

an antenna structure positioned in the housing and comprising a printed circuit board, multiple first antenna elements, multiple second antenna elements, and multiple electrical paths;

and a wireless communication circuit electrically connected to the multiple first antenna elements through the electrical paths, wherein the printed circuit board comprises a first surface oriented in a first direction and a second surface oriented in a second direction opposite to the first direction, wherein the multiple first antenna elements are:

positioned in the printed circuit board on the first surface or to be closer to the first surface than the second surface, configured to generate circular polarization, and each comprise, when viewed from above the first surface, a first border and a third border spaced apart from each other and extending in parallel to each other, a second border and a fourth border spaced apart from each other by a distance between the first border and the third border, extending in parallel to each other, and respectively disposed to be perpendicular to the first border or the third border, and multiple first notches with at least one of the first notches formed on each of the first border, the second border, the third border, and the fourth border, and arranged at a 90-degree angle with reference to a center of each of the multiple first antenna elements, wherein the multiple second antenna elements are: positioned in the printed circuit board to be closer to the second surface than the multiple first antenna elements, overlap with, when viewed from above the first surface, the multiple first antenna elements one-to-one, configured to generate circular polarization, and each comprise, when viewed from above the first surface, a fifth border and a seventh border spaced apart from each other and extending in parallel to each other, a sixth border and an eighth border spaced apart from each other by a distance between the fifth border and the seventh border, and respectively disposed to be perpendicular to the fifth border or the seventh border, and multiple second notches with at least one of the second notches formed on each of the fifth border, the sixth border, the seventh border, and the eighth border, arranged at a 90-degree angle with reference to the center, and wherein a portion of each of the second notches overlaps with a corresponding one of the first notches, and wherein the multiple electrical paths are positioned on the printed circuit board and comprise multiple conductive vias electrically connected to the multiple first antenna elements, wherein the printed circuit board comprises:

a first conductive layer comprising the multiple first antenna elements;

a second conductive layer comprising the multiple second antenna elements;

a first dielectric positioned between the first conductive layer and the second conductive layer;

a third conductive layer configured to electrically connect the multiple conductive vias to the wireless communication circuit and positioned in the printed circuit board to be closer to the second surface than the second conductive layer;

a fourth conductive layer comprising a ground plane and positioned in the printed circuit board to be closer to the second surface than the third conductive layer;

and a second dielectric positioned between the third conductive layer and the fourth conductive layer and having a greater dielectric constant than the first dielectric, wherein each of the multiple second antenna elements comprises a hole and each of the multiple conductive vias is positioned to extend through the corresponding hole, wherein the multiple second antenna elements are configured to be indirectly fed by the multiple conductive vias, and wherein the multiple first notches have different shapes from the multiple second notches.

2. The electronic device of claim 1, wherein each of the conductive vias is positioned, when viewed from above the first surface, between two first notches symmetrically positioned with reference to the center, among the multiple first notches, and positioned to be closer to one of the two first notches.

3. The electronic device of claim 1, wherein each of the multiple first antenna elements comprises, when viewed from above the first surface:

a first chamfer formed at a part at which the second border and the third border are connected; and a second chamfer formed at a part at which the first border and the fourth border are connected, wherein the first chamfer and the second chamfer are, when viewed from above the first surface, symmetrical to each other with reference to the center.

4. The electronic device of claim 3, wherein each of the multiple second antennas elements comprises, when viewed from above the first surface:

a third chamfer formed at a part at which the sixth border and the seventh border are connected; and a fourth chamfer formed at a part at which the fifth border and the eighth border are connected, wherein the third chamfer and the fourth chamfer are, when viewed from above the first surface, symmetrical to each other with reference to the center.

5. The electronic device of claim 1, wherein the first border or the third border is parallel to the fifth border or the seventh border.

6. The electronic device of claim 1, wherein the multiple first notches and the multiple second notches have rectangular shapes of different dimensions.

7. The electronic device of claim 1, wherein the printed circuit board comprises:

a first part comprising the multiple first antenna elements, the multiple second antenna elements, and the multiple conductive vias; and a second part extending from the first part, having a thickness thinner than the first part, and electrically connected to the wireless communication circuit.

8. The electronic device of claim 1, wherein when viewed from above the first surface, two of the multiple first antenna elements and two of the multiple second antenna elements are arranged to be spaced apart from each other in an x-axis direction, and wherein two of the multiple first antenna elements and two of the multiple second antenna elements are arranged to be spaced apart from each other in a y-axis direction.

9. The electronic device of claim 8, wherein a distance between centers of two first antenna elements arranged in the x-axis direction, among the multiple first antenna elements, or a distance between centers of two first antenna elements arranged in the y-axis direction, among the multiple first antenna elements have a length of ½ of a wavelength of a first signal transmitted and/or received through the multiple first antenna elements, and wherein a distance between centers of two second antenna elements arranged in the x-axis direction, among the multiple second antenna elements, or a distance between centers of two second antenna elements arranged in the y-axis direction, among the multiple second antenna elements have a length of ½ of a wavelength of a second signal transmitted and/or received through the multiple second antenna elements.

10. The electronic device of claim 1, wherein the wireless communication circuit is configured to transmit and/or receive a first signal of a selected or designated first frequency band through the multiple first antenna elements, and to transmit and/or receive a second signal of a selected or designated second frequency band through the multiple second antenna elements, wherein the first signal has a frequency higher than a frequency of the second signal.

11. The electronic device of claim 10, wherein the first frequency band or the second frequency band comprises a frequency band relating to an ultra-wide band (UWB).

12. The electronic device of claim 10, wherein the first signal has a frequency of 8 GHZ, and the second signal has a frequency of 6.5 GHz.

13. The electronic device of claim 1, further comprising a processor electrically connected to the wireless communication circuit, wherein the processor is configured to perform a positioning function for a signal source, based on signals received through the first antenna elements or the second antenna elements.

14. The electronic device of claim 1, further comprising at least one another antenna structure at least partially identical to the antenna structure, wherein the antenna structure and the at least one another antenna structure are integrally formed.

15. The electronic device of claim 14, wherein the at least one another antenna structure is positioned in an x-axis direction or a y-axis direction orthogonal to the first direction with respect to the antenna structure.

16. An antenna structure comprising:

a printed circuit board comprising a first surface oriented in a first direction and a second surface oriented in a second direction opposite to the first direction;

a first conductive layer positioned in the printed circuit board on the first surface or to be closer to the first surface than the second surface, and comprising multiple first antenna elements, configured to generate circular polarization, and each comprising, when viewed from above the first surface, a first border and a third border spaced apart from each other and extending in parallel to each other, a second border and a fourth border spaced apart from each other by a distance between the first border and the third border, extending in parallel to each other, and respectively disposed to be perpendicular to the first border or the third border, and multiple first notches with at least one of the first notches formed on each of the first border, the second border, the third border, and the fourth border, and arranged at a 90-degree angle with reference to a center of each of the multiple first antenna elements;

a second conductive layer positioned in the printed circuit board to be closer to the second surface than the multiple first antenna elements, and comprising multiple second antenna elements overlapping with, as viewed from above the first surface, the multiple first antenna elements one-to-one, configured to generate circular polarization, and each comprising, when viewed from above the first surface, a fifth border and a seventh border spaced apart from each other and extending in parallel to each other, a sixth border and an eighth border spaced apart from each other by a distance between the fifth border and the seventh border, and respectively disposed to be perpendicular to the fifth border or the seventh border, and multiple second notches with at least one of the second notches formed on each of the fifth border, the sixth border, the seventh border, and the eighth border, arranged at a 90-degree angle from the center, and wherein a portion of each of the second notches overlaps with a corresponding one of the first notches;

a third conductive layer positioned in the printed circuit board to be closer to the second surface than the second conductive layer;

a fourth conductive layer comprising a ground plane and positioned in the printed circuit board to be closer to the second surface than the third conductive layer;

a first dielectric included in the printed circuit board and positioned between the first conductive layer and the second conductive layer;

a second dielectric included in the printed circuit board, positioned between the third conductive layer and the fourth conductive layer, and having a greater dielectric constant than the first dielectric;

multiple conductive vias positioned in the printed circuit board and electrically connecting the multiple first antenna elements and the third conductive layer;

and a wireless communication circuit electrically connected to the multiple first antenna elements through the third conductive layer, wherein each of the multiple second antenna elements comprises a hole and each of the multiple conductive vias is positioned to extend through the hole, wherein the multiple second antenna elements are configured to be indirectly fed by the multiple conductive vias, and wherein the multiple first notches have different shapes from the multiple second notches.

17. The antenna structure of claim 16, wherein each of the conductive vias is positioned, when viewed from above the first surface, between two first notches symmetrically positioned with reference to the center, among the multiple first notches, and positioned to be closer to one of the two first notches.

18. The antenna structure of claim 16, wherein each of the multiple first antenna elements comprise, when viewed from above the first surface:

a first chamfer formed at a part at which the second border and the third border are connected; and a second chamfer formed at a part at which the first border and the fourth border are connected, wherein the first chamfer and the second chamfer are, when viewed from above the first surface, symmetrical to each other with reference to the center, and wherein each of the multiple second antennas elements comprises, when viewed from above the first surface;

a third chamfer formed at a part at which the sixth border and the seventh border are connected; and a fourth chamfer formed at a part at which the fifth border and the eighth border are connected, wherein the third chamfer and the fourth chamfer are, when viewed from above the first surface, symmetrical to each other with reference to the center.

19. The antenna structure of claim 16, wherein the multiple first notches and the multiple second notches have rectangular shapes of different dimensions.

20. The antenna structure of claim 16, wherein when viewed from above the first surface, two of the multiple first antenna elements and two of the multiple second antenna elements are arranged to be spaced apart from each other in an x-axis direction, and wherein two of the multiple first antenna elements and two of the multiple second antenna elements are arranged to be spaced apart from each other in a y-axis direction.

* * * * *